US008908057B2

(12) United States Patent
Yoshizumi

(10) Patent No.: US 8,908,057 B2
(45) Date of Patent: Dec. 9, 2014

(54) COMPOSITION DETERMINATION DEVICE, IMAGING SYSTEM, COMPOSITION DETERMINATION METHOD, AND PROGRAM

(75) Inventor: Shingo Yoshizumi, Tokyo (JP)

(73) Assignee: Sony Corporation, Tokyo (JP)

( * ) Notice: Subject to any disclaimer, the term of this patent is extended or adjusted under 35 U.S.C. 154(b) by 458 days.

(21) Appl. No.: 12/797,993

(22) Filed: Jun. 10, 2010

(65) Prior Publication Data
US 2011/0019021 A1 Jan. 27, 2011

(30) Foreign Application Priority Data

Jul. 23, 2009 (JP) ................. 2009-172327

(51) Int. Cl.
H04N 5/228 (2006.01)
H04N 5/225 (2006.01)
H04N 5/232 (2006.01)
G06T 7/00 (2006.01)

(52) U.S. Cl.
CPC ............ *H04N 5/232* (2013.01); *H04N 5/2251* (2013.01); *G06T 2207/30201* (2013.01); *H04N 5/23219* (2013.01); *G06T 7/004* (2013.01); *H04N 5/23222* (2013.01)
USPC .......................... 348/222.1; 348/169; 348/373

(58) Field of Classification Search
CPC ...... H04N 5/232; H04N 9/045; G01S 3/7864; G01S 3/7865
USPC ..................... 348/135, 169, 171, 172, 208.14, 348/208.16, 222.1, 373; 382/118, 288, 291; 386/242
See application file for complete search history.

(56) References Cited

U.S. PATENT DOCUMENTS

| 8,116,539 | B2* | 2/2012 | Nishijima | 382/118 |
| 2001/0002843 | A1 | 6/2001 | Yata | |
| 2005/0219395 | A1* | 10/2005 | Sugimoto | 348/333.12 |
| 2006/0204055 | A1* | 9/2006 | Steinberg et al. | 382/118 |
| 2006/0204110 | A1* | 9/2006 | Steinberg et al. | 382/224 |
| 2007/0177036 | A1* | 8/2007 | Kawada | 348/239 |
| 2007/0236762 | A1* | 10/2007 | Tsuji | 358/537 |
| 2009/0103778 | A1* | 4/2009 | Yoshizumi et al. | 382/103 |
| 2009/0135291 | A1* | 5/2009 | Sugimoto | 348/347 |
| 2009/0141981 | A1* | 6/2009 | Chan | 382/190 |

FOREIGN PATENT DOCUMENTS

CN 101415077 A 4/2009
JP 59-208983 11/1984
(Continued)

OTHER PUBLICATIONS

U.S. Appl. No. 13/383,450, filed Jan. 11, 2012, Yoshizumi.
U.S. Appl. No. 13/384,898, filed Jan. 19, 2012, Yoshizumi.
U.S. Appl. No. 13/384,686, filed Jan. 18, 2012, Yoshizumi.

(Continued)

Primary Examiner — Lin Ye
Assistant Examiner — Chriss Yoder, III
(74) Attorney, Agent, or Firm — Oblon, Spivak, McClelland, Maier & Neustadt, L.L.P.

(57) ABSTRACT

A composition determination device includes: subject detection means configured to detect a specific subject in an image based on image data; rotation angle detection means configured to detect a rotation angle of a specific target portion in an image section in the image, corresponding to a detected subject which is the subject detected by the subject detecting means; and composition determination means configured to determine a composition on the basis of the rotation angle.

16 Claims, 47 Drawing Sheets

(56) References Cited

FOREIGN PATENT DOCUMENTS

| | | |
|---|---|---|
| JP | 2005-003852 | 1/2005 |
| JP | 2007-110575 | 4/2007 |
| JP | 2008-277904 | 11/2008 |
| JP | 2001-268425 | 9/2001 |
| JP | 2003-219239 | 7/2003 |

OTHER PUBLICATIONS

Office Action issued Apr. 23, 2012 in Chinese Patent Application No. 201010233543.X with English language translation.
Office Action issued Apr. 23, 2013, in Japanese Parent Application No, 2009-172327.
U.S. Appl. No. 14/062,599, filed Oct. 24, 2013, Yoshizumi.

* cited by examiner

[PAN REFERENCE POSITION]

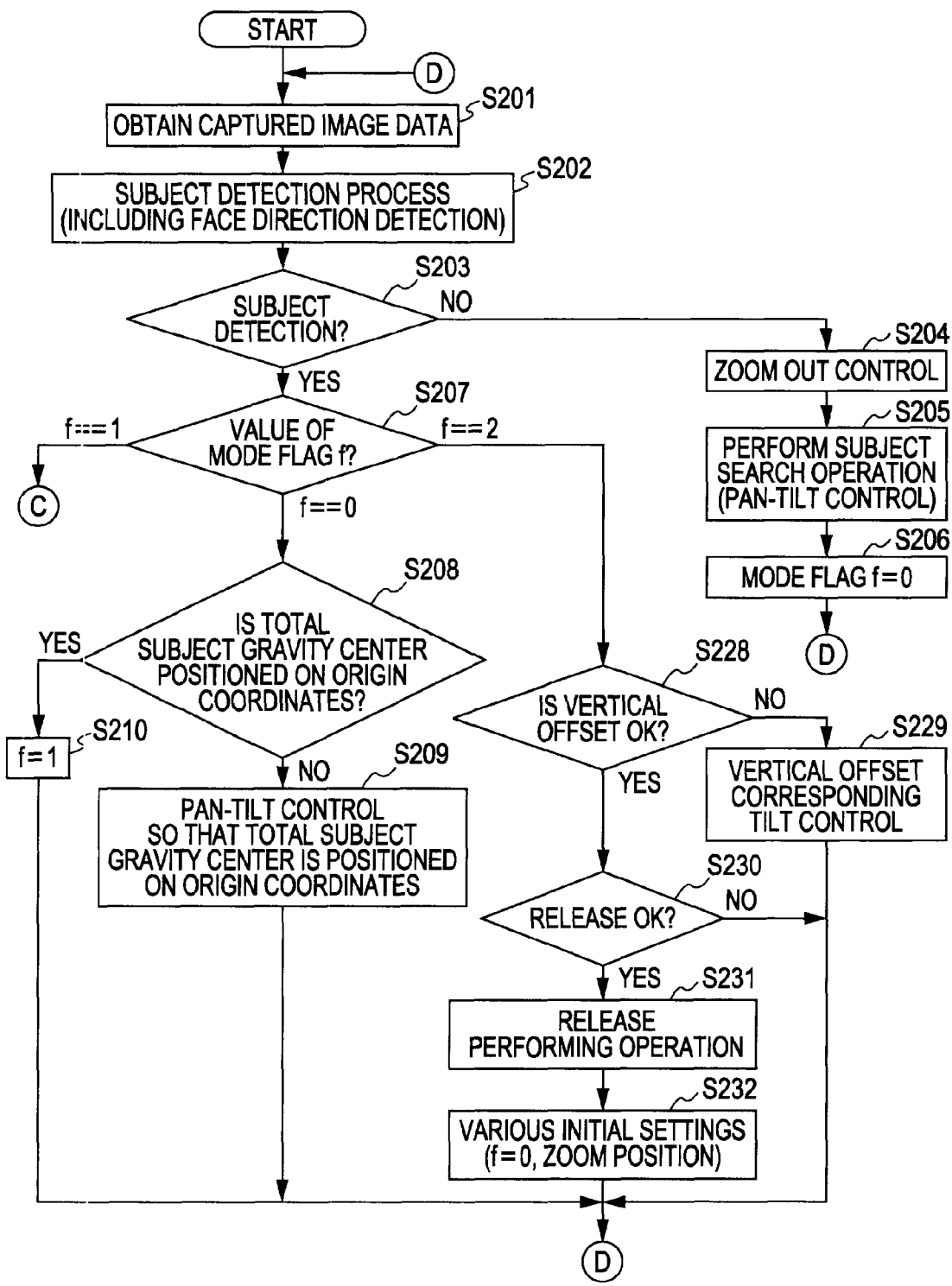

| FIG. 33A |
| FIG. 33B |

COMPOSITION DETERMINATION DEVICE, IMAGING SYSTEM, COMPOSITION DETERMINATION METHOD, AND PROGRAM

BACKGROUND OF THE INVENTION

1. Field of the Invention

The present invention relates to a composition determination device and a composition determination method which are configured to perform a process with respect to composition including image contents, for example, using image data as a target. Further, the present invention relates to a program for execution of sequences demanded for the composition determination device.

2. Description of the Related Art

Composition setting is an example of a technical factor in taking a photograph which makes a good impression. Here, "composition" is also referred to as "framing", and represents arrangement of a subject inside a screen such as a photograph.

There are several basic techniques generally available for good composition, but a general camera user does not simply take a photograph having good composition unless the user has sufficient knowledge and skill with respect to photography. Thus, there is a demand for a technique which can enable users to obtain, for example, a photographic image having good composition in an easy and simple manner.

For example, Japanese Unexamined Patent Application Publication No. 59-208983 discloses a technique of an automatic tracking device which detects the difference between images with a predetermined time interval, calculates the gravity center of the difference between the images, detects a movement amount and a movement direction of a subject image with respect to an imaging screen from a movement amount and a movement direction of the gravity center, and controls an imaging device to set the subject image within a reference region of a photographing screen.

Further, Japanese Unexamined Patent Application Publication No. 2001-268425 discloses a technique of an automatic tracking device which, at the time of automatic tracking of a person, can perform tracking so that the position of the upper 20% of the person among the area of the entire image of the person in an imaging screen comes in the center of the imaging screen, so that the face of the person comes in the center of the screen, to thereby perform the tracking while firmly photographing the face of the person.

From the viewpoint of composition determination, these techniques are configured to automatically search for a subject such as a person and to arrange the subject in an imaging screen with a certain set composition.

SUMMARY OF THE INVENTION

For example, optimal composition may be varied according to predetermined situations, states or the like with respect to a subject. However, in the techniques disclosed in the above patent documents, the tracked subject can be arranged only with a certain fixed composition. Thus, it is difficult to change composition for photography to be suitable for situations, etc. of the subject.

Accordingly, it is desirable to provide a technique capable of simply obtaining good composition in images such as photographs, in which composition having high flexibility can be adaptively determined according to change in situations or states of a subject.

According to an embodiment of the present invention, there is provided a composition determination device including: subject detection means configured to detect a specific subject in an image based on image data; rotation angle detection means configured to detect a rotation angle of a specific target portion in an image section in the image, corresponding to a detected subject which is the subject detected by the subject detecting means; and composition determination means configured to determine a composition on the basis of the rotation angle.

According to another embodiment of the present invention, there is provided an imaging system including: an imaging device section; a movable device section which includes a mechanism which is movable by changing an imaging view range of the imaging device section; image data obtaining means configured to obtain image data on a captured image which is obtained by imaging of the imaging device section; subject detection means configured to detect a specific subject in an image based on the image data; rotation angle detection means configured to detect a rotation angle of a specific target portion in an image section in the image, corresponding to a detected subject which is the subject detected by the subject detecting means; composition determination means configured to determine a composition on the basis of the rotation angle; and composition control means configured to perform a control for at least the movable device section so that the imaging view range is adjusted to obtain the composition which is determined by the composition determination means.

According to the above embodiments of the invention, the rotation angle of the specific target portion in the subject detected from the image of the image data is detected, and then, the composition determination is performed according to the detected rotation angle. For example, an optimal composition may be changed due to the rotation angle of the specific target portion. According to the embodiments of the invention, the optimal composition can be obtained according to the rotation angle.

In this way, according to the above embodiments of the invention, it is possible to automatically perform the composition determination having relatively high flexibility. Accordingly, when using, for example, an apparatus to which any one of the embodiments of the invention is applied, a user can obtain images of the optimal composition without laborious efforts, to thereby enjoy high convenience and utility.

DESCRIPTION OF THE PREFERRED EMBODIMENTS

Figure 1A:
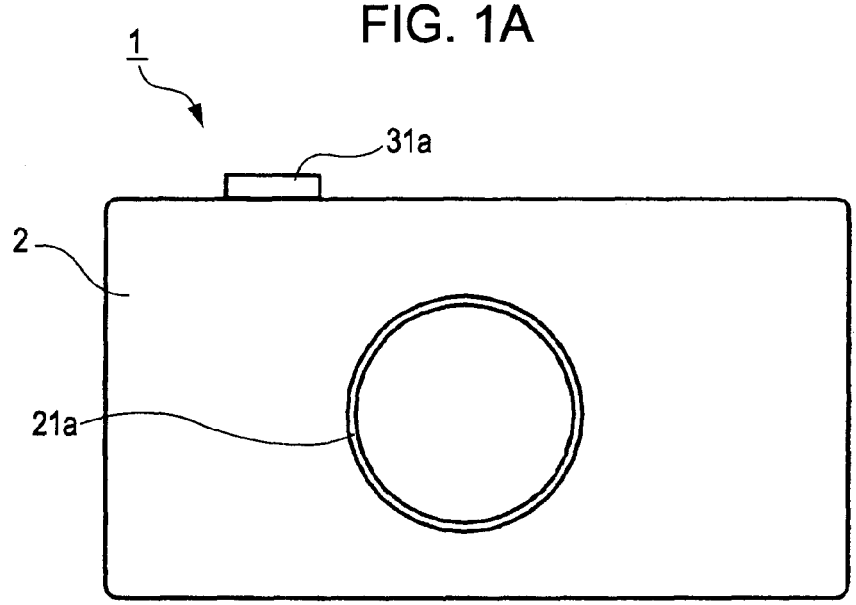
FIGS. 1A and 1B are a front view and a rear view schematically illustrating an appearance of a digital still camera which is an imaging device which forms an imaging system according to an embodiment of the invention.

Hereinafter, embodiments for carrying out the invention will be described in the following order.

1. Configuration of imaging system
 1-1. Entire configuration
 1-2. Digital still camera
 1-3. Camera platform
2. Example of functional configuration corresponding to composition control according to an embodiment
3. Composition control according to face direction and the number of subjects (first example)
4. Composition control according to face direction and the number of subjects (second example)
5. Composition control according to face rotation angle: in normal posture (third example)
6. Composition control according to face rotation angle: in recumbent posture (fourth example)
7. Algorithm of composition control according to face rotation angle
 7-1. Setting of face rotation angle range
 7-2. Algorithm corresponding to normal posture
 7-3. Algorithm corresponding to recumbent posture
8. Self timer automatic activating function
9. Modified example of imaging system according to the embodiment
10. Application example of composition control according to the embodiment Hereinafter, the terms "image frame", "field angle", "imaging view range", and "composition" will be used.

The "image frame" refers to a region range corresponding to a screen, for example, in which an image appears, and generally has a rectangular exterior frame shape which is long in a longitudinal or transverse direction.

The "field angle" is also called a zoom angle, and refers to a range of a subject which is collected in the image frame as determined by the position of a zoom lens in an optical system of an imaging device, which is expressed in terms of angle. Generally, the "field angle" is determined by a focal distance of the imaging optical system and the size of a field (imaging sensor or film), but here, refers to a factor element capable of changing according to the focal distance. Hereinafter, a value of the "field angle" may be indicated by the focal distance (for example, 35 mm).

The "imaging view range" is determined by an oscillation angle in a pan (horizontal) direction and an angle in a tilt (vertical) direction (elevation angle or depression angle), in addition to the "field angle", with respect to the range of the subject which is collected in the image frame of an image obtained by an imaging process of an imaging device disposed in a predetermined position.

The "composition" is also called "framing", and for example, refers to arrangement including size setting of the subject within the image frame which is determined by the imaging view range.

Hereinafter, an example of the embodiment will be described, in which a configuration according to the embodiment is applied to an imaging system which includes a digital still camera and a camera platform to which the digital still camera is installed.

1. Configuration of Imaging System 1-1. Entire Configuration

An imaging system according to the present embodiment includes a digital still camera 1 and a camera platform 10 on which the digital still camera 1 is installed.

Figure 1B:
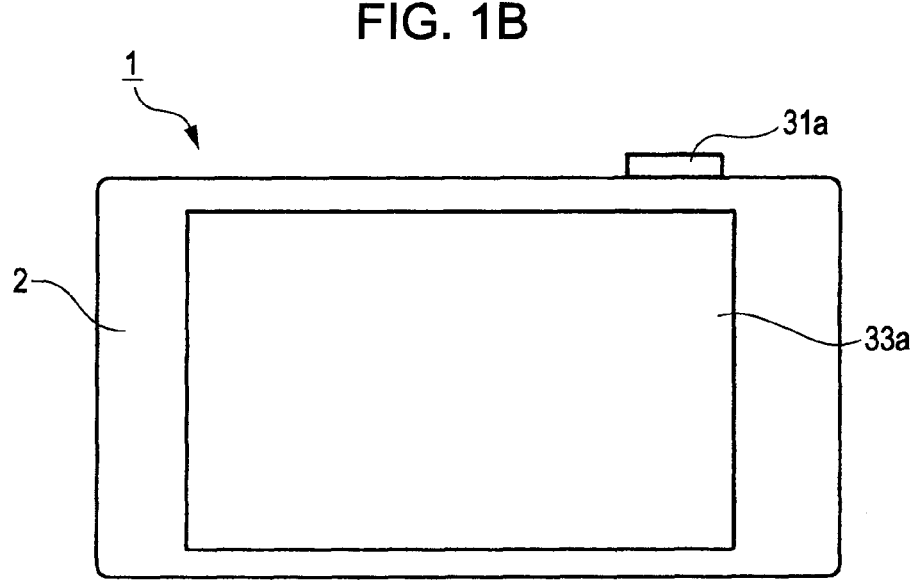

Firstly, FIG. 1 is a diagram illustrating an appearance of the digital still camera 1, in which FIGS. 1A and 1B illustrate a front view and a rear view of the digital still camera 1, respectively.

As shown in FIG. 1A, the digital still camera 1 includes a lens section 21a in a front surface side of a main body 2. The lens section 21a is a section which is provided outward the main body 2 as an optical system for imaging.

Further, a release button 31a is installed on an upper surface part of the main body 2. In an imaging mode, an image (captured image) which is captured by the lens section 21a is generated as an image signal. In addition, if manipulation with respect to the release button 31a is performed in the imaging mode, the captured image which is obtained at the time of the manipulation is recorded in a storage medium as still image data. That is, photography is performed.

As shown in FIG. 1B, the digital still camera 1 includes a display screen section 33a on a rear surface side thereof.

In the imaging mode, an image, which is called as a moving image and is captured by the lens section 21a at that time, is displayed in the display screen section 33a. Further, in a reproducing mode, the image data which is recorded in a storage medium is reproduced and displayed. Moreover, according to manipulation with respect to the digital still camera 1 which is performed by a user, a manipulation image is displayed as a GUI (Graphical User Interface).

Further, the digital still camera 1 according to the present embodiment is configured so that a touch panel is combined with the display screen section 33a. Thus, a user can contact the display screen section 33a with his or her finger, to thereby perform the manipulation.

In addition, the imaging system (imaging device) according to the present embodiment includes an imaging device section which is the digital still camera 1, and a movable mechanism section (movable device section) which is the camera platform 10 to be described later, but a user can perform photography with only one digital still camera, in a similar way to a normal digital still camera.

Figure 2:
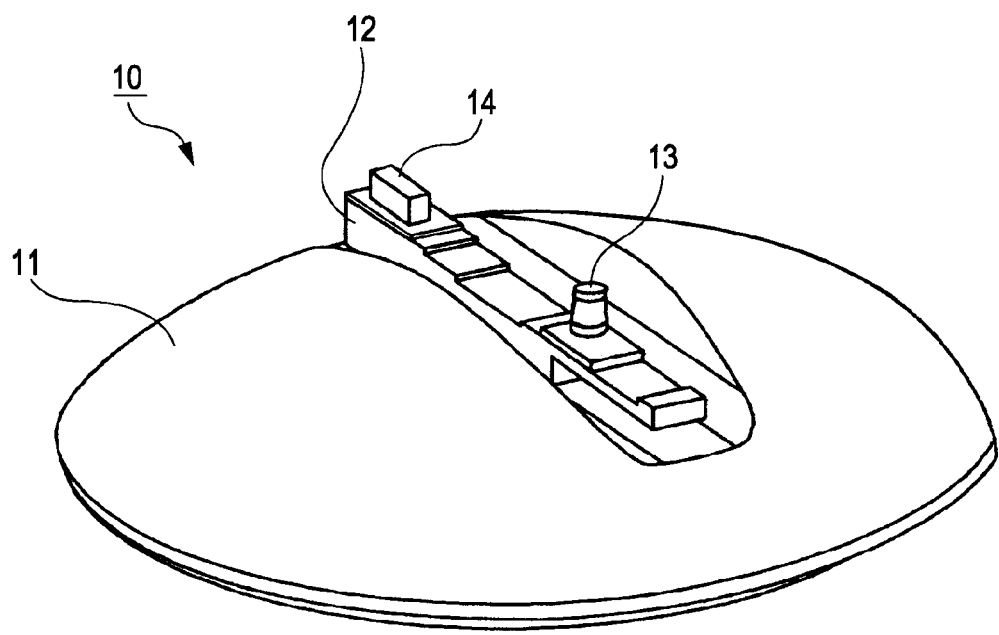
FIG. 2 is a perspective view illustrating an example of an appearance of a camera platform which forms an imaging system according to an embodiment of the invention.
Figure 3:
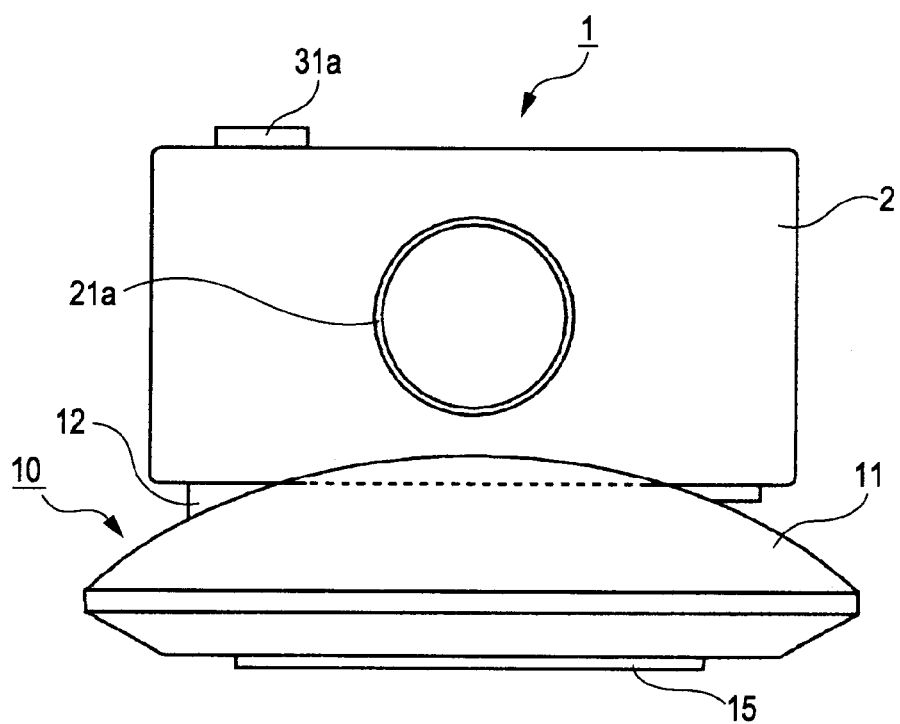
FIG. 3 is a front view illustrating an example of a state where a digital still camera is installed to a camera platform, as an imaging system according to an embodiment of the invention.
Figure 4:
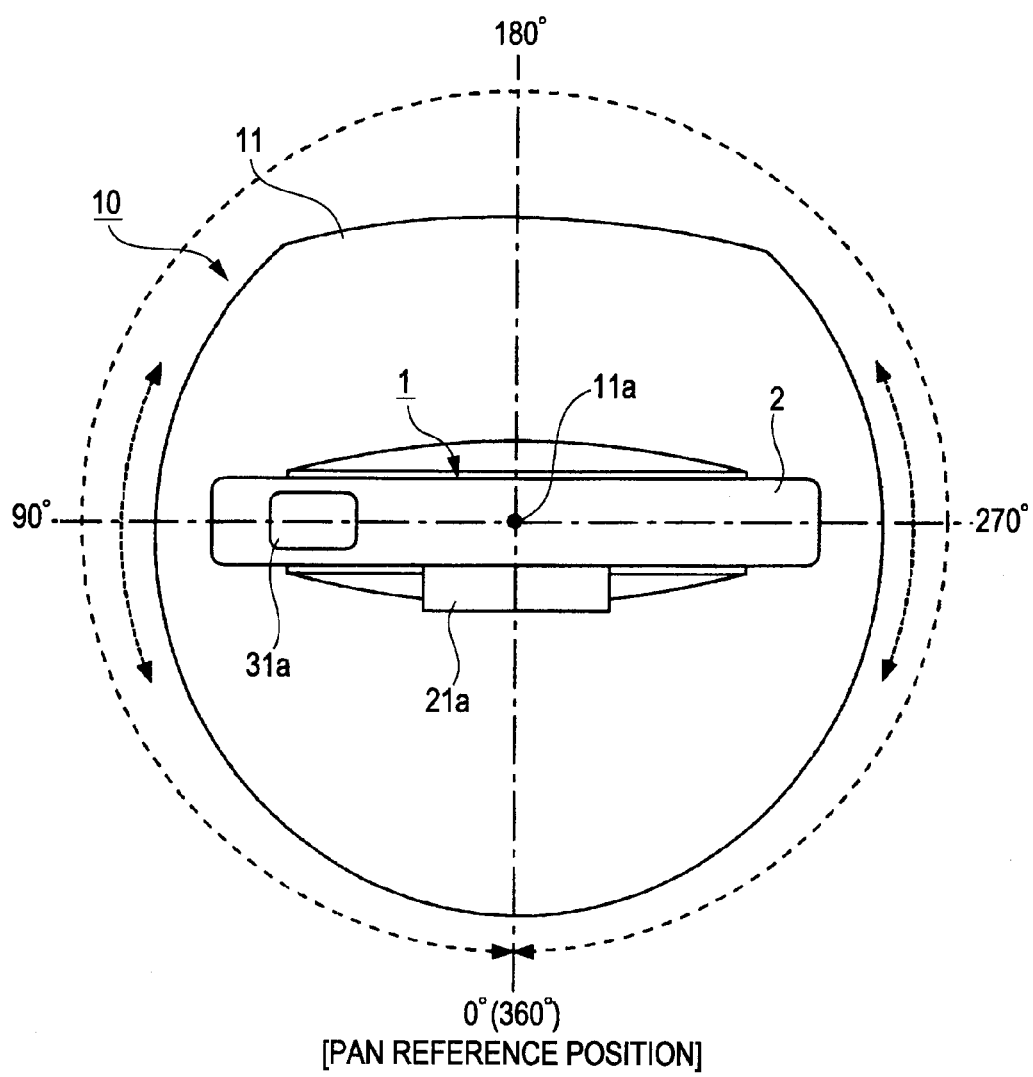
FIG. 4 is a plan view illustrating an example of a state where a digital still camera is installed to a camera platform, and an example of a movement in a pan direction, as an imaging system according to an embodiment of the invention.
Figure 5A:
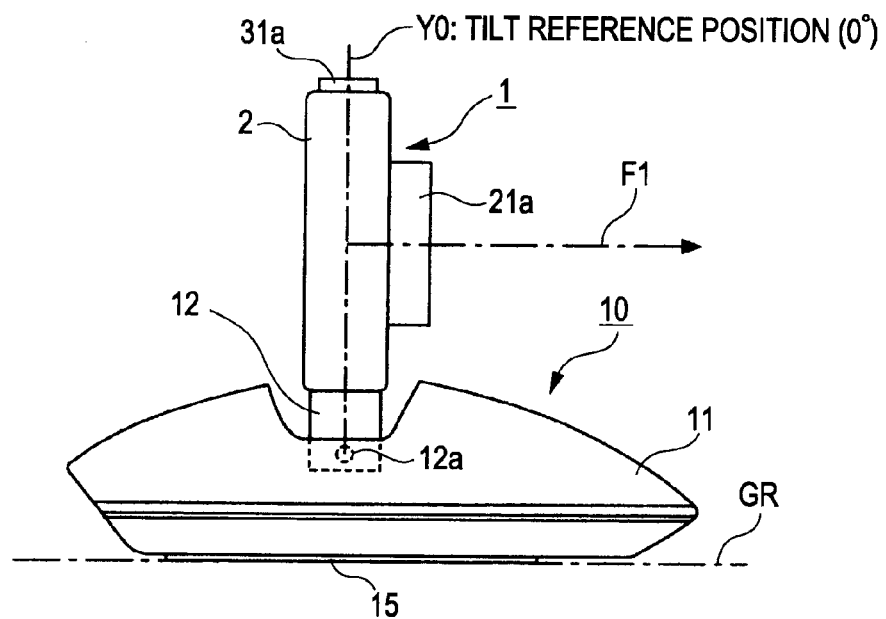
FIG. 5 is a side view illustrating an example of a state where a digital still camera is installed to a camera platform, as an imaging system according to an embodiment of the invention.
Figure 5B:
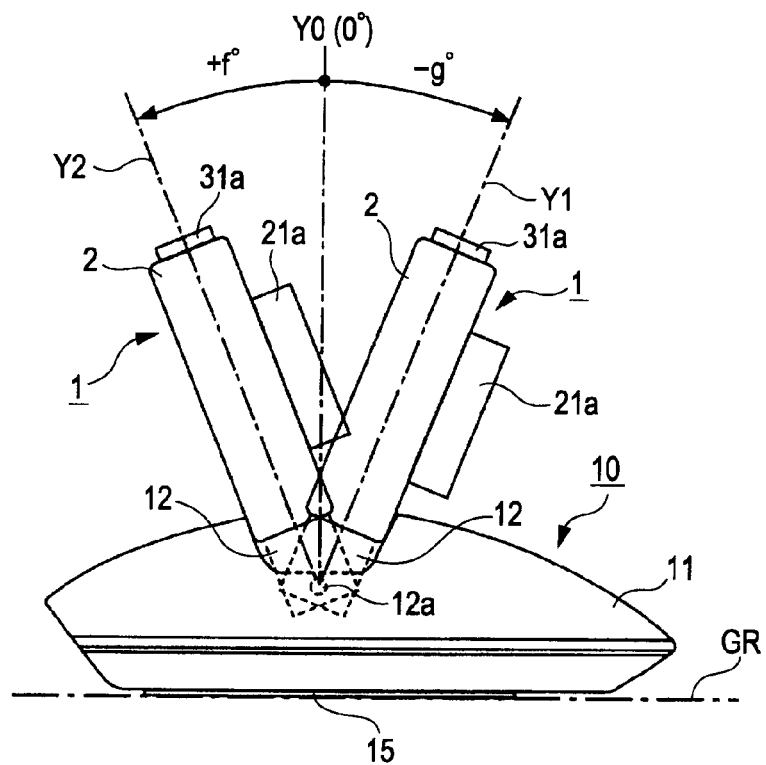

FIG. 2 is a perspective view illustrating an appearance of the camera platform 10. Further, FIGS. 3 to 5B illustrate, as an appearance of the imaging system according to the present embodiment, a state where the digital still camera 1 is properly mounted with respect to the camera platform 10. Here, FIG. 3 is a front view thereof; FIG. 4 is a plan view and FIG. 5A is a side view. FIG. 5B is a side view thereof illustrating a movable range of a tilt mechanism.

As shown in FIGS. 2, 3, 4 and 5A, the camera platform 10 is configured so that the main body 11 is combined on a ground base 13 and a camera mounting section 12 is installed to the main body 11.

When the digital still camera 1 is to be mounted on the camera platform 10, a bottom surface side of the digital still camera 1 is mounted with respect to an upper surface side of the camera mounting section 12.

In this respect, as shown in FIG. 2, a protrusion section 13 and a connector 14 are installed on the upper surface side of the camera mounting section 12.

Although not shown, a hole section, which is engaged with the protrusion section 13, is formed on the lower surface part of the main body 2 of the digital still camera 1. In a state where the digital still camera 1 is properly mounted with respect to the camera mounting section 12, the hole section is engaged with the protrusion section 13. In this state, in normal panning and tilting operations of the camera platform 10, the digital still camera 1 is not deviated or separated from the camera platform 10.

Further, in the digital still camera 1, a connector is installed in a predetermined position of the lower surface part thereof. In this way, in the state where the digital still camera 1 is properly mounted on the camera mounting section 12, the connector of the digital still camera 1 is connected to the connector 14 of the camera platform 10, to thereby enable communication therebetween.

For example, in the embodiment, the connector 14 and the protrusion section 13 are configured to be actually movable in the camera mounting section 12. In addition, for example, an adaptor or the like which is suitable for the shape of the bottom surface part of the digital still camera 1 can be further used, and thus, a different type digital still camera can be mounted on the camera mounting section 12 in the state of capable of communicating with the camera platform 10.

Further, the communication between the digital still camera 1 and the camera mounting section 12 may be performed in a wireless manner.

In addition, in the state where the digital still camera 1 is mounted with respect to the camera platform 10, charging may be performed with respect to the digital still camera 1 from the camera platform 10. Further, an image signal of an image or the like which is reproduced in the digital still camera 1 may be transmitted to the camera platform 10, and the transmitted signal may be output to an external monitor device through a cable or a wireless communication or the like from the camera platform 10. That is, the camera platform 10 may be used for changing an imaging view range of the digital still camera 1, and further may have a so-called cradle function.

Next, a basic movement in pan and tilt directions of the digital still camera 1 due to the camera platform 10 will be described.

First, the basic movement of the pan direction is performed as follows.

In a state where the camera platform 10 is disposed on a floor surface or the like, a bottom surface of a ground base 15 is in contact with the floor surface or the like. In this state, as shown in FIG. 4, the main body 11 is configured to be able to rotate in a clockwise direction and in a counterclockwise direction centering around a rotation shaft 11*a*. Thus, an imaging view range of the digital still camera 1 which is mounted on the camera platform 10 is changed along a left and right direction (horizontal direction). That is, a panning movement is performed.

In addition, in this case, the pan mechanism of the camera platform 10 includes a structure which provides a free rotation of 360° or more without limitation, with respect to any direction of the clockwise direction and the counterclockwise direction.

Further, in the pan mechanism of the camera platform, a reference position is set in the pan direction.

In this respect, as shown in FIG. 4, the pan reference position is set to 0° (360°), and the rotation position of the main body 11 along the pan direction, that is, the pan position is indicated in the range of 0° to 360°.

Further, the basic movement of the camera platform 10 in the tilt direction is performed as follows.

As shown in FIGS. 5A and 5B, the movement of the tilt direction is performed as the camera mounting section 12 moves in opposite directions of an elevation angle and a depression angle centering around the rotation shaft 12*a*.

In this respect, FIG. 5A illustrates a state where the camera mounting section 12 is positioned in a tilt reference position Y0 (0°). In this state, an imaging direction F1 which coincides with an imaging optical axis of the lens section 21*a* (optical system) is parallel with a ground surface section GR with which the ground base 15 is in contact.

Furthermore, as shown in FIG. 5B, firstly, in an elevation direction, the camera mounting section 12 can move in the range of a predetermined maximum rotation angle +f° from the tilt reference position Y0 (0°), centering around the rotation shaft 12*a*. Further, in a depression direction, the camera mounting section 12 can move in the range of a predetermined maximum rotation angle −g° from the tilt reference position Y0 (0°), centering around the rotation shaft 12*a*. In this way, as the camera mounting section 12 moves in the range between the maximum rotation angle +f° and the maximum rotation angle −g° with reference to the tilt reference position Y0 (0°), the imaging view range of the digital still camera 1 which is mounted on the camera platform 10 (camera mounting section 12) is changed in an up and down direction (vertical direction). That is, a tilting movement is obtained.

An appearance configuration of the camera platform 10 as shown in FIGS. 2 to 5B is only an example, and thus, as long as the mounted digital still camera 1 can move in the pan direction and the tilt direction, different physical configurations or structures may be used.

1-2. Digital Still Camera

Figure 6:
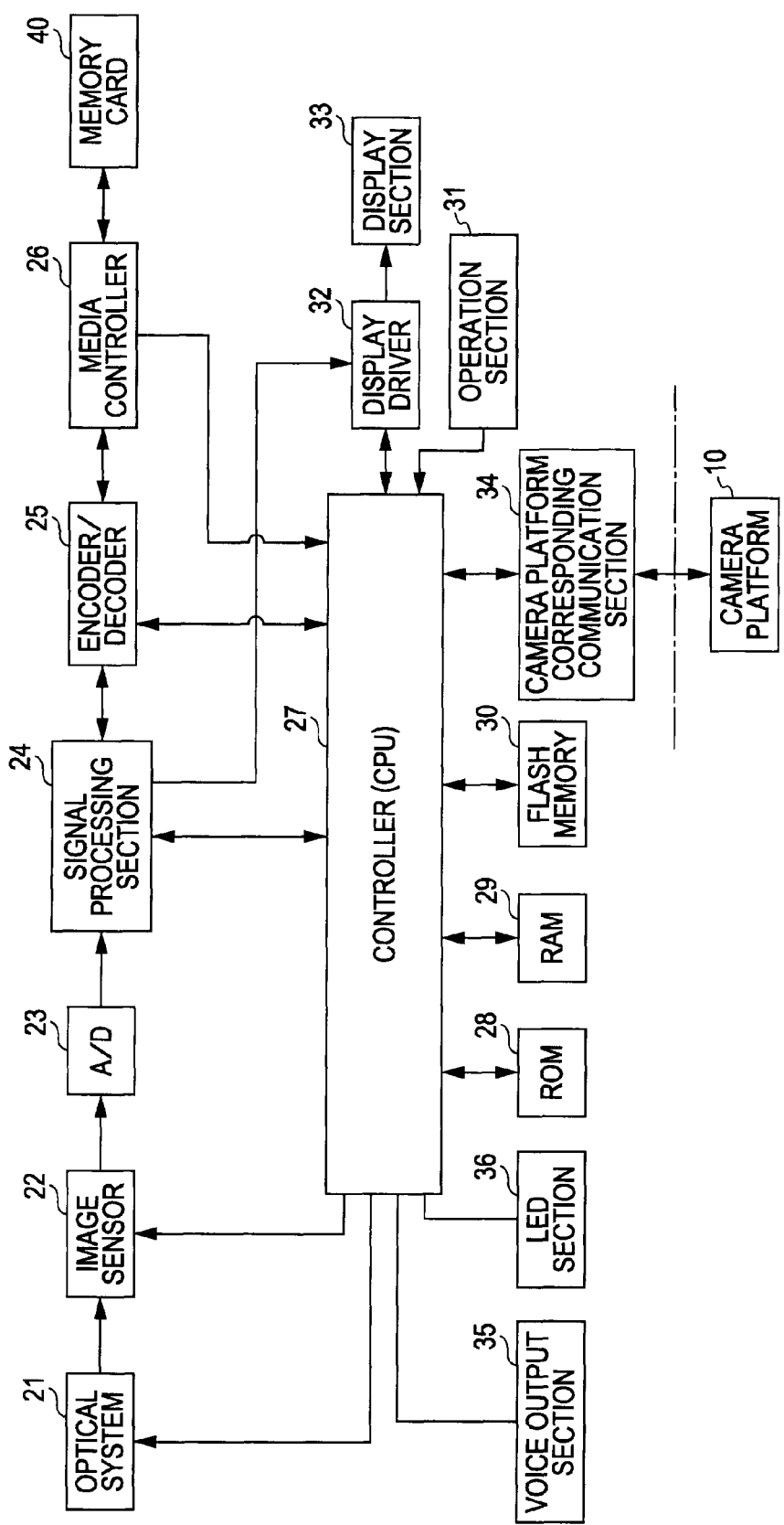
FIG. 6 is a block diagram illustrating an example of a configuration of a digital still camera.

First, FIG. 6 is a block diagram illustrating an example of an actual internal configuration of the digital still camera 1.

In FIG. 6, an optical system 21 includes, for example, an imaging lens group having a plurality of imaging lenses such as a zoom lens, a focus lens and the like, and a diaphragm and the like, and enables an image to be formed on a light sensing surface of an image sensor 22 using incident light as imaging light.

The optical system 21 also includes a driving mechanism for driving the zoom lens, the focus lens, the diaphragm, and so on. Operations of the driving mechanism are controlled by a so-called camera control which is performed by a controller 27, for example, such as zoom (field angle) control, automatic focus adjustment control, automatic exposure control, and so forth.

The image sensor 22 performs a so-called photoelectric conversion in which imaging light obtained in the optical system 21 is converted into electric signals. Accordingly, the image sensor 22 receives the imaging light from the optical system 21 at a light sensing surface of a photoelectric conversion element, and sequentially outputs signal charges which are accumulated in accordance with the intensity of the received light at a predetermined timing. Thus, electric signals (imaging signals) corresponding to the imaging light are output. The photoelectric conversion element (imaging device) which is employed as the image sensor 22 is not particularly limited, but a CMOS sensor or a CCD (Charge Coupled Device) or the like can be exemplified. Further, in the case of using the CMOS sensor, an A/D converter 23 corresponding to an A/D converter which will be described later may be included as a device (component) corresponding to the image sensor 22.

The imaging signal which is output from the image sensor 22 is input to the A/D converter 23, is converted into a digital signal, and then is input to a signal processing section 24.

In the signal processing section 24, the digital imagine signal which is output from the A/D converter 23 is imported in a unit corresponding to a single still image (frame image), and a predetermined signal processing is performed with respect to the imported imaging signal of the still image unit, to thereby generate captured image data (capture still image data) which is image signal data corresponding to the single still image.

In this way, in a case where the captured image data which is generated by the signal processing section 24 is recorded as image information in a memory card 40 which is a storage medium (storage medium device), for example, the captured image data corresponding to the single still image is output to an encoder/decoder 25 from the signal processing section 24.

The encoder/decoder 25 performs compression coding by a predetermined still image compression coding method, performs, for example, addition of a header or the like under the control of the controller 27, and then performs conversion into an image data format which is compressed in a predetermined format, with respect to the captured image data of the still image unit which is output from the signal processing section 24. Further, the generated image data is transmitted to a media controller 26. The media controller 26 performs control so that the transmitted image data is written and recorded in the memory card 40 under the control of the controller 27. In this case, the memory card 40 is a storage medium which employs a configuration that includes, for example, an external shape of a card format according to a predetermined standard and an internal non-volatile semiconductor storage element such as a flash memory. In addition, the storage medium for storing the image data may have a type, a format or the like which is different from the above described memory card.

Further, the signal processing section 24 according to the present embodiment performs an image processing which is subject detection using the captured image data which is obtained as described above, which will be described later.

In addition, the digital still camera 1 performs image display by a display section 33 using the captured image data which is obtained by the signal processing section 24, to thereby display a so-called moving image which is an image during being captured currently. For example, in the signal processing section 24, as described above, the imaging signal which is output from the A/D converter 23 is imported to generate the captured image data corresponding to the single still image, but the operation may be continuously performed to sequentially generate the captured image data corresponding to a frame image in a moving image. Further, the sequentially generated captured image data is transmitted to a display driver 32 under the control of the controller 27. Thus, the display of the moving image is performed.

In the display driver 32, a driving signal for driving the display section 33 is generated on the basis of the captured image data which is input from the signal processing section 24 as described above, and is output to the display section 33. Thus, in the display section 33, images based on the captured image data of the still image unit are sequentially displayed. If a user views this state, the images which have been captured at that time are displayed in the display section 33 as the moving image. That is, the moving image is displayed.

Further, the digital still camera 1 reproduces the image data which is recorded in the memory card 40 and enables the image to be displayed on the display section 33.

To this end, the controller 27 designates image data and commands data reading from the memory card 40 with respect to the media controller 26. In response to this command, the media controller 26 accesses an address on the memory card 40 in which the designated image data is recorded to perform the data reading, and transmits the read data to the encoder/decoder 25.

The encoder/decoder 25 extracts, for example, actual data as compression still image data from the captured image data which is transmitted from the media controller 26 under the control of the control section 27, and performs a decoding process with respect to the compression coding, with respect to the compression still image data, to thereby obtain the captured image data corresponding to the single still image. Then, the captured image data is transmitted to the display driver 32. Thus, in the display section 33, images of the captured image data which is recorded in the memory card 40 are reproduced and displayed.

With respect to the display section 33, a user interface image (manipulation image) may be displayed, in addition to the moving image, the reproduction image of the image data and the like. In this case, for example, the controller 27 generates display image data which is a predetermined user interface image according to the operation state, and outputs the generated display image data to the display driver 32. Accordingly, the user interface image can be displayed through the display section 33. Further, the user interface image can be displayed on a display screen of the display section 33, independently of a monitor image such as a specific menu screen or the reproduction image of the captured image data, and can be displayed to be overlapped and combined with a part of the monitor image or the reproduction image of the captured image data.

For example, the controller 27 is actually provided with a CPU, and forms a microcomputer in cooperation with a ROM 28, a RAM 29 and so on. For example, a program that is to be executed by the CPU which is the controller 27, and various setting information or the like relating to the operation of the digital still camera 1 are stored in the ROM 28. The RAM 29 serves as a main storage device for the CPU.

Further, the flash memory 30 in this case is installed as a non-volatile storage space for use in recording the various setting information or the like which is used for change (rewrite) according to user manipulation, operation history or the like. Further, with respect to the ROM 28, for example, in a case where a non-volatile memory including the flash memory is employed, a part of a storage space in the ROY 28 other than the flash memory 30 may be used.

The manipulation section 31 represents in a batch a variety of manipulators which is provided in the digital still camera 1, and a manipulation information signal output portion which generates a manipulation information signal according to manipulation which is performed with respect to the manipulators and outputs the generated manipulation information signal to the CPU. The controller 27 performs a predetermined process according to the manipulation information signal which is input from the manipulation section 31. Thus, an operation of the digital still camera 1 according to the user manipulation is performed.

The voice output section 35 is a section which outputs an electric sound with a predetermined tone and pronunciation pattern for notifying, for example, a predetermined content under the control of the controller 27.

An LED section 36 is provided with an LED (Light Emitting Diode) which is externally installed in a front surface part of a casing of the digital still camera 1, and a circuit or the like for driving the LED for lighting, and turns on and off the LED under the control of the controller 27. A predetermined content notification is performed according to the pattern of turning on and off the LED.

A camera platform corresponding communication section 34 performs communication according to a predetermined communication method between the camera platform 10 and the digital still camera 1. The camera platform corresponding communication section 34 includes a configuration of a physical layer for enabling transmission and reception of a communication signal in a wired or wireless manner with respect to a communication section of the camera platform 10, for example, in a state where the digital still camera 1 is mounted to the camera platform 10, and a configuration for realizing a communication process corresponding to a predetermined layer which is positioned above the physical layer. As the above described physical layer configuration, there is provided a portion of a connector which is connected with the connector 14 as shown in FIG. 2.

1-3. Camera Platform

Figure 7:
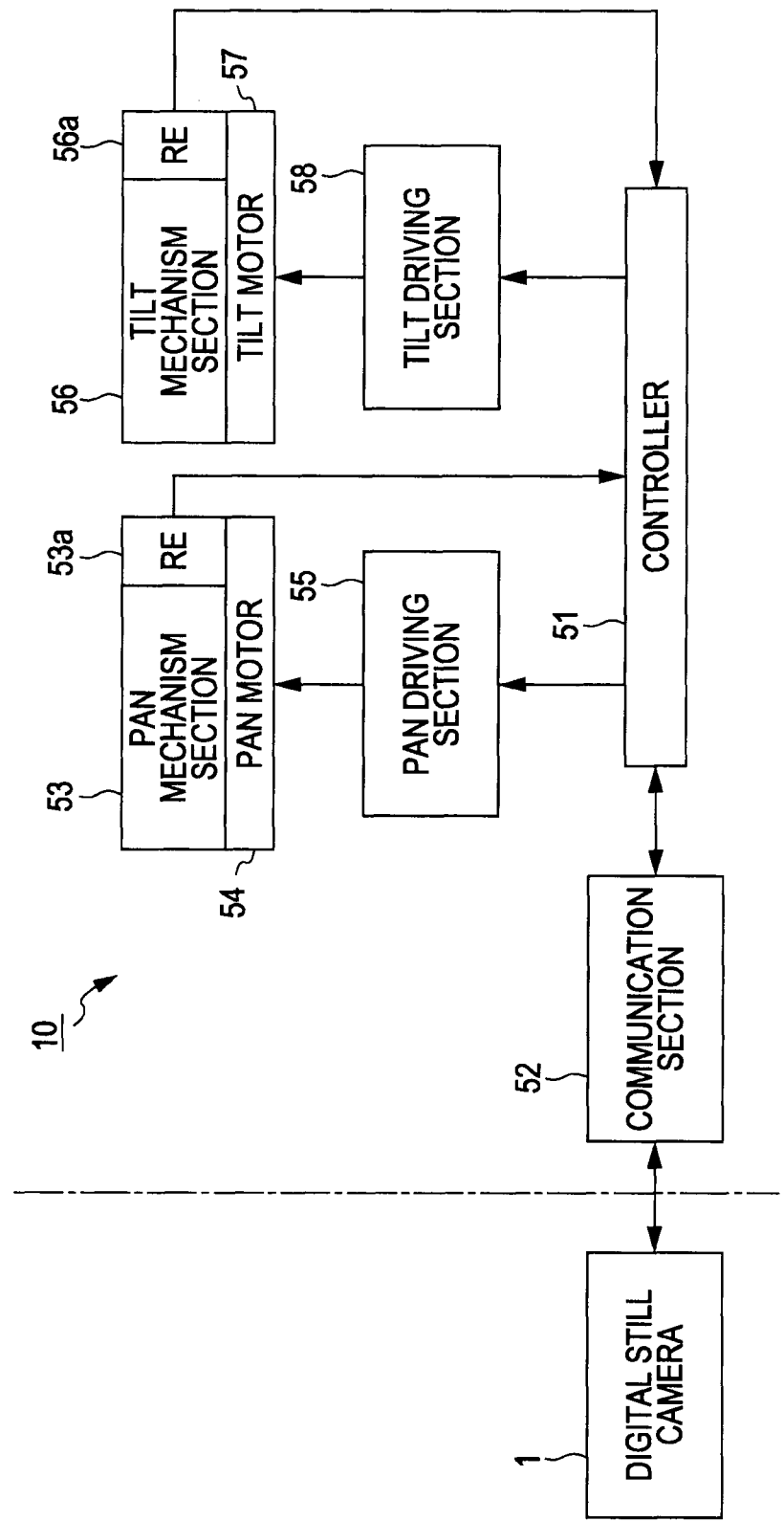
FIG. 7 is a block diagram illustrating an example of a configuration of a platform.

FIG. 7 is a block diagram illustrating an internal configuration example of the camera platform 10.

As described above, the camera platform 10 includes a pan-tilt mechanism, and includes a pan mechanism section 53, a pan motor 54, a tilt mechanism section 56 and a tilt motor 57.

The pan mechanism section 53 includes a mechanism for providing a movement in the pan (horizontal, left and right) direction as shown in FIG. 4, with respect to the digital still camera 1 which is mounted on the camera platform 10, and the movement of the mechanism is obtained as the pan motor 54 rotates in a forward or reverse direction. Similarly, the tilt mechanism section 56 includes a mechanism for providing a movement in the tilt (vertical, up and down) direction as shown in FIG. 5B, with respect to the digital still camera 1 which is mounted on the camera platform 10, and the movement of the mechanism is obtained as the tilt motor 57 rotates in a forward or reverse direction.

A controller 51 is provided with a microcomputer which is formed, for example, by combination of a CPU, a ROM, a RAM or the like, and controls the movements of the pan mechanism section 53 and the tilt mechanism section 56. For example, when controlling the movement of the pan mechanism section 53, the controller 51 outputs a signal indicating a movement target direction and speed to a pan driving section 55. The pan driving section 55 generates a motor driving signal corresponding to the input signal and outputs the generated signal to the pan motor 54. The motor driving signal becomes a pulse signal corresponding to a PWM control, for example, if the motor is a stepping motor.

The pan motor 54 rotates, for example, in a predetermined rotation direction and speed in response to the motor driving signal, and as a result, the pan mechanism section 53 is driven to move in a corresponding movement direction and speed.

Similarly, when controlling the movement of the tilt mechanism section 56, the controller 51 outputs a signal indicating a movement target direction and speed necessary for the tilt mechanism section 56 to a tilt driving section 58. The tilt driving section 58 generates a motor driving signal corresponding to the input signal and outputs the generated signal to the tilt motor 57. The tilt motor 57 rotates in a predetermined rotation direction and speed in response to the motor driving signal, and as a result, the tilt mechanism section 56 is driven to move in a corresponding movement direction and speed.

Further, the pan mechanism section 53 includes a rotary encoder (rotation detector) 53a. The rotary encoder 53a outputs, according to the rotation movement of the pan mechanism section 53, a detection signal indicating the amount of the rotation angle to the controller 51. Similarly, the tilt mechanism section 56 includes a rotary encoder 56a. The rotary encoder 56a outputs, according to the rotation movement of the tilt mechanism section 56, a signal indicating the amount of the rotation angle to the controller 51.

The communication section 52 is a section which performs communication according to a predetermined communication method with respect to the camera platform corresponding communication section 34 in the digital still camera 1 which is mounted on the camera platform 10, and in a similar way to the camera platform corresponding communication section 34, a configuration of a physical layer for enabling transmission and reception of a communication signal in a wired or wireless manner with respect to a communication section of the other party, and a configuration for realizing a communication process corresponding to a predetermined layer which is positioned above the physical layer. As the above described physical layer configuration, there is provided the connector 14 of the camera mounting section 12 as shown in FIG. 2.

2. Example of Functional Configuration Corresponding to Composition Control According to an Embodiment FIG. 8 is an example of a configuration with respect to a functional section corresponding to composition control according to an embodiment of the invention, which is included in the digital still camera 1.

Figure 8:
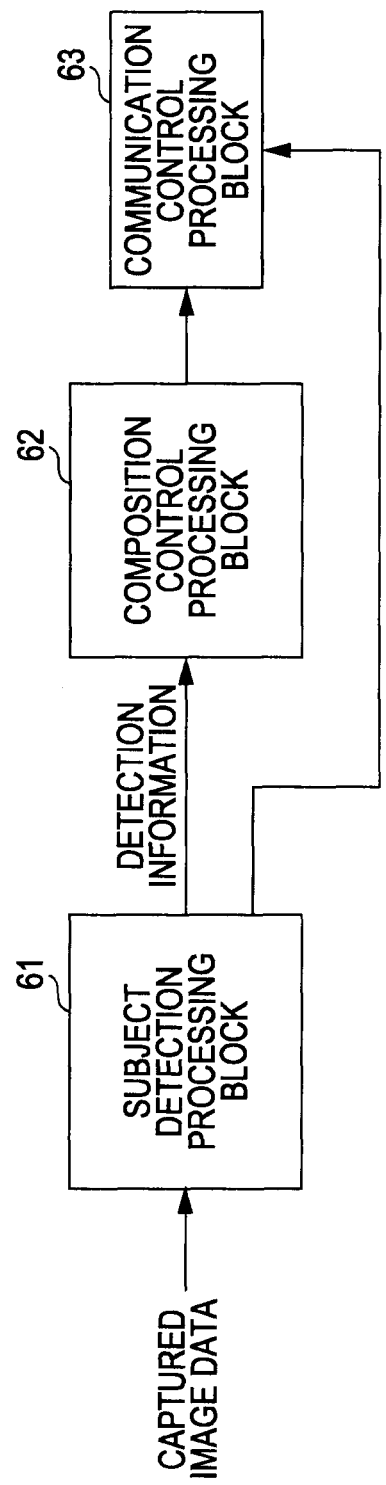
FIG. 8 is a block diagram illustrating a function corresponding to a composition control of a digital still camera according to an embodiment of the invention.

In FIG. 8, a subject detection processing block 61 is a section which performs a subject detection process including search control of a subject, using the captured image data which is obtained by the signal processing section 24 on the basis of the imaging signal which is obtained by the image sensor 22. In this respect, the subject detection process refers to a process for discriminating and detecting a subject which is a person from image contents in a screen of captured image data.

Further, information (detection information) obtained as the detection result includes the number of the subjects of persons, position information about every subject (individual subject) in the screen, the size (occupied volume) of the individual subject in the image, or the like.

In addition, in this embodiment, a face direction (subject direction information) for the individual subject is also obtained as the detection information. In this respect, the face direction is a direction to which the individual subject of a person is directed, which is indicated by a direction to which the face of the subject is directed, in the screen of the captured image data.

Moreover, in the detection of the face direction, the degree of a direction which the face of the subject faces may be detected in multiple stages with a predetermined resolution. However, hereinafter, for the simplicity of description, the detection of the face direction may be obtained from any detection result of two stages of left and right sides, and three stages of left, front and right sides. In the case where the detection is performed in two stages of the left and right sides, for example, even though it seems that the subject faces approximately the front side, the detection should be classified into any detection result of the left and right sides according to a predetermined algorithm.

Further, in this embodiment, as the detection information due to the subject detection process, a rotation angle of the face (face rotation angle) can be also detected. The face rotation angle and a detection method thereof will be described later.

A face detection technique may be used as a specific method of the subject detection process. There are several methods, techniques for face detection, but the face detection methods are not particularly limited, and a proper method may be employed in consideration of the detection accuracy, the design difficulty level or the like.

Further, in application of the face detection technology, the face direction may be detected. For example, if the face detection process is performed by pattern recognition using features such as eyes, a nose or the like, the face direction can be recognized by the position and distance relationship between the features in the detected entire face.

Further, when the direction, to which the individual subject of a person is directed, is detected, for example, if there is a useful method for detecting the direction of a body part or a neck line, other than the application of the above described face detection technique, the method may be employed. That is, an appropriate method, algorithm or the like including existing techniques for detecting the direction which the individual subject faces (subject direction), such as a face direction detection, may be employed.

In addition, the subject detection process which is performed by the subject detection processing block 61 may be realized as an image signal process in the signal processing section 24. As described above, in a case where the signal processing section 24 is provided as a DSP, the subject detection process is realized by a program or an instruction which is provided to the DSP which is the signal processing section 24.

Moreover, when the subject search control is performed, the control signal for driving the pan-tilt mechanism is output through a communication control processing block 63, in order to control the pan-tilt mechanism of the camera platform 10.

Detection information which is the subject detection processing result of the subject detection processing block 61 is input to the composition control processing block 62.

The composition control processing block 62 determines composition (optimal composition) which is considered as an optimal state, using the detection information about the input subject. Further, control (composition control) for obtaining the determined optimal composition is performed. In this case, the composition control includes a change control of the field angle (a view angle which is capable of being changed by controlling the zoom lens, in this embodiment, for example), an imaging direction control along the pan (left and right) direction (pan control), and an imaging direction control along the tilt (up and down) direction. In order to change the field angle, any one of a zoom lens moving control in the optical system 21 of the digital still camera 1 and an image signal process such as image cutting or the like for the captured image data is performed. Further, the pan control or the tilt control is performed by controlling and moving the pan-tilt mechanism of the camera platform 10. When the control of the pan-tilt mechanism is performed, the composition control processing block 62 transmits a control signal for setting the pan-tilt mechanism in an appropriate position state to the camera platform 10 through the communication control processing block 63.

Further, the processes of the composition determination and the composition control which are performed by the composition control processing block 62 may be performed, for example, on the basis of programs by the controller 27 (CPU). Alternatively, a process which is performed on the basis of programs by the signal processing section 24 may be performed together. Moreover, the communication control processing block 63 is a section which is configured so that a communication process with respect to the communication section 52 of the camera platform 10 is performed according to a predetermined protocol, which becomes a functional section corresponding to the camera platform corresponding communication section 34.

3. Composition Control According to Face Direction and the Number of Subjects (First Example)

Figure 9A:
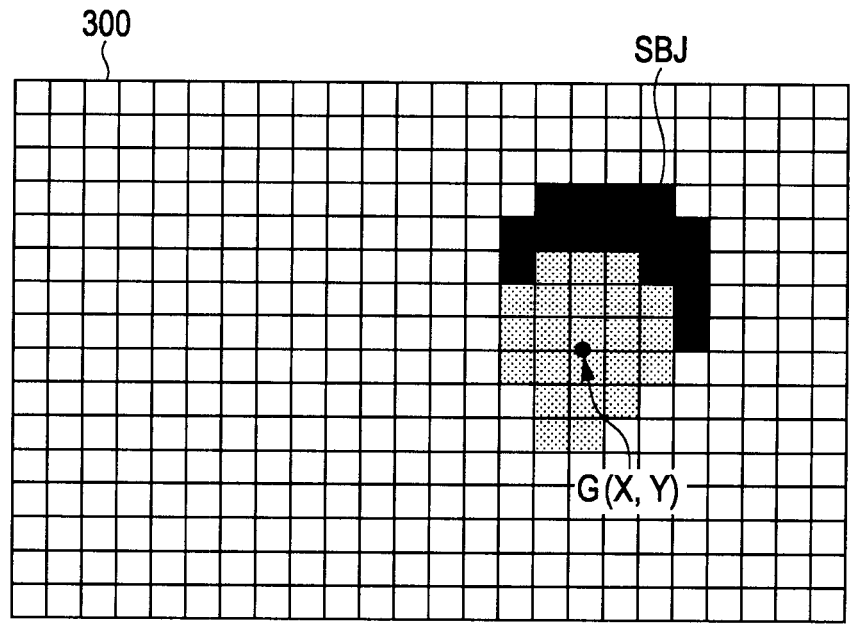
FIGS. 9A and 9B are diagrams illustrating the gravity center of an individual subject, and the total gravity center with respect to the plurality of individual subjects.
Figure 9B:
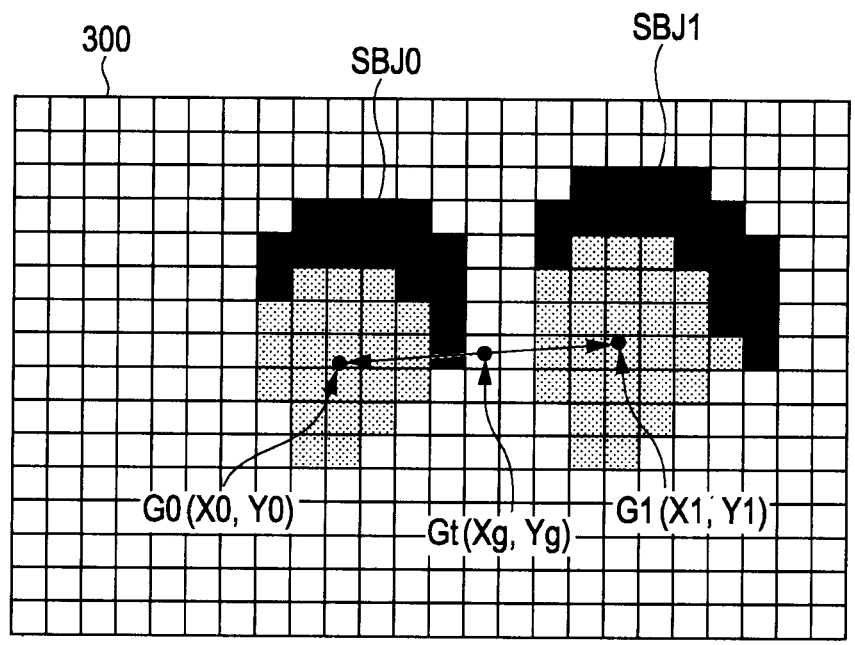

Next, a first example of the composition control will be described. The composition control according to the first example is performed to change composition according to a face direction and the number of subjects, which will be described hereinafter. FIGS. 9A and 9B schematically illustrates an example of a subject detection process which is performed by the subject detection processing block 61 in response to the composition control according to the first example.

In this respect, the subject detection processing block 61 is configured to import captured image data of an image content of an image frame 300 as shown in FIG. 9A. The image content of the captured image data is obtained by capturing an image in which a single subject which is a human being exists. FIG. 9A (and FIG. 9B) illustrates a state where one screen is divided in a matrix format, and schematically illustrates a case where the screen which is the captured image data is formed with a set of a predetermined number of horizontal and vertical pixels.

As the subject detection (face detection) is performed with respect to the captured image data of the image content as shown in FIG. 9A, a face of one individual subject SBJ, which is the detected subject, as shown in FIG. 9A is detected. That is, as one face is detected by the face detection process, one individual subject is detected. Further, in this way, as described above, information about the number, direction, position and size of the individual subject may be obtained as the detection result of the individual subject.

In addition, for example, the number of the individual subjects may be obtained by calculating the number of faces which is detected by the face detection. In the case as shown in FIG. 9A, since the detected face is one, the number of the individual subjects is one.

Further, the position information for every individual subject is obtained by calculating at least a gravity center $G(X,Y)$ of an individual subject SBJ in the image which is the captured image data.

Figure 10:
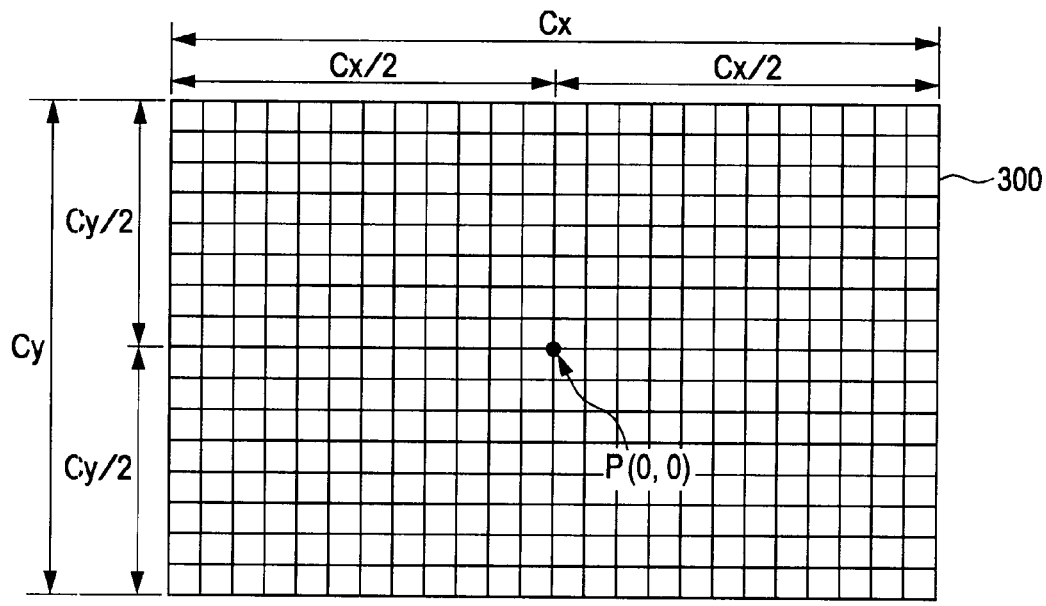
FIG. 10 is a diagram illustrating origin coordinates which are set on a screen of captured image data.

Further, in this case, X-Y origin coordinates $P(0,0)$ on the screen of the captured image data which becomes a reference of the gravity center $G(X,Y)$ is an intersection of a vertical line passing a midpoint of the width Cx (horizontal image size) of an X axis direction (horizontal direction) corresponding to the screen size of the image frame 300 and a horizontal line passing a midpoint of the width Cy (vertical image size) of an Y axis direction (vertical direction), for example, as shown in FIG. 10.

As a definition method of the position in the image of the individual subject with respect to the gravity center G and a setting method of the gravity center G, for example, existing subject gravity center detection methods may be employed.

Moreover, the size for every individual subject may be obtained by calculating the number of pixels in an area which is specified and detected as a face section, for example, by the face detection process.

Further, as described above, with respect to the face direction for every individual subject, any one of two stages of left and right sides, or any one of three stages of left, front and right sides is detected on the basis of the face detection process.

If the subject detection process block 61 performs the subject detection process by importing the captured image data as shown in FIG. 9B, firstly, it is specified that two faces exist by the face detection, to thereby obtain the result that the number of the individual subjects is two. In this respect, the left side of the two individual subjects is recognized as an individual subject SBJ0, and the right side thereof is recognized as an individual subject SBJ1. Further, coordinates of the gravity center which is calculated for each of the individual subjects SBJ0 and SBJ1 are indicated as G0(X0, Y0) and G1(X1, Y1), respectively.

Further, in this way, in a case where two or more individual subjects are detected, a total subject gravity center Gt(Xg,Yg) which is the center of gravity in a case where the plurality of individual subjects is considered as a group of subjects (total subjects) is calculated.

There are several methods for setting the total subject gravity center Gt, but as the simplest example, a midpoint on a line segment which connects the gravity centers of the individual subjects which are positioned in opposite sides of the leftmost side and the rightmost side of a screen, among the detected individual subjects, may be set as the total subject gravity center Gt. For example, as described later, the total subject gravity center Gt is information which can be used for the composition control, and is information which is calculated by operation, if the information on the gravity centers of the individual subjects is obtained. Accordingly, the total subject gravity center Gt is calculated by the subject detection processing block 61 and may be output as the detection information, but the composition control processing block 62 may calculate the total subject gravity center Gt using information about the individual subjects which are positioned in the leftmost and rightmost sides, from information indicating positions of the gravity centers of the individual subjects which is obtained as the detection information.

In addition, for example, a setting method may be employed, in which a weighting coefficient is provided according to the size of the plurality of individual subjects, and the position of the total subject gravity center Gt is arranged to be close to, for example, a large individual subject using the weighting coefficient.

Further, the size of the individual subject may be obtained, for example, by calculating the number of pixels which is occupied by the detected face with respect to each of the individual subjects SBJ0 and SBJ1.

Subsequently, composition which is obtained by the composition control according to the first example of the present embodiment will be described with reference to FIGS. 11 to 13.

Figure 11:
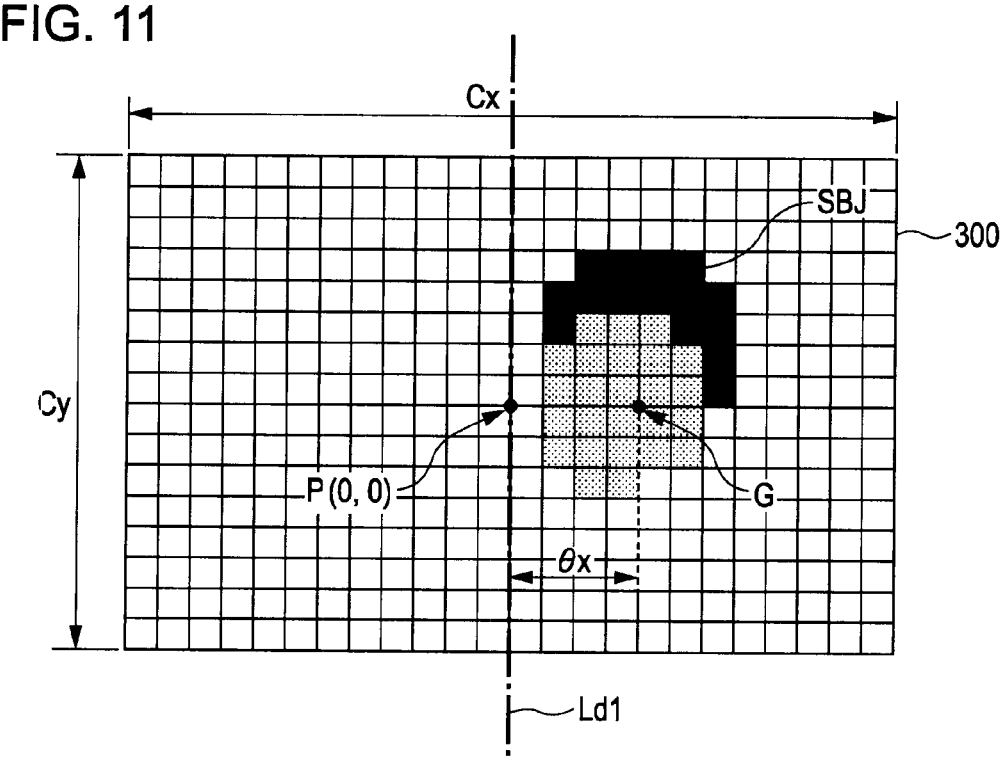
FIG. 11 is a diagram schematically illustrating an example of a composition control in a case where the number of individual subjects is one, in a composition control according to a first example.

FIG. 11 illustrates the image frame 300, in a case where an image content in which a single individual subject SBJ is imaged as captured image data at the time when the subject is detected, is obtained as the result of subject search.

Further, in this embodiment, in the case where the digital still camera 1 is generally mounted on the camera platform 10, an image which is horizontally long is captured, and thus, the direction of the digital still camera 1 is set. Thus, it is presumed that the image which is horizontally long by imaging in the first example, and in a second example, a third example and a fourth example which will be described later.

As shown in FIG. 11, in a case where one individual subject is detected, the size of the individual subject is changed so that the occupancy in the screen of the captured image data of the individual subject SBJ becomes a predetermined value which is considered as an optimal value. For example, in a stage where the individual subject is detected, in a case where the occupancy in the screen of the individual subject is smaller than the predetermined value, a zoom control is performed to narrow a field angle so that the occupancy of the individual subject is increased up to the predetermined value.

In addition, in a case where the occupancy in the screen of the individual subject is larger than the predetermined value, the zoom control is performed to enlarge the field angle so that the occupancy of the individual subject is decreased up to the predetermined value. With such a zoom control, as the composition, the size of the subject, in the case where the detected individual subject is one, becomes appropriate.

Next, the position of the subject (subject position) on the screen in the case where the detected individual subject is one is adjusted as follows.

The subject position uses information on the detected face direction. The individual subject SBJ as shown in FIG. 11 represents a case where it is detected that the face direction is the left side. At this time, when the screen of the image content as shown in FIG. 11 is actually viewed to a user, it seems that a face of the individual subject SBJ in the screen is directed to the left side. That is, in a state where a direction opposite to the imaging device which performs the imaging is the front side, an actual person who is the individual subject SBJ is directed to the right side in reality.

Further, in the subject position adjustment, a vertical image area division line Ld1 is virtually set, which is a vertical line passing through the origin coordinates P(0,0) in the image, that is, a straight line which coincides with the Y axis line, and serves as a reference line of the subject position adjustment.

Moreover, in this way, in a case where the face direction is detected as the left side, the gravity center G of the individual subject SBJ is arranged in a position (horizontally shifted position) where the gravity center G of the individual subject SBJ is moved from a position (X=0) corresponding to the vertical image area division line Ld1 to the right direction, by a movement amount which is indicated by a horizontal offset amount θx. To this end, the gravity center G is disposed in the horizontal shift position, and then, control is performed so that the pan mechanism of the camera platform 10 is driven.

Generally, composition in which the subject is positioned in the center of the screen is a typical example of an undesirable composition. Thus, the position of the subject may be shifted from the center of the screen according to a specific rule such as a three-part division or a golden rule division, to thereby obtain a desirable composition. In this embodiment, according to such a composition determination method, the position (gravity center G) of the individual subject SBJ is horizontally moved in the screen by a predetermined amount (horizontal offset amount θx) with respect to the center of the screen.

Moreover, in this embodiment, as shown in FIG. 11, if the face direction of the detected individual subject is the left side, the position of the gravity center G in the horizontal direction is located in the image area in the right side which is opposite to the left side indicated by the face direction, among the image areas (division areas) of the left and right sides which are two-part-divided by the vertical image area division line Ld1 along the Y axis line, and thus, a space is obtained in the left side which is a direction where the face of the individual subject SBJ is directed in the screen. With such a composition, more preferable composition can be obtained, for example, compared with a case that the gravity center G of the individual subject SBJ where the face direction is the left side is located in the subject position corresponding to (coinciding with) the center of the screen in the left and right direction, or a case that the gravity center G is located in the image area of the left side with respect to the vertical image area division line Ld1.

There may be provided various algorithms for determining a real value which is the horizontal offset amount θx in this embodiment, but here, the three-part division is employed. The three-part division is one of the basic composition setting methods, and obtains a preferable composition by disposing the subject on virtual lines which trisect a rectangular screen along the vertical direction and the horizontal direction, respectively.

For example, in FIG. 11, among two virtual lines along the screen longitudinal direction which trisect a size Cx of a horizontal image, the gravity center G is positioned in the virtual line of the right side, and thus, the horizontal offset amount θx is set. Thus, one optimal composition is obtained as the subject position in the horizontal direction, according to the face direction of the individual subject.

Further, although not shown, in a case where the face direction of the detected individual subject SBJ is detected as the right side, the gravity center G of the individual subject SBJ is located in a horizontal position which becomes line-symmetric with reference to the vertical image area division line Ld1 with respect to the position as shown in FIG. 11. That is, in this case, a value which is obtained by inverting the positivity or negativity of the real value in FIG. 11 is set as the horizontal offset amount θx, and the pan control is performed on the basis of the horizontal offset amount θx.

Figure 12A:
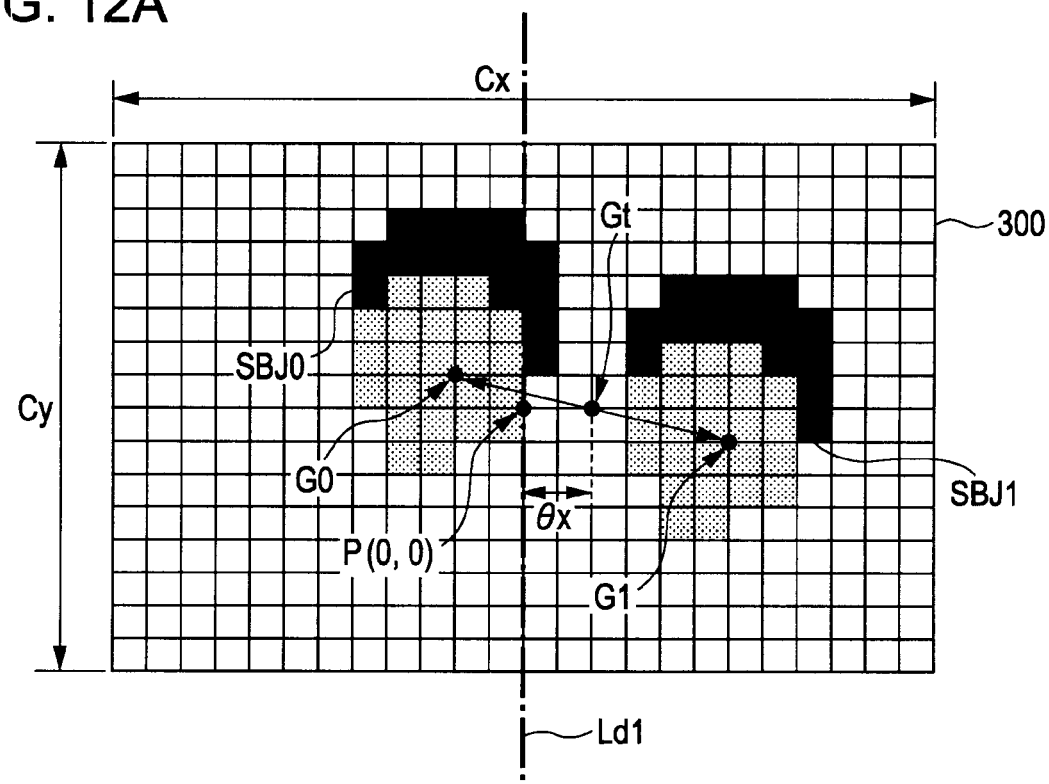
FIGS. 12A and 12B are diagrams schematically illustrating an example of a composition control in a case where the number of individual subjects is two, in a composition control according to the first example.

Further, as shown in FIG. 12A, in the image frame 300, in a case where two individual subjects SBJ0 and SBJ1 are detected as the detected subjects, with respect to the size of a total subject image section which is formed with a set of image sections of the individual subjects SBJ0 and SBJ1 (for example, the size may be provided as the occupancy of the subject image section with respect to the total screen), for example, adjustment (zoom control) is performed as the composition control to obtain an optimal value which is set corresponding to a case where the number of the individual subjects is two.

As an example of a variety of methods of defining the total subject image section and of calculating the size thereof, for example, a method of summing the sizes of the image sections for the respective detected individual sections may be employed. Alternatively, a method of calculating the size of an image section which is surrounded by a virtual line in which all the plurality of individual subjects is included may be employed.

Further, the subject position of the two individual subjects SBJ0 and SBJ1 in the horizontal direction is obtained using information on the face directions for the two individual subjects SBJ0 and SBJ1.

The face directions of the two individual subjects SBJ0 and SBJ1 in FIG. 12A are detected as the left side. That is, the face directions of the two individual subjects are the same, and the face directions thereof are the left side in this case.

In this case, in a similar way to the case where the face direction of one individual subject SBJ is the left side, as shown in FIG. 11, the total subject image section which includes the individual subjects SBJ0 and SBJ1 is shifted toward the right side of the vertical image area division line Ld1, which is opposite to the left side indicated by the face direction, so as to create space in the left side of the screen. To this end, for example, as shown in the figure, the horizontal offset amount θx for the shift of a predetermined amount is set in the right side, and then, the pan control is performed so that the total subject gravity center Gt which is the gravity center of the total subject image section which includes the two individual subjects SBJ0 and SBJ1 is disposed in a position which is moved by the horizontal offset amount θx from the vertical line (Y axis line) passing through the origin coordinates P(0,0), which is the vertical image area division line Ld1.

Further, although not shown, in a case where the face directions of two individual subjects SBJ0 and SBJ1 are all the sane right side, with respect to the position as shown in FIG. 12A, the pan control is performed so that the total subject gravity center Gt is disposed in a position which is line-symmetric with reference to the vertical image area division line Ld1 (position which is moved by an absolute value of the same horizontal offset amount θx in the image area of the left side with reference to the Y axis line).

As described above, in the case where the number of individual subjects is plural, if the horizontal offset amount θx which becomes optimal in the case where the number of the individual subject is one is set, composition having impression which is excessively leaning on the right side (or left side) is likely to be obtained. Thus, in the case where the number of the individual subjects is two as shown in FIG. 12A, the horizontal offset amount θx is set, according to a predetermined rule, as a value (absolute value) smaller than that in the case where the number of the individual subjects is one, as shown in FIG. 11.

Figure 12B:
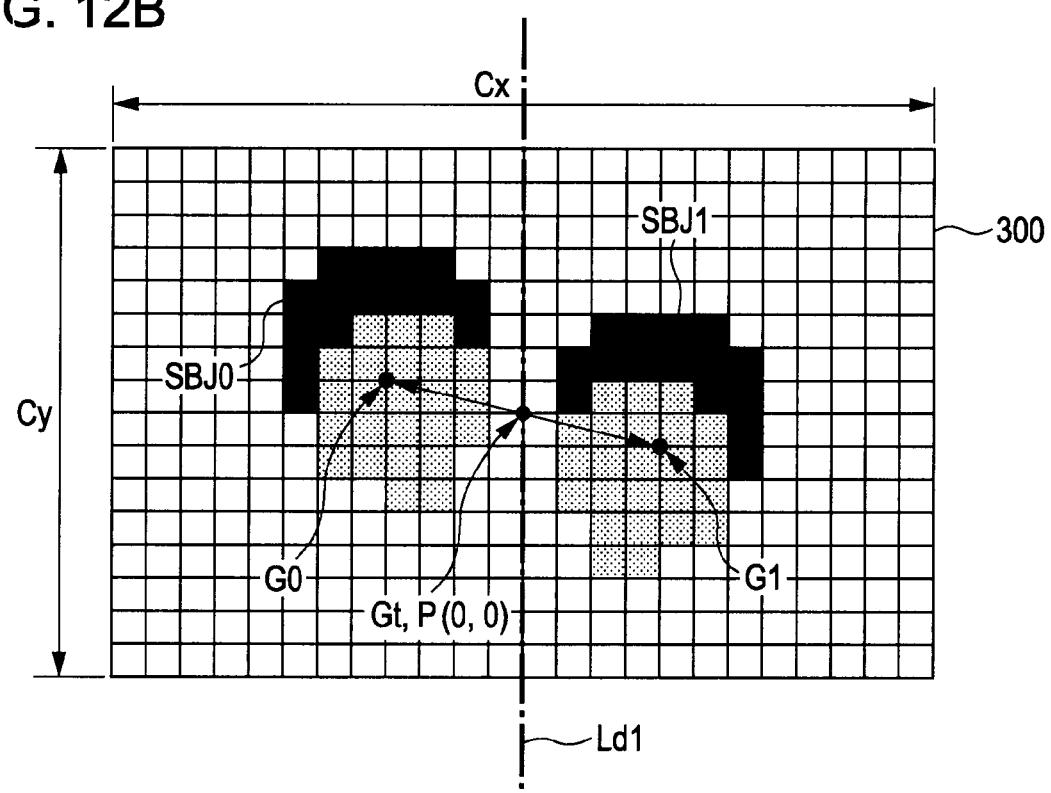

Further, FIG. 12B illustrates a case where the detected face directions of the two individual subjects SBJ0 and SBJ1 are directed to the left and right sides, respectively, which illustrates a case where the respective face directions thereof are different from each other, in the case where the number of the individual subjects is two.

In this case, as shown in the figure, with respect to the position of the total subject image section in the horizontal direction, the adjustment (pan control) is performed so that the total subject gravity center Gt of the two individual subjects SBJ0 and SBJ1 is located on the vertical image area division line Ld1.

In the composition obtained in this way, the total subject image section which includes the two individual subjects SBJ0 and SBJ1 is located in approximately the center of the screen in the horizontal direction. However, in the case of the image in which the number of the subjects is plural and the subjects are not directed to the same direction, even through the total subject image section is disposed in the center, the composition becomes good correspondingly.

Figure 13:
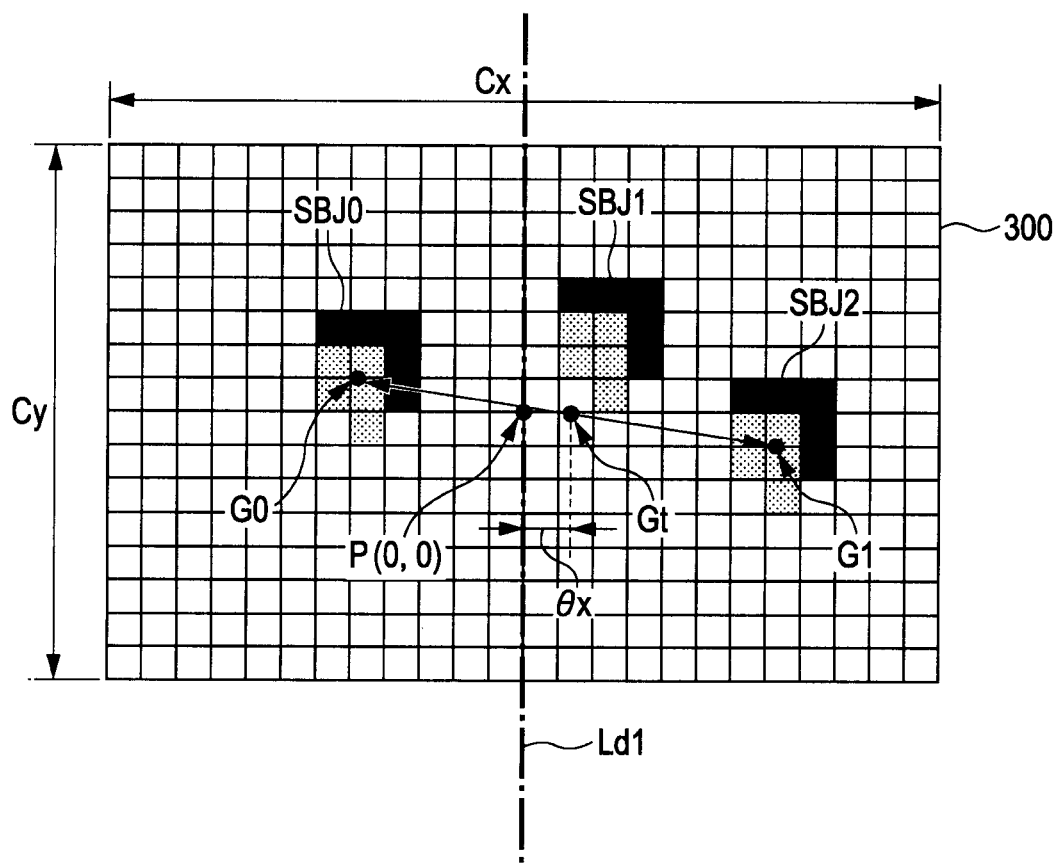
FIG. 13 is a diagram schematically illustrating an example of a composition control in a case where the number of individual subjects is three, in a composition control according to the first example.

Further, FIG. 13 illustrates a case where three individual subjects SBJ0, SBJ1 and SBJ2 are detected in the image frame 300 as the detected subjects.

With respect to the composition control in this case, firstly, the adjustment (zoom control) is performed so that the size of a total subject image section which includes the individual subjects SBJ0, SBJ1 and SBJ2 is adjusted to become a value which is optimally set to correspond to a case where the number of the individual subjects is three.

In addition, in this case, the position of the total subject image section in the horizontal direction is obtained by using information about a face direction which is detected for every individual subject. In FIG. 13, face directions of the three individual subjects SBJ0, SBJ1 and SBJ2 are all the same, which are directed to the left side.

In this case, in a similar way to the case as shown in FIG. 12A, in order to shift the image section which includes the individual subjects SBJ0, SBJ1 and SBJ2 to the right image area with reference to the vertical image area division line Ld1, the pan control is performed so that the horizontal offset amount θx is set and the total subject gravity center Gt is moved to a predetermined position which is determined according to the horizontal offset amount θx. Further, if the face directions of the three individual subjects SBJ0, SBJ1 and SBJ2 are all the same, which are directed to the right side, the pan control is performed so that the total subject gravity center Gt is disposed in a horizontal position which is line-symmetric with reference to the vertical image area division line Ld1, with respect to the position as shown in FIG. 13.

In this case, the horizontal offset amount θx is set to have a small absolute value, compared with the case where the number of the detected individual subjects is two as in FIG. 12A. Accordingly, the horizontal position of the subjects is set in a more optimized manner, for example, corresponding to the case where the number of the individual subjects is three, to thereby obtain good composition.

Further, in the composition control according to the first example, in a case where the face directions of the three individual subjects SBJ0, SBJ1 and SBJ2 are not the same, a composition in which the total subject gravity center Gt is positioned in the vertical image area division line Ld1 (Y axis line) is obtained, in a similar way to the case in FIG. 12B.

As can be understood from the above description, in the composition control according to the first example, the position adjustment in the horizontal direction is firstly performed corresponding to the face direction which is detected for every individual subject. That is, in a case where the number of the individual subject is one, as the most basic control, according to whether the face direction which is detected from the individual subject is the right side or the left side, the gravity center G (total subject gravity center Gt) is positioned to be shifted by a predetermined amount with respect to the right area or the left area of the vertical image area division line Ld1 (Y axis line) (a horizontal offset of the gravity center G is performed), to thereby create space in a direction where the subject in the image is directed.

In addition, in the case where the number of the individual subjects is plural (two or more), if the face directions of the individual subjects are all the same, the horizontal offset of the total subject gravity center Gt is performed as in the above described position adjustment; and if the face directions of the individual subjects are not the same, the horizontal offset is not performed, and the total subject gravity center Gt is given the X coordinate corresponding to the vertical image area division line Ld1, so that the total subject image section is positioned in approximately the center of the imaging screen.

In this respect, when the horizontal offset of the total subject gravity center Gt (the gravity center G is considered as the total subject gravity center Gt in the case where the number of the individual subjects is one) is performed, the horizontal offset amount θx is changed according to the number of the individual subjects, as described with reference to FIGS. 11 to 13. Accordingly, the horizontal position of the total subject image section in the screen can be obtained in an optimized manner according to the number of the individual subjects.

Figures 14, 14A, 14B:
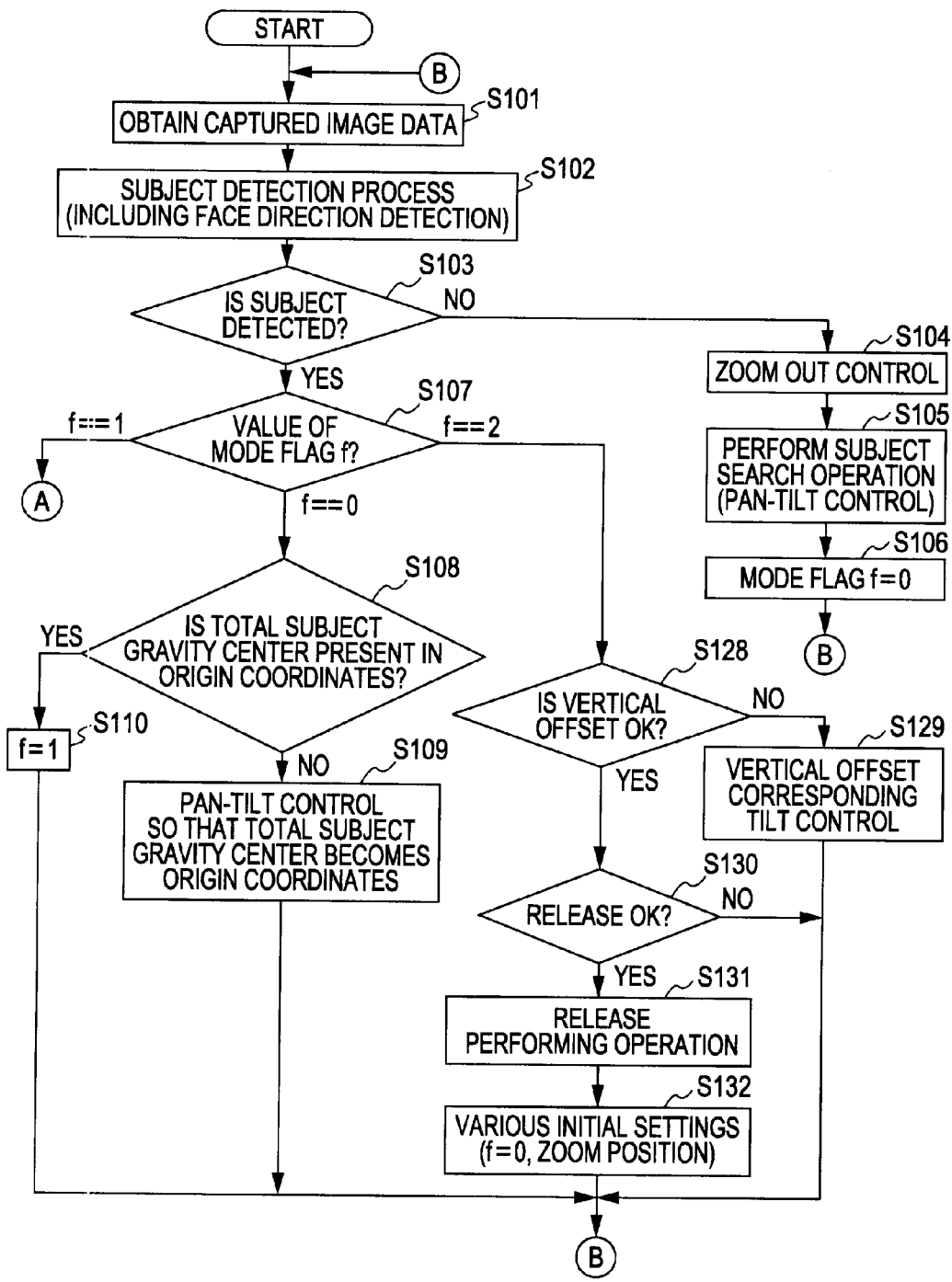
FIG. 14 is a flowchart illustrating an example of a procedure for a composition control according to the first example.
Figure 14B:
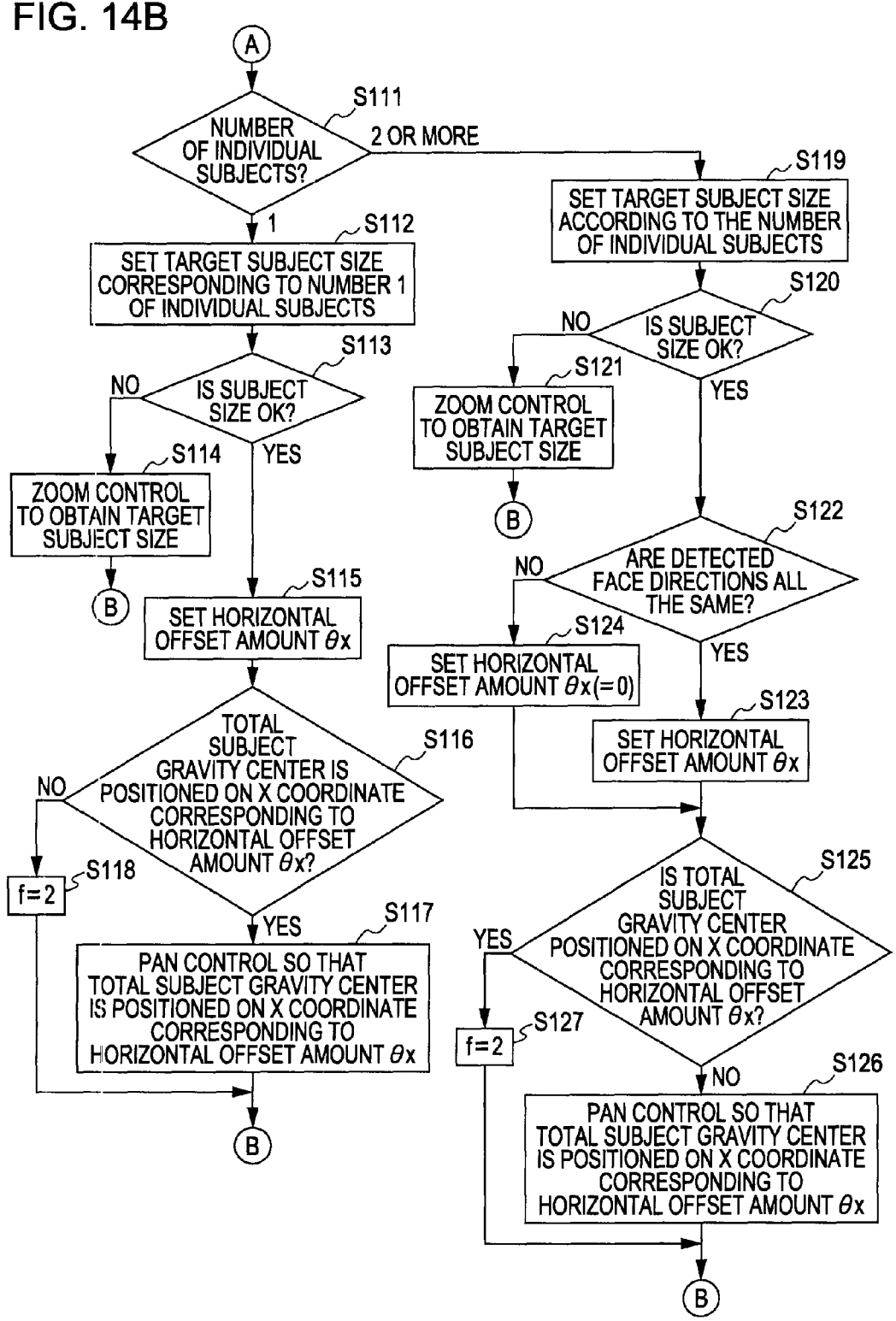

FIG. 14 illustrates an example of the procedure of performing the subject detection processing block 61, the composition control processing block 62 and the communication control processing block 63, as shown in FIG. 8, corresponding to the composition control according to the first example as described with reference to FIGS. 11 to 13. In this respect, the processes as shown in this figure may be realized by the signal processing section 24 which is the DSP and by execution of a program by means of the CPU of the controller 27. Such a program may be written and stored, for example, in a ROM or the like at the time of manufacturing or the like, or may be stored in a removable storage medium and then may be installed (including updating) from the removable storage medium to a non-volatile storage area corresponding to the DSP, the flash memory 30 or the like, for storage. Alternatively, the program installation may be performed under the control of other host devices, through a data interface such as a USB or IEEE 1394. Alternatively, the program may be stored in a storage device of a server or the like on a network, and then may be downloaded from the server, by providing a network function to the digital still camera 1.

Hereinafter, in the description of the flowchart, the above mentioned terms "total subject gravity center (Gt)" and "total subject image section" are applied to the case where the number of the detected individual subjects is two or more, and are also applied to the case where the number of the detected individual subject is one. That is, for example, the gravity center G as shown in FIG. 11 becomes the total subject gravity center Gt in the case where the number of the detected individual subject is one, and the image section which includes only the individual subject SBJ in FIG. 11 becomes the total subject image section in the case where the number of the detected individual subject is one.

Firstly, steps S101 to S106 are the procedure of searching and detecting a subject and are mainly performed by the subject detection processing block 61.

In step S101, captured image data is imported and obtained on the basis of an imaging signal from the image sensor 22. In step S102, a subject detection process is performed using the captured image data obtained in step S101. In the subject detection process, firstly, it is detected whether an individual subject is present in an image content which is the captured image data, for example, using a technique such as face detection as described above. In a case where the individual subject is present, the number of the individual subjects, the position (gravity center) and size of each of the individual subjects, and a face direction for each of the individual subjects are obtained as detection information.

In step S103, a determination process is performed to determine whether the presence of the individual subject is detected on the basis of the result of the subject detection process in step S102. In this respect, in a case where a negative determination result that the presence of the individual subject is not detected is obtained (the number of the detected individual subjects is zero), the procedure goes to step S104 and performs a movement control (zoom out control) of the zoom lens for enlarging a field angle. In this way, the field angle is enlarged to image a wider range, and thus, it is easy to add the individual subject. Further, in step S105, a control (pan-tilt control) for moving the pan-tilt mechanism of the camera platform 10 is performed for the subject search. At this time, the subject detection processing block 61 transmits a control signal for the pan-tilt control to the communication control processing block 63 and transmits the control signal to the communication section 52 of the camera platform 10, to thereby perform the control.

Further, as the pan-tilt control for the subject search, a movement pattern of the pan-tilt mechanism of the camera platform 10 may be determined, for example, in consideration of an efficient search.

In addition, in step S106, a mode flag f is set to zero (f=0), and then, the procedure returns to step S101.

In this way, until at least one individual subject is detected in the image content of the captured image data, the procedure of steps S101 to S106 is repeated. At this time, the system including the digital still camera 1 and the camera platform 10 is in a state where the digital still camera 1 is moved in the pan direction and the tilt direction for the subject search.

Further, in a case where a positive determination result that the presence of the individual subject is detected in step S103 is obtained, the procedure goes to step S107 and after. The procedure of step S107 and after is mainly performed by the composition control processing block 62.

In step S107, a value which is set as the current mode flag f is discerned.

In a case where it is discerned that f==zero, the composition control represents a case where an optimal rough subject adding mode is to be performed, and the procedure starting from step S108 is performed as shown in the figure.

In step S108, a determination is performed whether the total subject gravity center Gt is positioned in the origin coordinates P(0,0) (see FIG. 10) in the screen of the captured image data (the screen obtained at the time of indicating the image content of the captured image data). In this respect, in a case where a negative determination result that the total subject gravity center Gt is yet not positioned in the origin coordinates is obtained, in step S109, the total subject gravity center Gt is positioned in the origin coordinates so that the control for moving the pan-tilt mechanism of the camera platform 10 is performed, and then, the procedure returns to step S101. In this way, in the adding mode which is the initial composition control procedure in the state where the presence of the individual subject is detected, the total subject gravity center Gt is firstly positioned in the origin coordinates which is an initial reference position to control the pan-tilt mechanism of the camera platform 10, and thus, an image area in which the detected individual subject appears is positioned in the center of the screen.

Further, an example of an algorithm is described for actually performing the pan-tilt control in step S109.

In a state where the individual subject is detected in the mode flag f==0, the subject detection processing block 61 calculates a movement target amount Span in the pan direction and a movement target amount Stilt in the tilt direction by performing operation indicated by the following formula 1. In the following formula 1, n represents the number of the detected individual subjects, and P(Xi,Yi) represents X,Y coordinates of the gravity center of the i-th individual subject, among individual subjects having numbers of 0 to (n−1). As shown in FIG. 7, in this case, the origin coordinates (0,0) is an intersection of a vertical line passing a midpoint in the screen in the horizontal direction and a horizontal line passing a midpoint in the screen in the vertical direction.

$$(S_{pan}, S_{tilt}) = \frac{\sum_{i=0}^{n-1} p(x_i, y_i)}{n} \quad \text{[Formula 1]}$$

For example, in step S108, by determining whether absolute values of the movement target amounts Span and Stilt obtained in the above described way are within a predetermined value (strictly speaking, 0, but may be a value larger than 0), a determination equivalent to the determination on whether the total subject gravity center Gt is present in the origin coordinates P can be performed. Further, in step S109, the pan-tilt control is performed so that the absolute values of the movement target amounts Span and Stilt are within the predetermined value. The speeds of the pan mechanism section 53 and the tilt mechanism section 56 at the time of the pan-tile control is preferable to be constant, but the speeds thereof may be varied, for example, may be increased as the movement target amounts Span and Stilt are increased. In this way, when the movement target amounts due to the panning or tilting are increased, the total subject gravity center Gt can be close to the origin coordinates for a relatively short time.

In addition, in step S108, in a case where a positive determination result that the total subject gravity center Gt is positioned in the origin coordinates is obtained, the mode flag f is set to one (f=1) in step S110, and then, the procedure returns to step S101. In state where the mode flag f is set to one in step S110, the adding mode which is the initial procedure in the composition control is completed, and a first composition adjustment control is performed.

Further, in the case where the mode flag f==1 and the first composition adjustment mode is to be performed, the procedure goes to step S111 from step S107. In the first composition adjustment mode, a zoom (field angle) adjustment and a pan control are performed for obtaining an optimal composition according to a combination of the number of the detected individual subjects and a face direction for each of the individual subjects. According to the filed angle adjustment and the pan control, the sizes of the individual subjects and the positions of the individual subjects in the screen are changed.

In step S111, the number of the currently detected individual subjects is determined, and if the number is one, the procedure starting from step S112 is performed.

In step S112, the size of a target subject corresponding to the case that the number of the detected individual subjects is one is set. The size of the target subject refers to a size which is considered as a compositionally optimal size of the total subject image section in the screen. For example, in FIG. 11, the size of the target subject corresponds to "a predetermined range value that occupancy of the captured image data of the (one) individual subject SBJ in the screen is considered as optimal".

In step S113, it is determined whether the size of the individual subject is OK. A state where the size of the individual subject is OK refers to a state where the size of the individual subject which is detected at that time is the size of the target subject which is set in step S112. In a case where a negative determination result is obtained in step S213, the procedure goes to step S114. In step S114, the driving control (zoom control) of the zoom lens is performed so that the size of the individual subject becomes the size of the target subject, and then, the procedure returns to step S101.

At this time, the position of the total subject gravity center Gt in the horizontal direction (left and right direction) maintains the position corresponding to the X coordinate (X=0) which is set in step S109, to thereby perform the zoom control. Thus, a state where the individual subject is positioned in approximately the center in the left and right direction can be maintained. Further, since when the subject search operation is performed, the zoom out control is performed in step S104, it is conceivable that a zoom in control is frequently performed in the zoom control in step S114. However, in a case where the negative determination result is obtained in step S113 as the size of the individual subject detected at that time becomes larger than that of the target subject, with some reasons, the zoom out control is performed in step S114 so that the size of the actual individual subject becomes the size of the target subject.

Further, if the positive determination result is obtained in step S113, the procedure goes to step S115 and after.

In step S115, the horizontal offset amount θx is set.

In this respect, in first composition control according to the present embodiment, the horizontal offset amount θx is calculated by the following Equation 1.

$$\theta x = Dx(Cx/6)/n \quad \text{(Equation 1)}$$

In the Equation 1, "D" refers to a coefficient that is set to any one of +1, −1 and 0 on the basis of a face direction or a combination (relationship) of a plurality of face directions. "Cx" refers to the size of a horizontal image. The term "Cx/6" corresponds to an X coordinate of a virtual line along the longitudinal direction which is obtained on the basis of the three-part division. "n" represents the number of the detected individual subject.

In step S115, since the number of the detected individual subjects is one, n becomes 1. Further, in the case of the algorithm in the figure, the face directions are detected by two stages of left and right sides. In this case, the coefficient D becomes +1 in the case where the face direction is the left side, and becomes −1 in the case where the face direction is the right side.

Then, in the case where the face direction of the detected one individual subject is the left side, $\theta x=-Cx/6$. The horizontal offset amount $\theta x$ represents the position of a vertical line which moves to the right side by Cx/6, from the vertical line (vertical image area division line Ld1: Y axis line) passing the origin coordinates P(0,0). The position of the vertical line becomes the same as a virtual line which is disposed in the right side among two virtual lines along the three-division.

On the other hand, in the case where the face direction of the detected one individual subject is the right side, horizontal offset amount $\theta x=Cx/6$, which represents the position of a vertical line which moves to the left side by Cx/6, from the vertical line (vertical image area division line Ld1: Y axis line) passing the origin coordinates P(0,0). The position of the vertical line becomes the same as the virtual line which is disposed in the left side among two virtual lines along the three-division.

In step S116, it is determined whether the total subject gravity center Gt (in this case, since the number of the individual subjects is one, the gravity center G in FIG. 11 becomes the same as the total gravity center Gt) is positioned on the X coordinate corresponding to the horizontal offset amount $\theta x$ which is set in step S115. Here, in a case where a negative determination result is obtained, the procedure goes to step S117.

In step S117, the pan control is performed so that total subject gravity center Gt is positioned on the X coordinate corresponding to the horizontal offset amount $\theta x$, and then, the procedure goes to step S101.

Further, under the control in step S117, if the total subject gravity center Gt is positioned on the X coordinate corresponding to the horizontal offset amount $\theta x$, a positive determination result is obtained in step S116. In this way, when the positive determination result is obtained in step S116, the gravity center of the individual subject SBJ moves toward the left or right side by the horizontal offset amount $\theta x$ from the vertical image area division line Ld1, according to the face direction as shown in FIG. 11.

In the case where the positive determination result is obtained in step S116, the procedure goes to step S118. In step S118, the mode flag f is set to two, and then, the procedure returns to step S101. In the state where the mode flag f=2, as can be understood from the description below, the first composition adjustment is completed, a second composition adjustment mode is performed to thereby perform a release operation.

Further, in a case where it is determined that the number of the detected individual subject is two or more in step S111, the procedure starting from step S119 is performed.

In step S119, the process of setting the size of the target subject is performed. In the case where the number of the detected individual subject is two or more, the size of the target subject for obtaining the optimal composition is varied according to, for example, the number of the individual subjects. Then, in step S119, a predetermined size of the target subject according to the size of the detected individual subject in step S102 is set. Moreover, as described later, the size of the target subject in the case where the number of the individual subjects is two or more is set with respect to a total subject image section including all the detected individual subjects.

In step S120, it is determined whether the size of the individual subject is OK. That is, it is determined whether the size of the total subject image section which is calculated from detection information with respect to the individual subject at that time is the size of the target subject which is set in step S120.

In a case where a negative determination result is obtained in step S120, the procedure goes to step S121. In step S121, in a similar way to step S114, the driving control (zoom control) of the zoom lens is performed so that the size of the total subject image section of the detected individual subject at that time becomes the size of the target subject which is set in step S119, and then, the procedure returns to step S101.

In this respect, in a case where a positive determination result is obtained in step S120, the procedure goes to step S122.

In step S122, it is determined whether the face directions which are detected for the plurality of individual subjects are all the same.

Firstly, in a case where a positive determination result is obtained in step S122, the procedure of step S123 and after is performed. In step S123, as described above (Equation 1), the horizontal offset amount $\theta x$ is set.

In this case, the coefficient D in the Equation 1 is set to any one of +1 and −1, according to whether the detected same face directions are the left or right side. Further, the n is set to a numeral of 2 or more according to the number of the detected individual subjects. As can be understood from the above description, an absolute value of the calculated $\theta x$ becomes decreased as the number of the individual subjects becomes increased in the Equation 1. That is, as described with reference to FIGS. 11, 12A and 13, as the number of the individual subjects becomes increased, the offset amount of the total subject image section from the vertical image area division line Ld1 in the left or right side becomes decreased.

In this respect, in a case where a negative determination result is obtained in step S122, the horizontal offset amount $\theta x$ is set to 0 in step S124.

In addition, in the process in step S124, operation according to the Equation 1 is performed, and thus, $\theta x$ is set to 0. That is, in the case where the negative determination result is obtained in step S122 (that is, in the case where the plurality of face directions is not the same), an algorithm is configured so that the operation according to the Equation 1 is performed to set the coefficient D to 0.

After performing the processes of step S123 or step S124, the procedure goes to step S125 and after.

In steps S125, S126 and S127, in a similar way to steps S116, S117 and S118 as described above, the pan control is performed until the total subject gravity center Gt is positioned in the X coordinate corresponding to the horizontal offset amount $\theta x$ which is set in step S123 or step S124. Thus, in the case where the face directions of the plurality of individual subjects are the same, the total subject image section (total subject gravity center Gt) moves toward the left or right side by the horizontal offset amount $\theta x$ according to the number of the individual subjects. In this state, a positive determination result is obtained in step S125, and then, the mode flag f is set to 2 in step S127. Then, the procedure returns to step S101.

In this way, in the state where the mode flag f is set to 2, as the composition control, as described with reference to FIGS. 11 to 13, the procedure becomes completed, from the size adjustment according to the number of the individual subjects to the position adjustment in the horizontal direction according to the face direction for each of the individual subjects and the combination of the face directions. Thus, in the case where it is determined that the mode flag f is 2 in step S107, the second composition adjustment mode is performed according to the procedure of step S128 and after.

For example, in the description of the composition control as shown in FIGS. 11 to 13, for the simplicity of description, a setting method of the position of the gravity center of the individual subject in the up and down direction on the screen is not described, but actually, a composition in which the position of the gravity center of the individual subject is moved (offset) upward, for example, by a specific amount from the center of the screen may become a better composition. Thus, as an actual composition control according to the present embodiment, in order to obtain a better optimal composition, the offset amount of the total subject gravity center Gt in the longitudinal (vertical) direction may be set. To this end, the procedure is performed in step S128 and step S129 to be described later, which is the second composition adjustment mode.

In step S128, it is determined whether the position of the total subject gravity center Gt (in the case where the individual subject is one, the total subject gravity center Gt is the gravity center G of the individual subject) is in the state of being offset by a predetermined vertical offset amount θy from the horizontal line (X axis) passing the origin coordinates P in the screen (whether a gravity center offset is OK).

In a case where a negative determination result is obtained in step S128, a tilt control is performed so that the gravity center is offset by the vertical offset amount θy set in step S129 and the tilt mechanism of the camera platform 10 is moved, and then, the procedure returns to step S101. Further, in a case where a positive determination result is obtained in step S128, an optimal composition are obtained with respect to both of the position of the total subject image section in the horizontal direction and the position thereof in the vertical direction. Furthermore, the size of the total subject image section is obtained to correspond to the optimal composition. That is, the state of the optimal composition is obtained.

There are several methods for setting an actual value of the vertical offset amount θy corresponding to steps S128 and S129, but the present invention is not limited to any specific method. As one of the simplest setting methods, for example, a value having a length corresponding to ⅙ of a vertical image size Cy from the center position in the longitudinal direction may be set according to the three-part division. For example, a different value according to the number of the individual subjects, the face directions and the combination thereof may be set according to any other predetermined rule.

Further, in the case where the positive determination result is obtained in step S128, the procedure corresponding to the release operation starting from step S130 is performed. Here, the release operation refers to an operation for storing the captured image data obtained at that time in the storage medium (memory card 40) as still image data. That is, in a case where a shutter manipulation is manually performed, the obtained captured image at that time is recorded in the storage medium as the still image data, in response to the shutter manipulation.

In step S130, it is determined whether conditions capable of performing the release operation are currently satisfied. For example, a focal state (a case where an automatic focusing control is validly set), a stop state of the pan-tilt mechanism of the camera platform 10, or the like may be exemplified as the conditions.

In a case where a negative determination result is obtained in step S130, the procedure returns to step S101. Thus, the procedure can stand by a state where the conditions capable of performing the release operation are satisfied. Further, if a positive determination result is obtained in step S130, the release operation is performed in step S131. In this way, according to this embodiment, the captured image data of having the optimal composition can be recorded.

If the release operation is completed, an initial setting with respect to a predetermined parameter is performed in step S132. According to the process, an initial value 0 is set with respect to the mode flag f. Further, the position of the zoom lens returns to a preset initial position.

Further, the procedure returns to step S101 after the process in step S132 is performed. In this way, as the procedure returns to step S101 from step S132, the subject is searched to thereby obtain a direction which the individual subject which is detected by the search faces and an optimal composition according to the number of the individual subject, and thus, the operation of imaging recording (release operation) is automatically and repeatedly performed.

The release operation in the case of FIG. 14 is an operation that the still image is recorded in the recording medium from the captured image, but in a broad sense, the release operation according to this embodiment includes, for example, an operation that predetermined still image data is obtained from the captured image, in addition to the operation that the still image is recorded in the recording medium. Accordingly, for example, an operation that the still image data is obtained from the captured image for transmission to a different recording device or the like through a data interface or the like using the digital still camera 1 according to the present embodiment, is included in the release operation.

In the procedure in FIG. 14 as described above, firstly, the pan-tilt control for the adding that the total subject gravity center Gt of the detected one or more individual subjects is moved in the origin coordinates P in the screen on the basis of the movement target amounts Span and Stilt which are calculated according to the Formula 1, in step S108 and S109, is performed. Further, in the next stage, the horizontal offset amount θx is calculated on the basis of the number of the individual subjects and the relationship (the same or not) between the face directions which are detected for the individual subjects, and the pan control is performed for moving the total subject gravity center Gt toward the left side or the right side by a distance corresponding to the horizontal offset amount θx, with reference to the vertical line (vertical image area division line Ld1: Y axis line) passing the origin coordinates P. Furthermore, the tilt control is performed for moving the total subject gravity center Gt in the upper direction (or lower direction) by a distance corresponding to the vertical offset amount θy, with reference to the horizontal line (X axis) passing the origin coordinates P, on the basis of the set vertical offset amount θy.

In this way, the pan-tilt control in the procedure in FIG. 11 is performed so that movement target amounts Span and Stilt are calculated according to the following Formula 2, a control of the pan mechanism for obtaining the movement amount in the screen corresponding to the movement target amount Span is performed, and a control of the tilt mechanism for obtaining the movement amount in the screen corresponding to the movement target amount Stilt is performed.

$$(S_{pan}, S_{tilt}) = \frac{\sum_{i=0}^{n-1} p(x_i, y_i) + (\theta_x, \theta_y)}{n} \quad \text{[Formula 2]}$$

4. Composition Control According to Face Direction and the Number of Subjects (Second Example)

Next, a second example of the composition control will be described. The second example is the same as the first example in that the composition is changed according to a face direction and the number of detected subjects.

Figure 15:
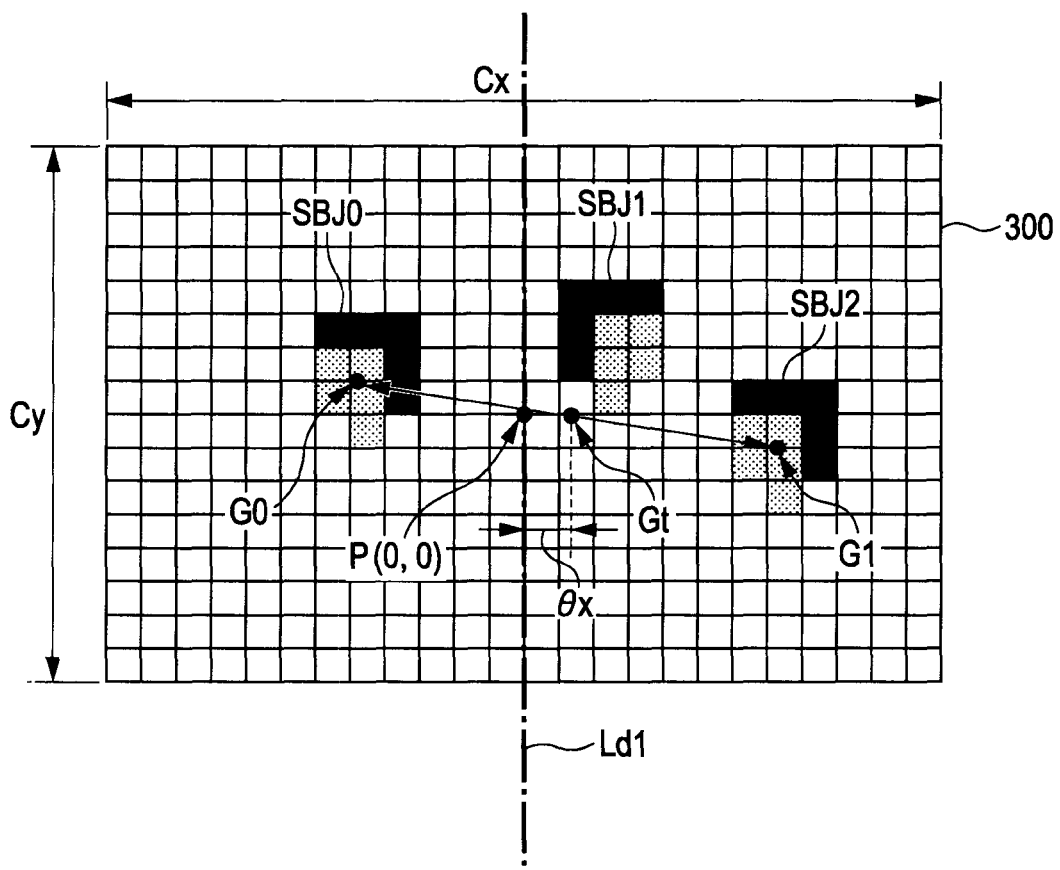
FIG. 15 is a diagram schematically illustrating an example of a composition control in a case where the number of detected individual subjects is three, in a composition control according to a second example.

FIG. 15 is a diagram for illustrating the composition control according to the second example, which illustrates a state where three individual subjects SBJ0, SBJ1 and SBJ2 are detected in the image frame 300. The face directions which are detected with respect to the individual subjects SBJ0 and SBJ2 are the left side among the individual subjects, but the face direction which is detected with respect to the individual subject SBJ1 is the right side. In this case, since the face directions of all the individual subjects are not the same, in the case of the first example, as described with reference to FIG. 12B or the like, a composition is set so that the total subject gravity center Gt is present on the vertical line (vertical image area division line Ld1: Y axis line) passing the origin coordinates P.

However, for example, the fact that the two individual subjects SBJ0 and SBJ2 occupying the majority among the three individual subjects face the same direction (face directions are the same) means that something significant is highly likely to be present in front of the individual subjects SBJ0 and SBJ2, compared with the opposite direction in which the face of the remaining individual subject SBJ1 is directed. According to such an assumption, if space is created in a front image area which is indicated by the face directions of the two individual subjects SBJ0 and SBJ2, a good composition is highly likely to be obtained. In this case, since it is detected that the face directions of the two individual subjects SBJ0 and SBJ2 is the left side, the total subject image section including the three individual subjects SBJ0, SBJ1 and SBJ2 is shifted to the image area in the right side from the vertical image area division line Ld1, in the screen, to thereby obtain a good composition.

Thus, in the composition control according to the second example, when the number of the same face directions occupies a predetermined ratio or more in the total number of the individual subjects, as the relationship between the face directions which are detected with respect to the plurality of individual subjects, the same face directions become a reference face direction. The reference face direction represents, for example, in a case where the group of the plurality of individual subjects is totally considered as one individual subject, a direction which the group faces in the screen. Further, the horizontal offset amount θx is calculated and set on the basis of the reference face direction. With such a composition control, in the case of FIG. 15, the composition is set so that the total subject gravity center Gt is moved to the right side from the vertical line passing the origin coordinates P.

Further, although not shown, in a state where the number of the same face directions which occupies the predetermined ratio or more is not obtained, that is, in a case where the reference face direction is not determined, according to this embodiment, a composition is preferably set so that the total subject image section is positioned in approximately the center in the left and right direction. In this case, the horizontal offset amount θx is set to zero.

Figure 16B:
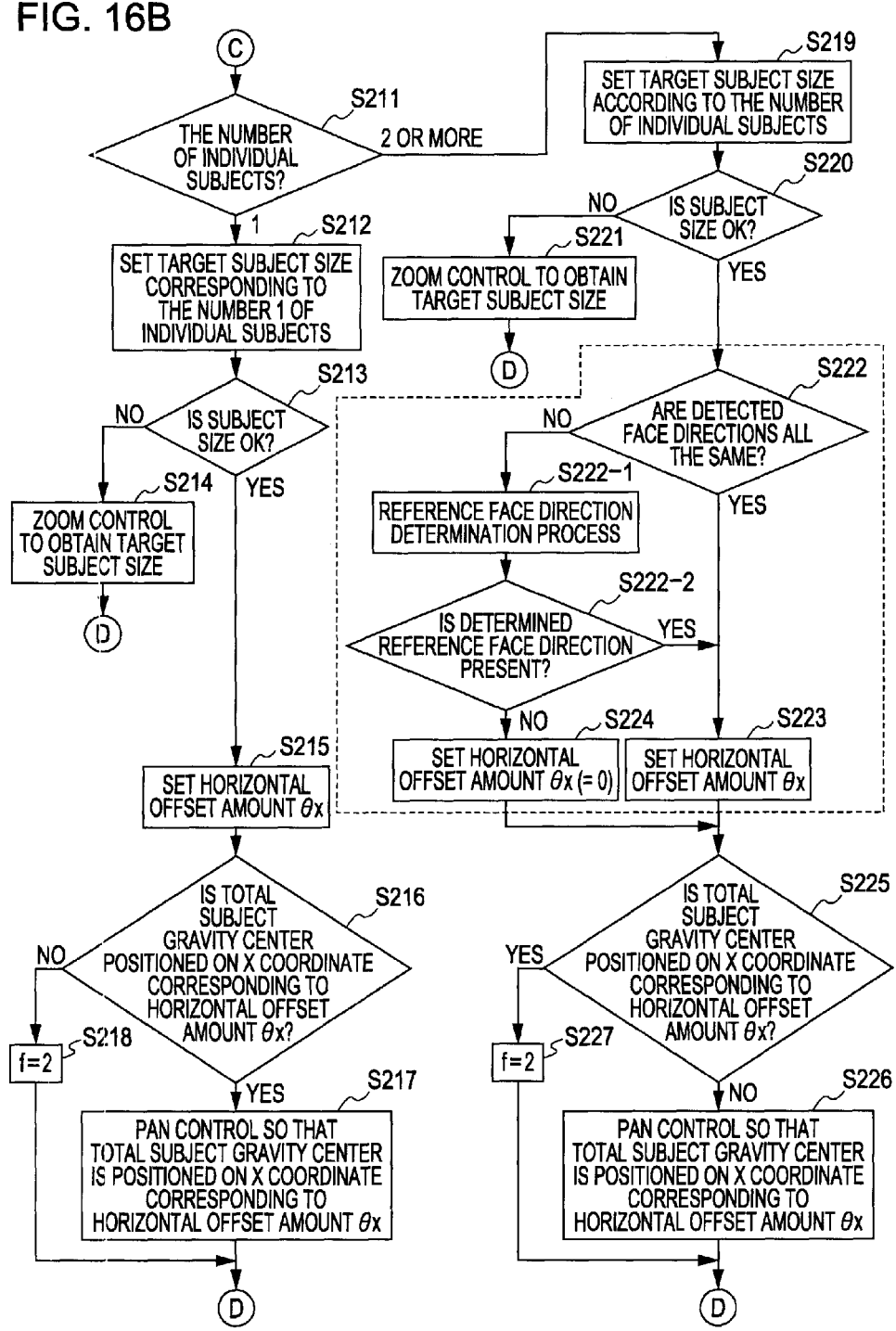
FIG. 16 is a flowchart illustrating an example of a procedure for a composition control according to the second example.

FIG. 16 illustrates an example of a procedure that the subject detection processing block 61, the composition control processing block 62 and the communication control processing block 63, as shown in FIG. 8, are performed corresponding to the composition control according to the second example.

Among processes as shown in FIG. 16, processes of steps S201 to S232 except steps S222-1 and S222-2 are the same as the processes of steps S101 to S132 in FIG. 14.

Further, step S221-1 and step S222-2 are processes to be performed in a case where a negative determination result is obtained in step S222. That is, steps S222-1 and S222-2 are performed, in a case where the number of the detected individual subjects is plural, and in a case where the entire face directions are not the same, with respect to the relationship between the face directions of the individual subjects, in a stage where size adjustment of the total subject image section is firstly completed.

In step S222-1, a process for determining the reference face direction is performed.

To this end, for example, as described above, with respect to the relationship between the face directions of the plurality of detected individual subjects, it is determined whether there is any group in which the number of the individual subjects forming the group occupies the predetermined ratio or more in the number of the entire detected individual subjects, among the groups of the individual subjects having the same face direction. If such a group of the individual subjects is present, the face direction of the group of the individual subjects is determined as a valid reference face direction. Further, if such a group of the individual subjects is not present, it is determined that the reference face direction is not present.

Further, with respect to the above predetermined ratio, a setting method of an actual value may be properly determined in consideration of an appropriate composition, on the basis of the number of the actual individual subjects and the relationship between the face directions of the individual subjects. In addition, the value which is the predetermined ratio may be basically set to one fixed value, but for example, may be set to different predetermined values according to the number of the determined individual subjects, or the like.

Further, there are several algorithms for the reference face direction determination process, in addition to the above algorithm. For example, without respect to a ratio in the number of the entire individual subjects, a process that the face direction of the group having a maximum number of individual subjects, among the groups of the individual subjects having the same face directions, is determined as the valid reference face direction may be considered. In this case, for example, when the individual subjects forming each group having the same face direction are the same in number, it is determined that the reference face direction is not present.

In step S222-2, it is determined whether the valid reference face direction is determined as the result of the face direction determination process of step S222-1.

In this respect, in a case where a positive determination result is obtained, the procedure goes to step S223. In this case, in step S223, the coefficient D is determined on the basis of the reference face direction which is determined in step S222-1, to thereby calculate the horizontal offset amount θx for setting.

On the other hand, in a case where a negative determination result is obtained in step S222-2, the valid reference face direction indicating the left side or the right side is not determined in step S222-1. Thus, in this case, the procedure goes to step S224, and then, the horizontal offset amount θx is set as zero. In this way, as steps S222-1 and S222-2 are performed, the composition control according to the second example can be realized, as described with reference to FIG. 15.

Further, in the procedure of each composition control as shown in FIGS. 14 to 16, the composition which is considered as optimal is determined according to the number of the detected individual subjects, and the captured image data of the determined composition is actually obtained (reflected), and thus, the zoom control and the pan-tilt control can be properly performed.

In addition, in the composition control, it is presumed that the detection of the face direction is performed in two stage of the left and right sides, but actually, for example, the face direction detection process may be performed in consideration of the front side, in addition to the left and right sides. In this case, the composition control according to the present embodiment can be employed in a valid manner.

For example, in a case where one individual subject is detected as in FIG. 11, and in a case where it is determined that the face direction is the front side, the position of the subject in the horizontal direction may be located in approximately the center of the screen (the gravity center G is located on approximately the same vertical image area division line Ld1 (Y axis line)). However, such a composition is generally an example of a bad composition. Thus, in the case where the detected individual subject is one, in the case where the face direction is the front side, using the same composition as in FIG. 11, or the composition which is line-symmetric with reference to the vertical image area division line Ld1 with respect to the composition in FIG. 11, the horizontal offset amount θx may be determined. In this way, a good composition can be obtained according to the three-part division.

In addition, in a case where two or more individual subjects are detected, for example, in a case where the face directions of the entire individual subjects is the front side, or in a case where the reference face direction is the front direction, the coefficient D in the Equation 1 may be set to 0, and the horizontal offset amount θx may be calculated.

Further, for example, in a case where a face up direction or a face down direction can be detected as the face direction, the composition control can be performed according to the detection result of the face direction of the face up direction or the face down direction.

Furthermore, when an inclined face direction can be detected as the face direction, in which the left or right direction is combined with the face up direction or the face down direction, the composition control can be performed according to the face direction in which the inclined face direction is detected.

In addition, for example, in a case where the face direction can be performed in the left and right directions in multiple stages which are larger than, for example, two states or three stages, an algorithm for changing the horizontal offset amount θx according to the stages (degree) of the directions detected in this way may be employed. This is the case with the change in the vertical offset amount θy according to the face direction detection (corresponding to the face direction detection in the left and right directions in the composition controls according to the first and second examples) in the up and down directions, in composition controls according to a third example and a fourth example which will be described later.

Further, as shown in FIG. 10, in this case, a reference point through which a reference line passes is the origin coordinates in the screen, but the position of the reference point may be set as a position other than the origin coordinates, for example, in order to obtain a better composition. This is the case with the composition control according to a third example and a fourth example which will be described later.

5. Composition Control According to Face Rotation Angle: in Normal Posture (Third Example)

Further, the subject detection processing block 61 can obtain a face rotation angle as information obtained by the subject detection. The composition controls according to the third example and the fourth example use the information about the face rotation angle.

An example of a detecting method of the face rotation angle will be described with reference to FIGS. 17A, 17B, and 17C.

Figure 17A:
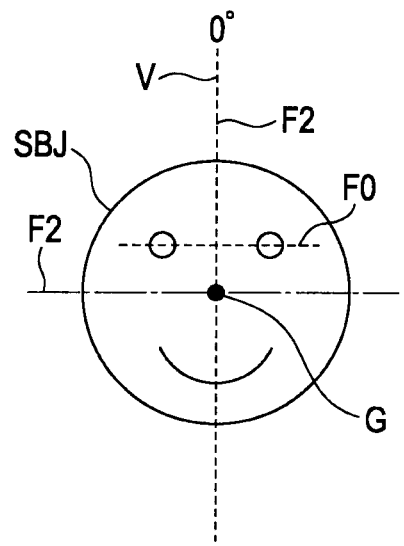
FIGS. 17A, 17B and 17C are diagrams illustrating an example of a detection technique of a face rotation angle corresponding to a composition control according to third and fourth examples.

Firstly, FIG. 17A schematically illustrates a state where a direction of a face (a specific target portion) of one detected individual subject SBJ is the front side.

For example, with respect to the individual subject SBJ, a straight line F1 passing the gravity center G of the individual subject SBJ is set in parallel with a straight line F0 connecting the detected left and right eyes, and a straight line F2 which is orthogonal to the straight line F1 and passes the gravity center G of the individual subject SBJ is set. In addition, an absolutely vertical reference line V is set. The vertical reference line V corresponds to a face rotation angle of 0°. In this case, the vertical reference line V is in the state of passing the gravity G.

In the case of FIG. 17A, the straight line F2 and the vertical reference line V coincide with each other, and at this time, an angle formed by the straight line F2 and the vertical reference line V can be considered as 0°. At this time, the face rotation angle becomes 0°.

Figure 17B:
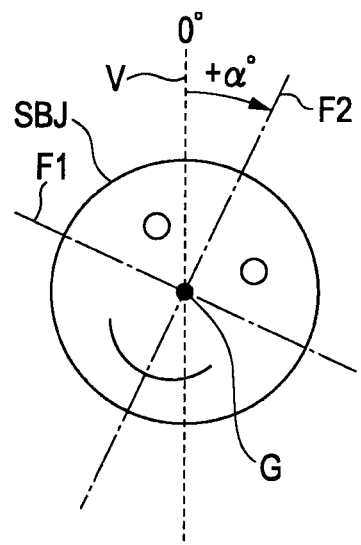

In this respect, for example, as shown in FIG. 17B, the face direction of the individual subject SBJ is the front side in a similar way to the case in FIG. 17A, but the face rotates in a clockwise direction (to the right side) to be inclined. In this case, due to the vertical reference line V and the straight line F2, a positive angle value which is indicated as +α° is obtained, according to the level of the inclination of the face in the clockwise direction.

Figure 17C:
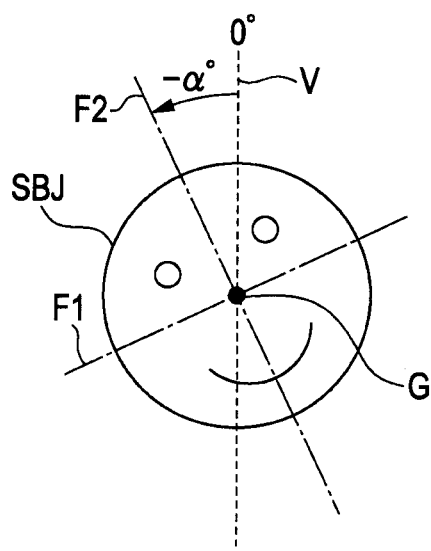

Similarly, for example, as shown in FIG. 17C, the face rotates in a counterclockwise direction (to the left side) to be inclined. In this case, due to the vertical reference line V and the straight line F2, a negative angle value which is indicated as −α° is obtained, according to the level of the inclination of the face in the counterclockwise direction.

The face inclinations as shown in FIGS. 17B and 17C is considered as inclinations obtained by rotating the face, for example, with reference to the face in FIG. 17A. In this embodiment, the angle value which is obtained according to the inclination of the face of the individual subject SBJ and is formed by the vertical reference line V and the straight line F2 represents the face rotation angle.

Further, in order to actually detect the face rotation angle for each of the individual subjects SBJ, the subject detection processing block 61 is similar, for example, to the description with reference to FIGS. 17A, 17B, and 17C.

That is, positions of the right and left eyes in each individual subject SBJ are specified, and then, the straight line F2 is set for every subject SBJ on the basis of the positions of the eyes. Further, the angle value formed by the set straight line F2 and the vertical reference line V is treated as a value of the face rotation angle.

In the description hereinafter, the face rotation angle may be indicated as an angle value obtained, for example, according to a predetermined resolution, or may be indicated as a range (angle range) from a specific angle value to another angle value. That is, the face rotation angle according to this embodiment may include the angle range as the angle value.

A basic example of the composition control according to the face rotation angle will be described with reference to FIGS. 18A and 18B.

Figure 18A:
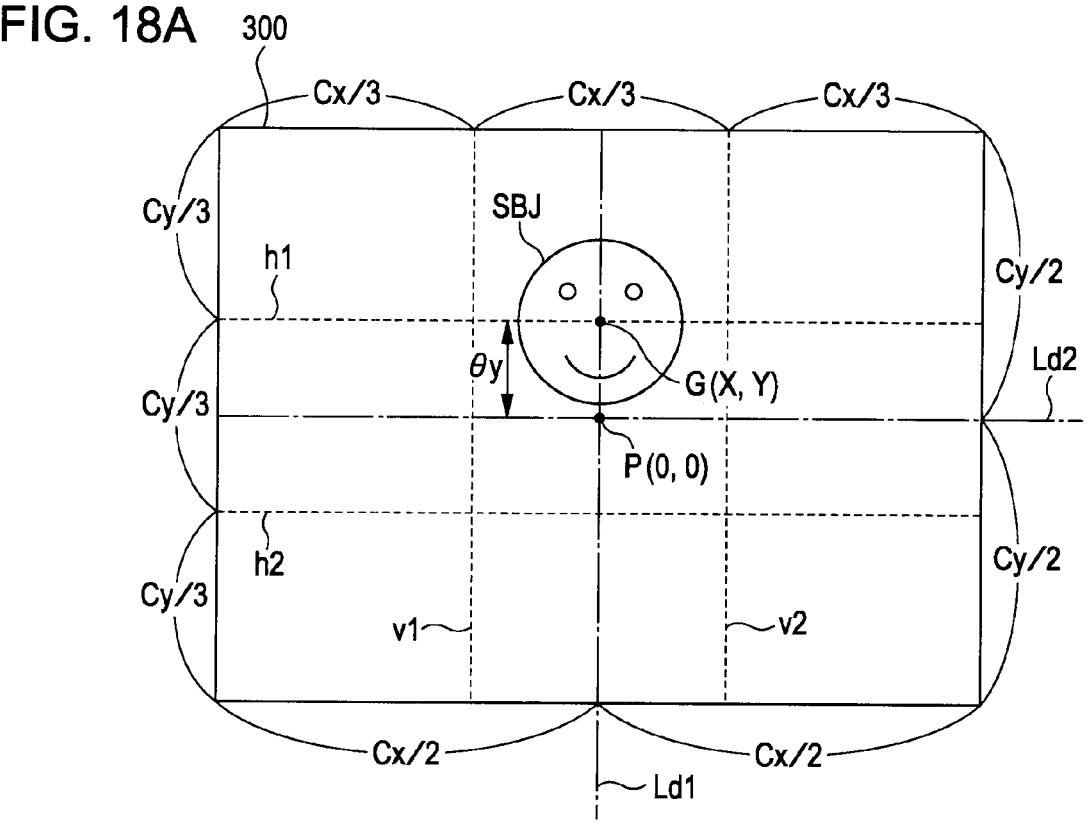
FIGS. 18A and 18B are diagrams illustrating an example of a composition control in a case where the number of individual subjects is one, in a composition control according to the third example.

FIG. 18A illustrates a state where one individual subject SBJ is present in the image frame 300 as the detected subject. Firstly, in this case, a composition which is obtained according to the composition controls according to the first example and the second example as described above is shown in FIG. 18A. That is, the gravity center G(X,Y) of the individual subject SBJ is positioned in a midpoint of a horizontal image size Cx corresponding to a vertical image area division line Ld1 in the horizontal direction, and is positioned on an upper horizontal virtual line h2 among two horizontal virtual lines h1 and h2 which trisects a vertical image size Cy according to the three-part division in the vertical direction. The gravity center G(X,Y) can be expressed as a horizontal offset amount θx=0, and a vertical offset amount θy=Cy/6.

The horizontal offset amount θx has a negative value in the left area, and has a positive value in the right area, with reference to the vertical image area division line Ld1 (X=0). The vertical offset amount θy has a positive value in the upper area, and has a negative value in the lower area, with reference to a horizontal image area division line Ld2 (Y=0).

Figure 18B:
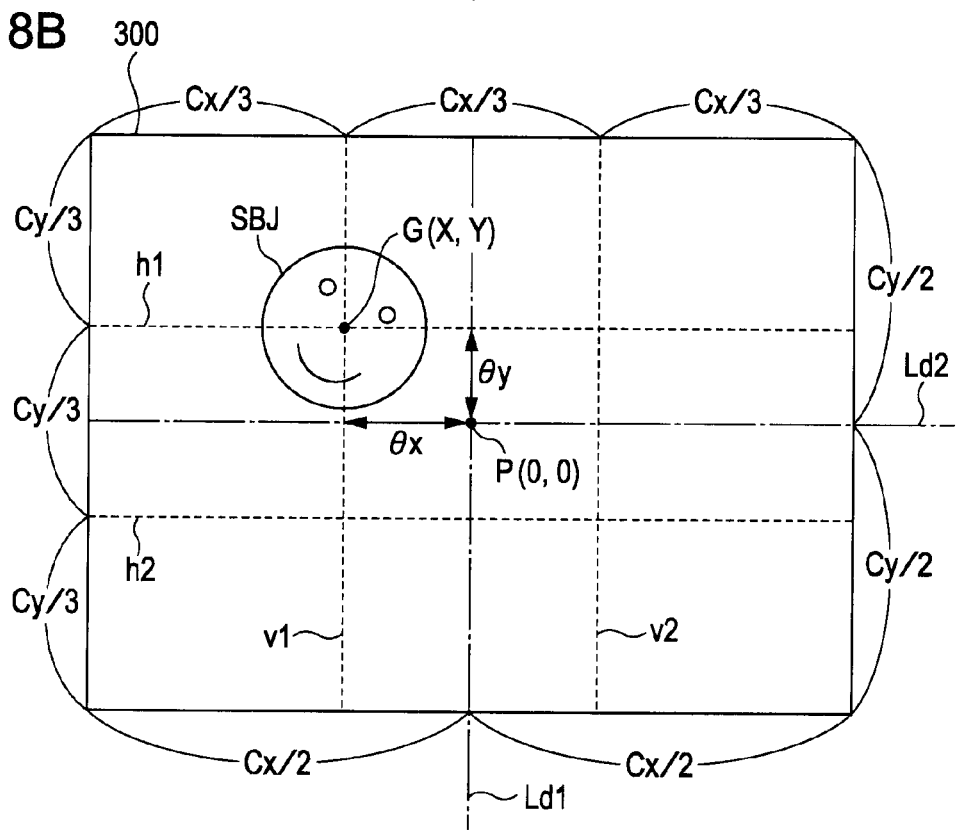

Next, for example, as shown in FIG. 18B, the individual subject SBJ which is detected in the image frame 300 rotates in the clockwise direction and is in a state of being inclined. In this case, as described with reference to FIGS. 17A, 17B, and 17C the face rotation angle is detected as a positive value (+α°) according to the level of the inclination.

In this respect, the face rotation angle (±α°) corresponding to the "state where the face rotates to be inclined in the clockwise direction (counterclockwise direction)" becomes an angle range which is smaller than an angle range in which an absolute value thereof is considered as 90°. The face rotation angle range can be considered as an angle range which is obtained by leaning on something or inclining his or her neck in a state where a human being as a subject stands up or sits down. In this respect, the rotation angle range in which the absolute value is considered as 90° can correspond to a recumbent posture to be described later.

For example, in this way, in the case where the face of the individual subject SBJ rotates to some extent in the clockwise direction (to the right side), something significant is highly likely to be present in the right side of the individual subject SBJ. More specifically, when the face of the individual subject SBJ rotates, an actual person as the individual subject SBJ is highly likely to lean on something. Accordingly, the something which is leaned on is highly likely to be in a direction in which the face of the individual subject SBJ rotates. That is, in the case of FIG. 18B, in the image frame 300, the something which is leaned on is highly likely to be present in a right space in which the face of the individual subject SBJ is inclined.

This, in this embodiment, as the range of the face rotation angle (face rotation angle range) corresponding to the state where the face rotates to be inclined in the clockwise direction is detected, as shown in FIG. 18B, with respect to the position of the gravity center G as shown in FIG. 18A (the vertical image area division line Ld1), a composition which is obtained by moving the gravity center G toward the left side is determined as an optimal composition. The composition control is performed to obtain the optimal composition.

In the example as shown FIG. 18B, among two vertical virtual lines v1, v2 which trisects the horizontal image size Cx, the gravity center G is moved to be positioned on the left vertical virtual line v1. That is, the gravity center G in FIG. 18B is expressed to have a horizontal offset amount θx=−Cx/6 and a vertical offset amount θy=Cy/6. Thus, a relatively large space is secured in the right side of the individual subject SBJ, to thereby obtain a preferable composition.

Although not shown, as the face rotation angle range corresponding to the state where the individual subject SBJ rotates to be inclined in the counterclockwise direction is detected, in a way opposite to FIG. 18B, the individual subject SBJ is moved toward the right side of the vertical image area division line Ld1. For example, the composition control is performed so that the individual subject SBJ is located on the position of the gravity center G which is indicated as a horizontal offset amount θx=Cx/6 and a vertical offset amount θy=Cy/6.

Figure 19A:
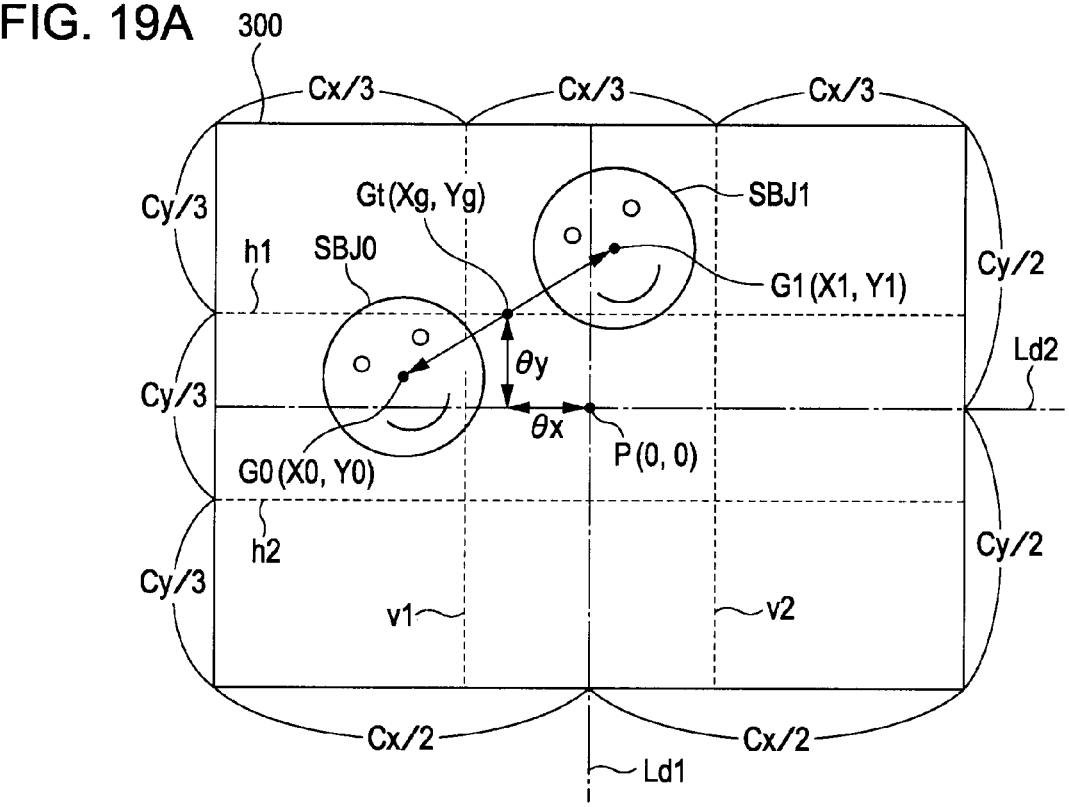
FIGS. 19A and 19B are diagrams illustrating an example of a composition control in a case where the number of individual subjects is plural, in a composition control according to the third example.

Further, FIG. 19A illustrates a state where two individual subjects SBJ0 and SBJ1 are detected in the image frame 300 as the detected subjects. The individual subjects SBJ0 and SBJ1 are in a state of rotating to be inclined in the counterclockwise direction, and a face rotation angle having a range according to the state is detected for each of the individual subjects SBJ0 and SBJ1.

In this way, when the two individual subjects are detected, and the face rotation angle is detected being in a state where the individual subjects rotate to be inclined in the sane direction, the total subject gravity center Gt is given the face rotation angle (face inclination direction) and the horizontal offset amount θx according to the case where the number of the individual subjects is two.

For example, in a case where it is detected that two individual subjects have different face inclination (rotation) directions, the total subject gravity center Gt may be present on the vertical image area division line Ld1 with the horizontal offset amount θx=0.

Figure 19B:
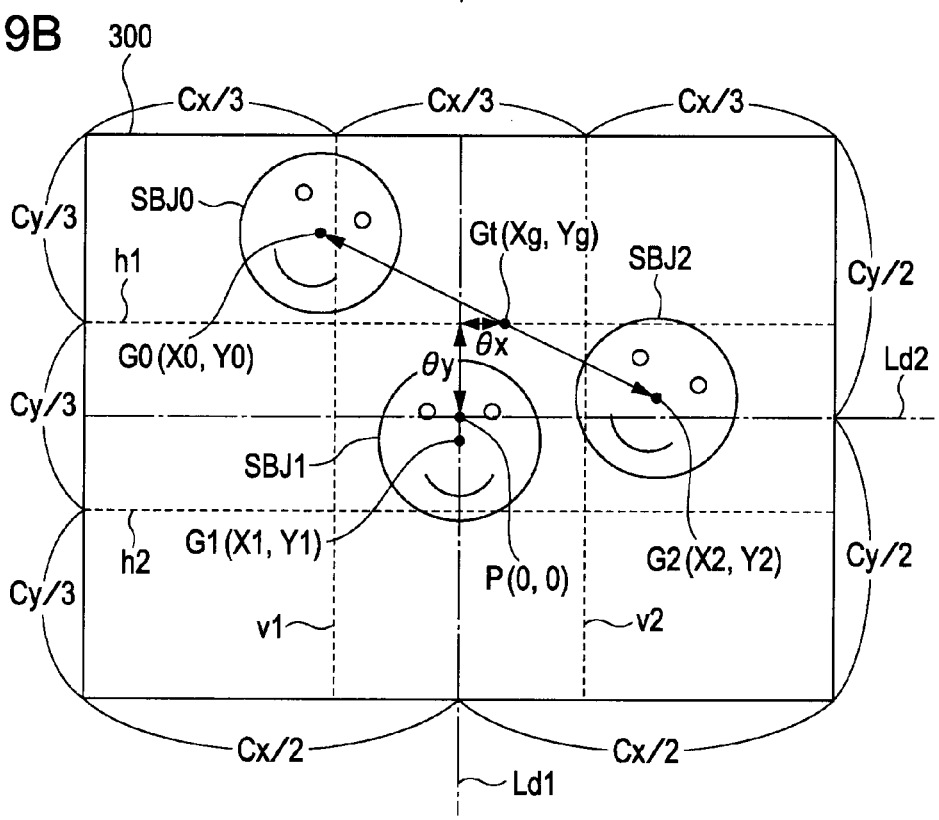

Further, in FIG. 19B, three individual subjects SBJ0, SBJ1 and SBJ2 are detected as the detected subjects. In addition, with respect to the face rotation, the individual subjects SBJ0 and SBJ2 rotate to be inclined in the clockwise direction, and may have the face rotation angle of the same range. In this respect, the individual subject SBJ1 does not rotate, and for example, is in a state of the face rotation angle of 0°. That is, with respect to a relationship between three individual subjects SBJ0, SBJ1 and SBJ2, the individual subjects SBJ0 and SBJ2 are the same, but the individual subject SBJ1 is different.

In this case, the case where the total subject gravity center Gt is positioned on the vertical image area division line Ld1 may be firstly considered as the composition control, in a similar way to the first example.

Further, the composition control may be performed so that, according to the assumption that something significant is highly likely to be present in a direction in which the two individual subjects occupying the majority among the three individual subjects face is inclined, the total subject gravity center Gt is positioned in the image area in the left side from the vertical image area division line Ld1, may be used, in a similar way to the second example.

That is, in the composition control on the basis of the face rotation angle according to the second example, with respect to the relationship between the face rotation angle ranges which are detected for the plurality of individual subjects, when the number of the individual subjects having the sane face rotation angle ranges occupies a predetermined ratio or more in the total number of the individual subjects, the sane face rotation angle ranges are set as a reference (reference face rotation angle). Then, the horizontal offset amount θx is set on the basis of the reference face rotation angle. FIG. 19B illustrates a state where the composition control according to the second example is performed.

6. Composition Control Example According to Face Rotation Angle: in Recumbent Posture (Fourth Example)

Figure 20A:
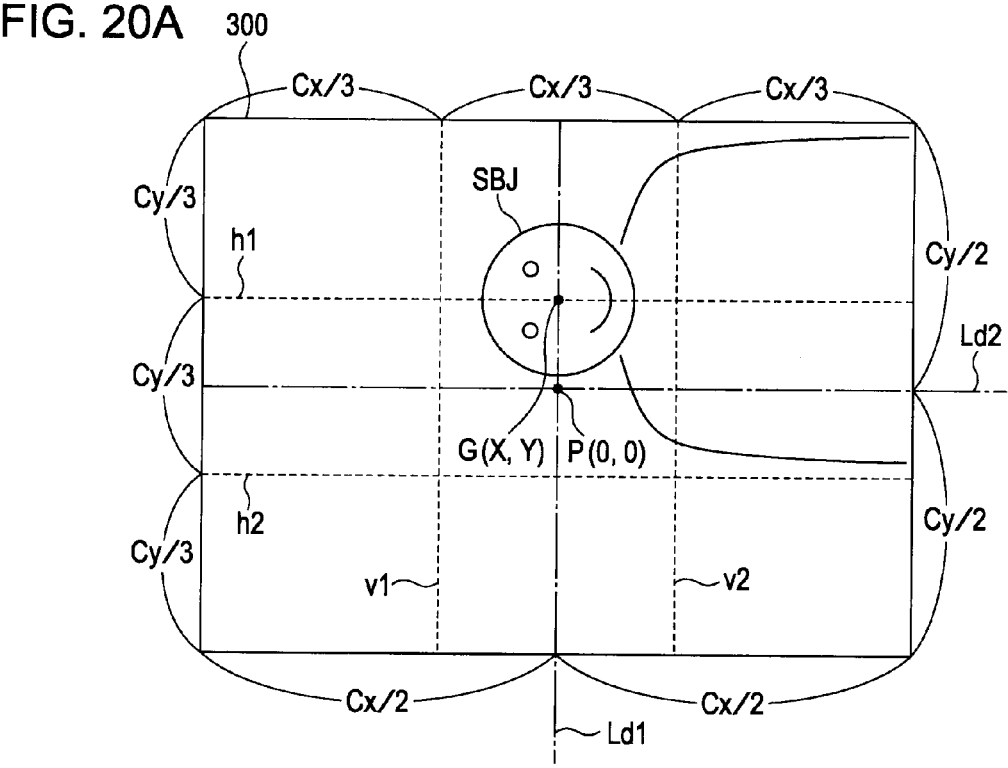
FIGS. 20A and 20B are diagrams illustrating an example of a basic control, in a composition control according to the fourth example.

Next, for example, FIG. 20A illustrates a state where a face of one individual subject SBJ is directed to the left side in an immediately lateral direction. This face is in an angle range which is considered as −90° as the face rotation angle.

In this way, the state where the face of the individual subject SBJ is directed to the transverse direction may be a posture state where the individual subject SBJ is recumbent.

Here, for example, in the state where the individual subject SBJ as shown in FIG. 20A is in the recumbent posture, the gravity center G is positioned on the intersection of the vertical image area division line Ld1 and the horizontal virtual line h1, for example, simply using the composition control according to the first example or the second example.

Then, as shown in FIG. 20A, in the composition, the individual subject SBJ in the recumbent posture is excessively shifted toward the right side in the image frame 300. Further, in this case, since the vertical offset amount θy=Cv/6 is also given, the individual subject SBJ is also excessively shifted in the upper direction. Such a composition is generally not a good composition.

Figure 20B:
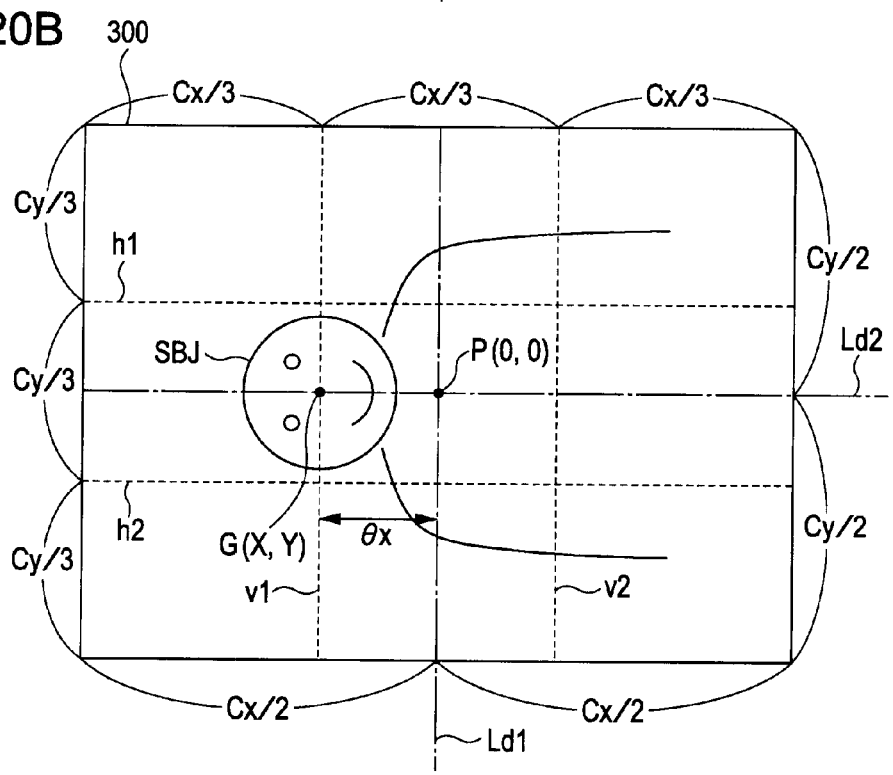

Thus, in an example as shown in FIG. 20A, in a case where it is detected that the face of the individual subject SBJ rotates toward the left side in a nearly immediately lateral direction, that is, is in a face rotation angle range which can be considered as −90°, for example, the control is performed so that the composition as shown in FIG. 20B is obtained.

That is, the gravity center G of the individual subject SBJ is firstly positioned on the horizontal image area division line Ld2 in the vertical direction. Then, in the horizontal direction, the gravity center G is moved toward the left side from the vertical image area division line Ld1. In this case, the gravity center G is positioned on the vertical virtual line v1, with the horizontal offset amount θx=−Cx/6.

According to the composition as shown in FIG. 20B, firstly, the face of the subject SBJ who is recumbent can be positioned in approximately the center of the image frame 300 in the up and down direction. In addition, a lower portion under the face of the subject SBJ who is recumbent to the left side in the image frame 300 can be arranged with an appropriate occupancy. That is, a much preferable composition is obtained, compared with the composition in FIG. 20A.

Further, in a way opposite to FIGS. 20A and 20B, in a case where it is detected that the face of the individual subject SBJ rotates to the right side in the immediately lateral direction and the face rotation angle range can be considered as +90°, the control is performed so that a composition in which the left and right sides of FIG. 20B are inverted is obtained.

Figure 21:
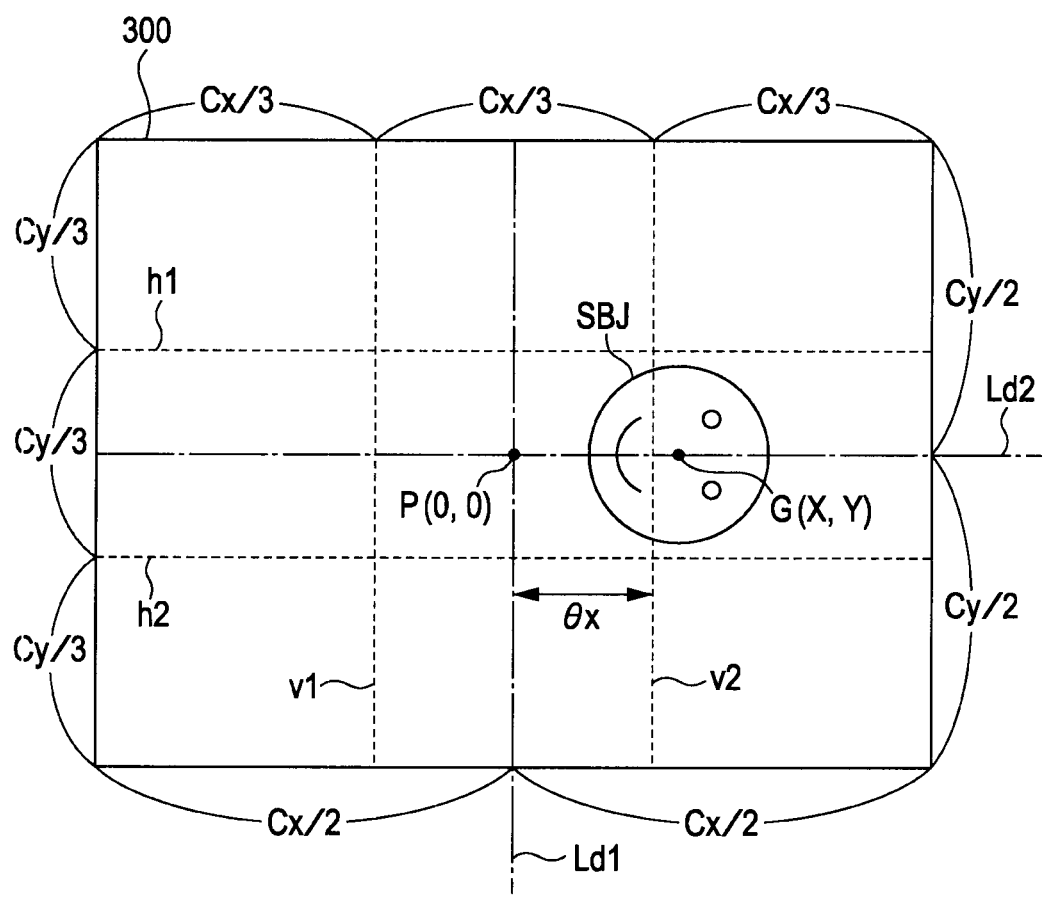
FIG. 21 is a diagram illustrating an example of a basic control, in a composition control according to the fourth example.

That is, as shown in FIG. 21, the gravity center G is positioned on an intersection of the horizontal image area division line Ld2 and the vertical virtual line v2 (θx=Cx/6) which is located on the right side from the vertical image area division line Ld1.

This example is based on the composition control of the individual subject SBJ having one recumbent posture as described with reference to FIG. 20B, and further, the detection result of the face direction can be incorporated into the composition control.

Figure 22A:
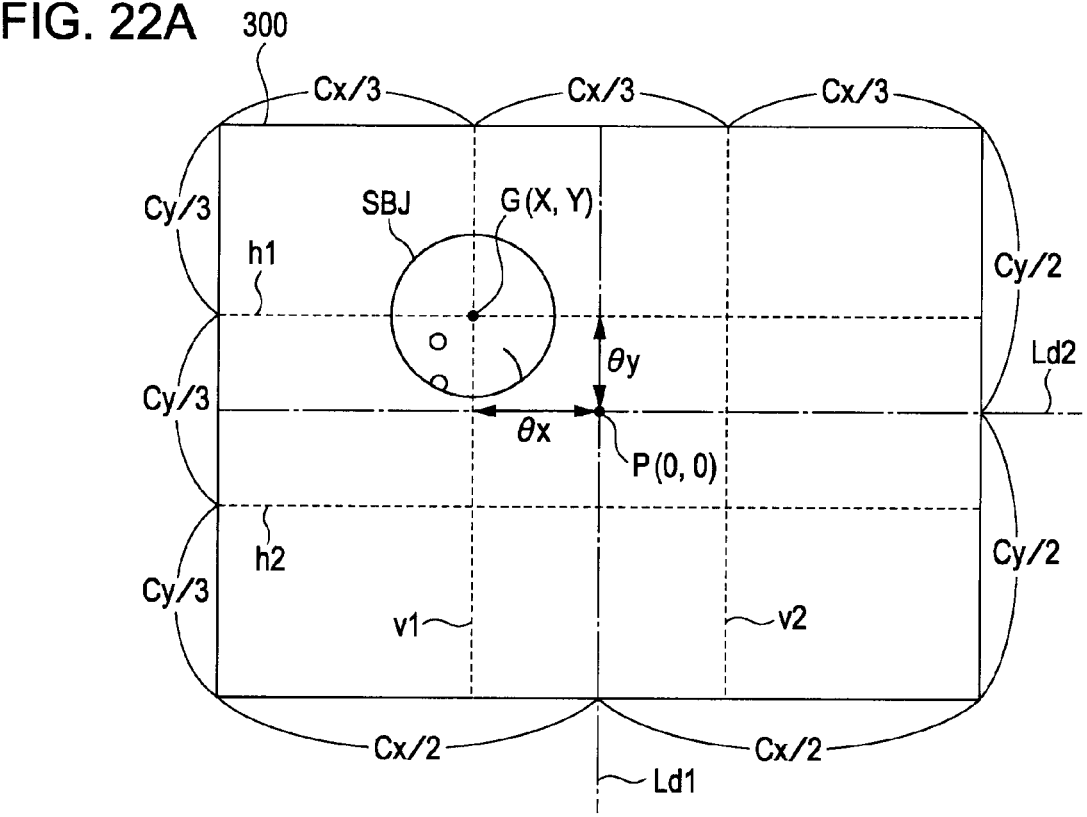
FIGS. 22A and 22B are diagrams illustrating an example of a control in a case where the number of individual subjects is one and face directions are combined, in a composition control according to the fourth example.

FIG. 22A illustrates a state where a face direction is a down side with respect to the individual subject SBJ of the left recumbent posture in the image frame 300.

In this case, the human being who is the individual subject SBJ is directed to the right side in the recumbent state, but it is detected that the face direction is the down side in the image frame 300.

In this way, when it is detected that the face direction is the down side, something significant is highly likely to be present in a front space to which the face is directed, that is, in a lower section of the image frame 300, according to the assumption as in the first example. Thus, in this case, as shown in FIG. 22A, the position of the gravity center G in the vertical direction is moved to the upper side from the horizontal image area division line Ld2. In this case, the vertical offset amount is set as θy=Cy/6 according to the three-part division. The horizontal offset amount θx is the same −Cx/6 as in FIG. 20B.

Figure 22B:
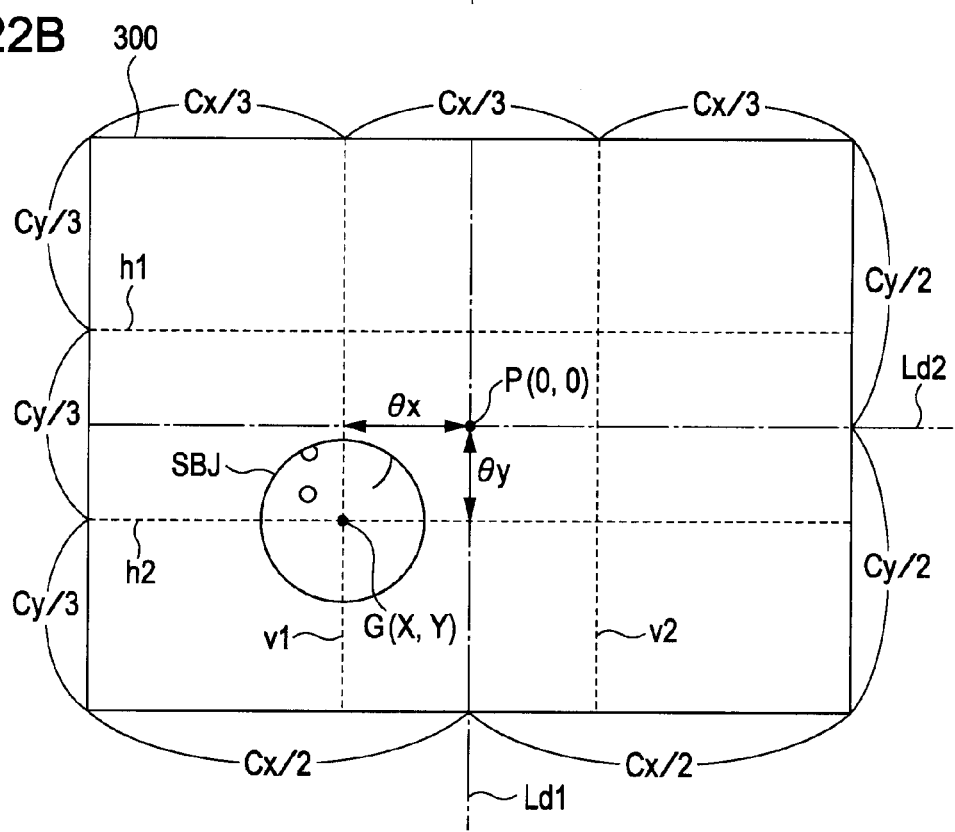

In this respect, as shown in FIG. 22B, in a case where it is detected that the face direction of the individual subject SBJ of the left recumbent posture in the image frame 300 is the up side, the position of the gravity center G in the vertical direction is moved to the lower side from the horizontal image area division line Ld2. In this case, for example, in a symmetric way, in an up and down direction, to the case in FIG. 22A, the horizontal offset amount and the vertical offset amount are set as θx=−Cx/6 and θy=−Cy/6, respectively.

Figure 23A:
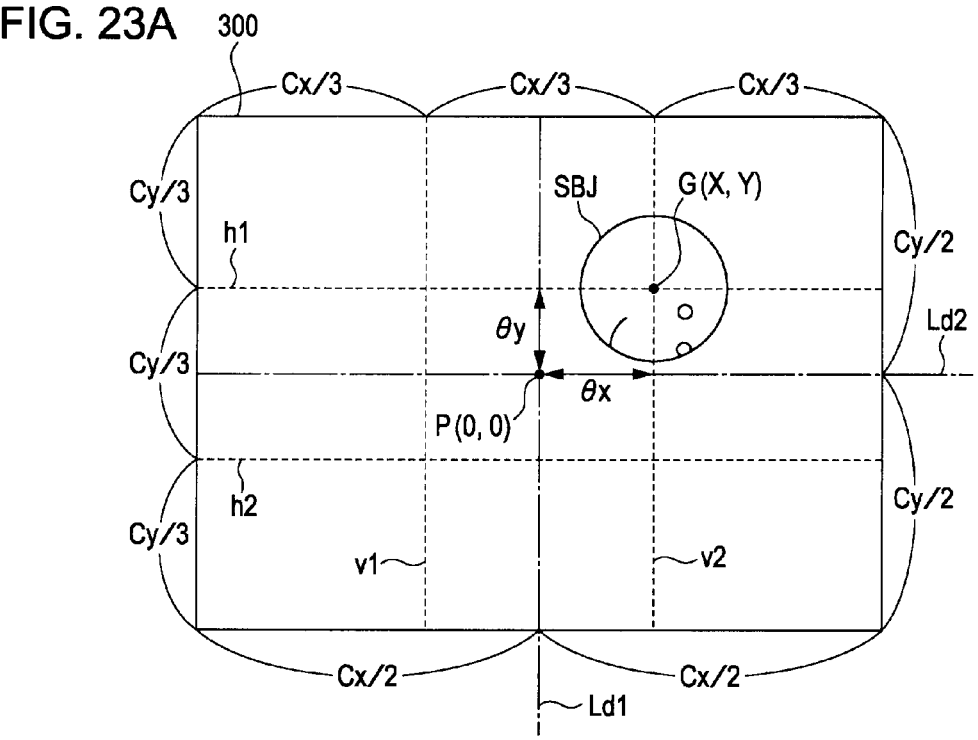
FIGS. 23A and 23B are diagrams illustrating an example of a control in a case where the number of individual subjects is one and face directions are combined, in a composition control according to the fourth example.

Further, as shown in FIG. 23A, in a case where it is detected that the face direction of the individual subject SBJ of the left recumbent posture is the down side in the image frame 300, the position of the gravity center G in the vertical direction is moved to the upper area from the horizontal image area division line Ld2. For example, the horizontal offset amount and the vertical offset amount are set as θx=Cx/6 and θy=Cy/6, respectively.

Figure 23B:
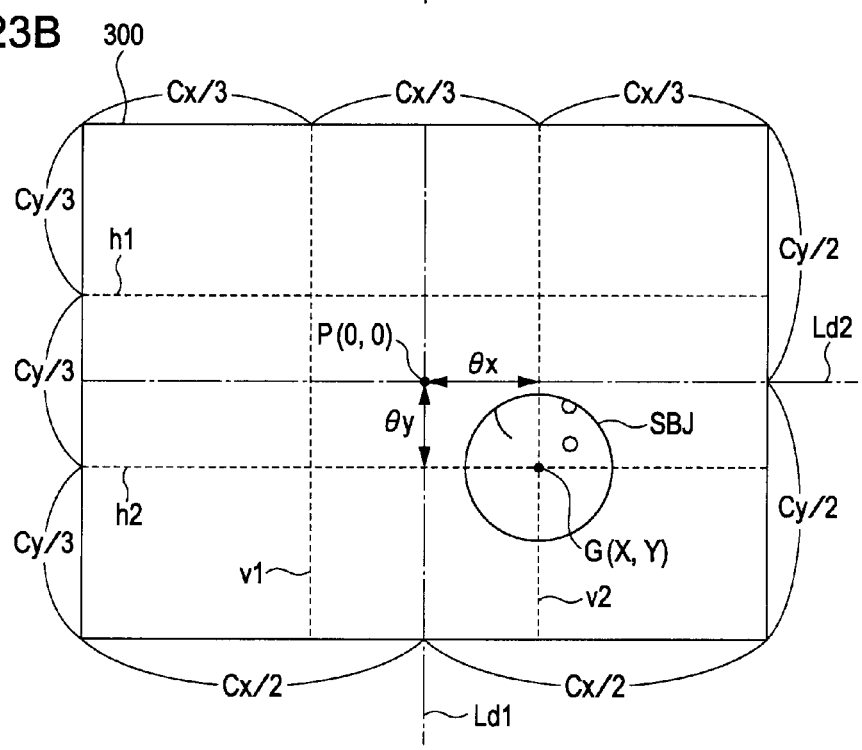

In this respect, as shown in FIG. 23B, in a case where it is detected that the face direction of the individual subject SBJ of the same left recumbent posture is the upper side, the position of the gravity center G in the vertical direction is moved to the lower area from the horizontal image area division line Ld2. For example, the horizontal offset amount and the horizontal offset amount are set as θx=Cx/6 and θy=−Cy/6, respectively.

Further, for example, FIGS. 24A, 24B, 25A and 25B illustrate a transverse direction state where the face of the individual subject SBJ is directed to the left side or the right side in the transverse direction, that is, a recumbent state. In this respect, for example, it is possible to consider a state where a predetermined angle is given to the angle range which is considered as ±90°, as the face rotation angle corresponding to the face of the transverse direction. Specifically, this state corresponds to a state where the human being who is the individual subject SBJ inclines his or her neck in the left side or the right side in the recumbent posture.

Figure 24A:
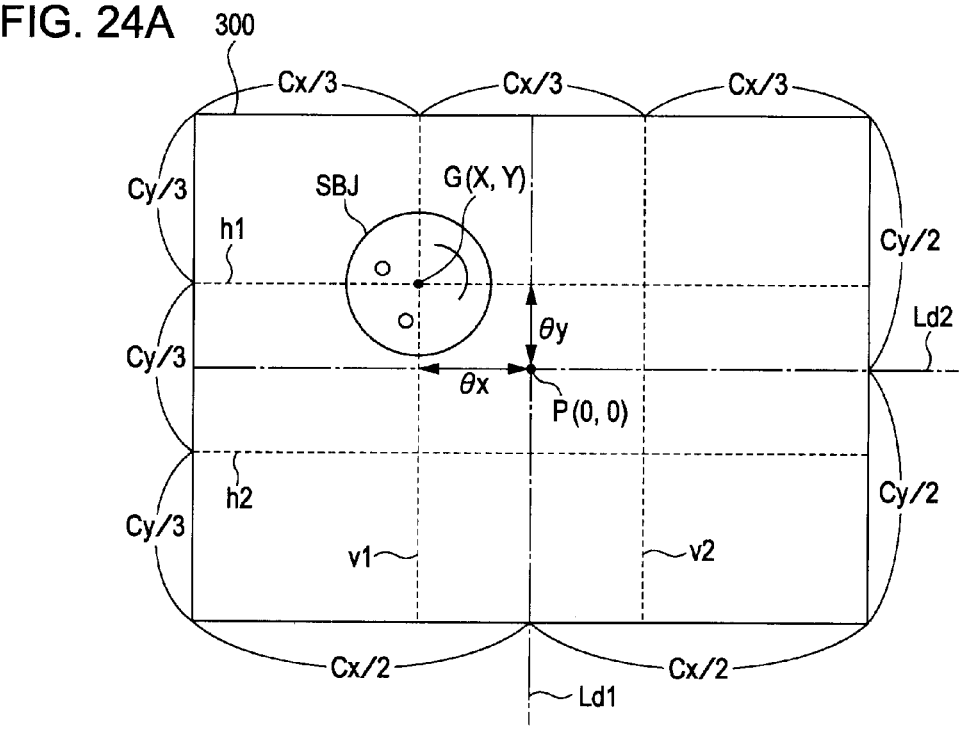
FIGS. 24A and 24B are diagrams illustrating an example of a control which is performed on the basis of a face rotation angle with reference to an immediately lateral direction in a case where the number of individual subjects is one, in a composition control according to the fourth example.

In such a case, as described with reference to FIGS. 18A, and 18b it is assumed that something significant is highly likely to be present in a direction in which the face of the individual subject SBJ rotates to be inclined. Accordingly, as shown in FIG. 24A, in a state where the individual subject SBJ is in the left recumbent posture (the face of the individual subject SBJ is directed to the left side), and the face further rotates to be inclined in the counterclockwise direction from −90°, the position of the gravity center G in the vertical direction is moved toward the upper area from the horizontal image area division line Ld2. That is, the horizontal offset amount and the vertical offset amount are set as θx=−Cx/6 and θy=Cy/6, respectively.

Figure 24B:
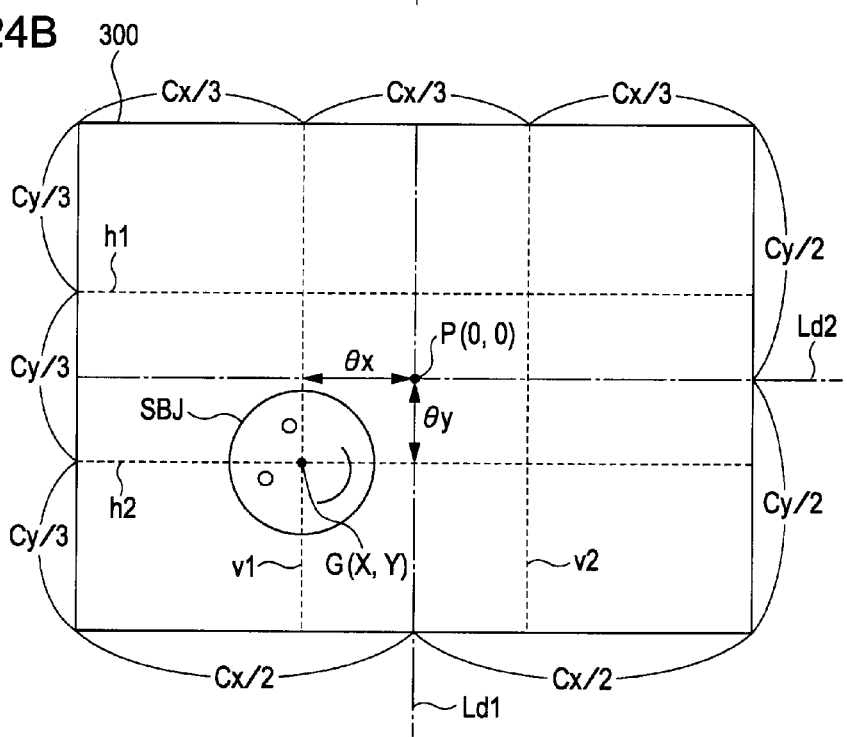

In addition, as shown in FIG. 24B, in a state where the individual subject SBJ is in the left recumbent posture, and the face rotates to be inclined in the clockwise direction from −90°, the position of the gravity center G in the vertical direction is moved toward the lower area from the horizontal image area division line Ld2. For example, the horizontal offset amount and the vertical offset amount are set as θx=−Cx/6 and θy=−Cy/6, respectively.

Figure 25A:
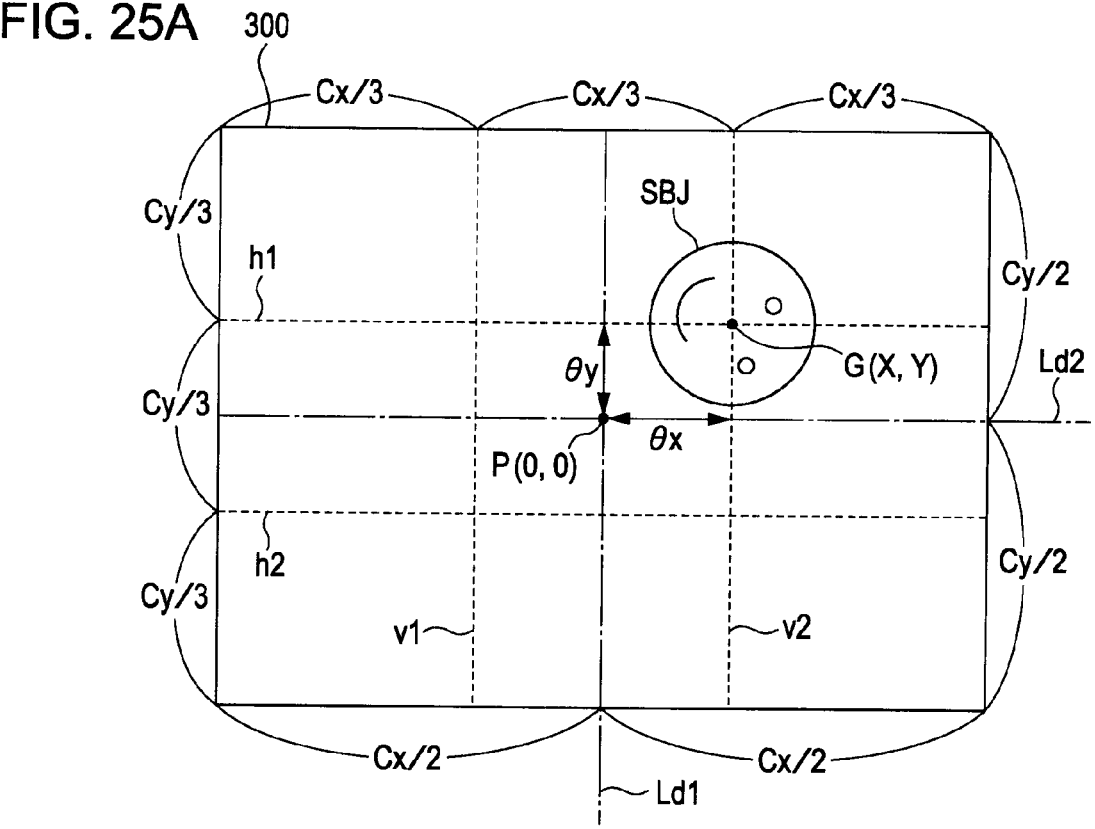
FIGS. 25A and 25B are diagrams illustrating an example of a control which is performed on the basis of a face rotation angle with reference to an immediately lateral direction in a case where the number of individual subjects is one, in a composition control according to the fourth example.

Further, as shown in FIG. 25A, in a state where the individual subject SBJ is in the right recumbent posture (the face of the individual subject SBJ is directed to the right side), and the face rotates to be inclined in the clockwise direction from 90°, the position of the gravity center G in the vertical direction is moved toward the upper area from the horizontal image area division line Ld2. For example, the horizontal offset amount and the vertical offset amount are set as θx=Cx/6 and θy=Cy/6, respectively.

Figure 25B:
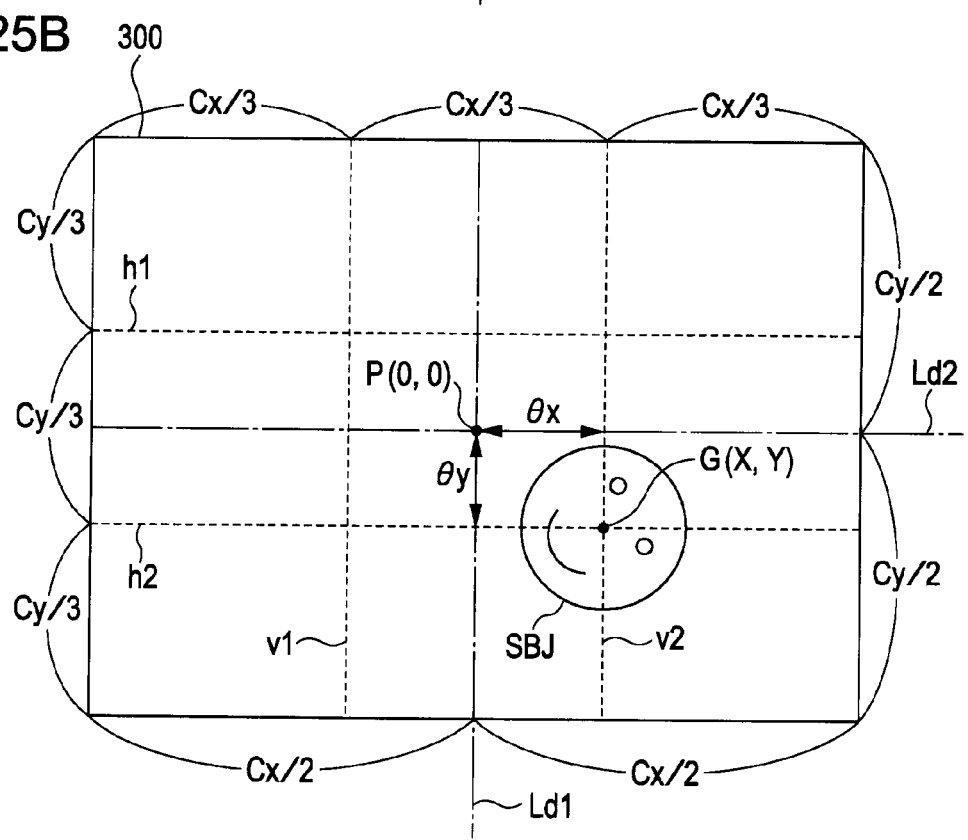

Furthermore, as shown in FIG. 25B, in a state where the individual subject SBJ is in the right recumbent posture, and the face rotates to be inclined in the clockwise direction from 90°, the position of the gravity center G in the vertical direction is moved toward the lower area from the horizontal image area division line Ld2. For example, the horizontal offset amount and the vertical offset amount are set as θx=Cx/6 and θy=Cy/6, respectively.

Figure 26A:
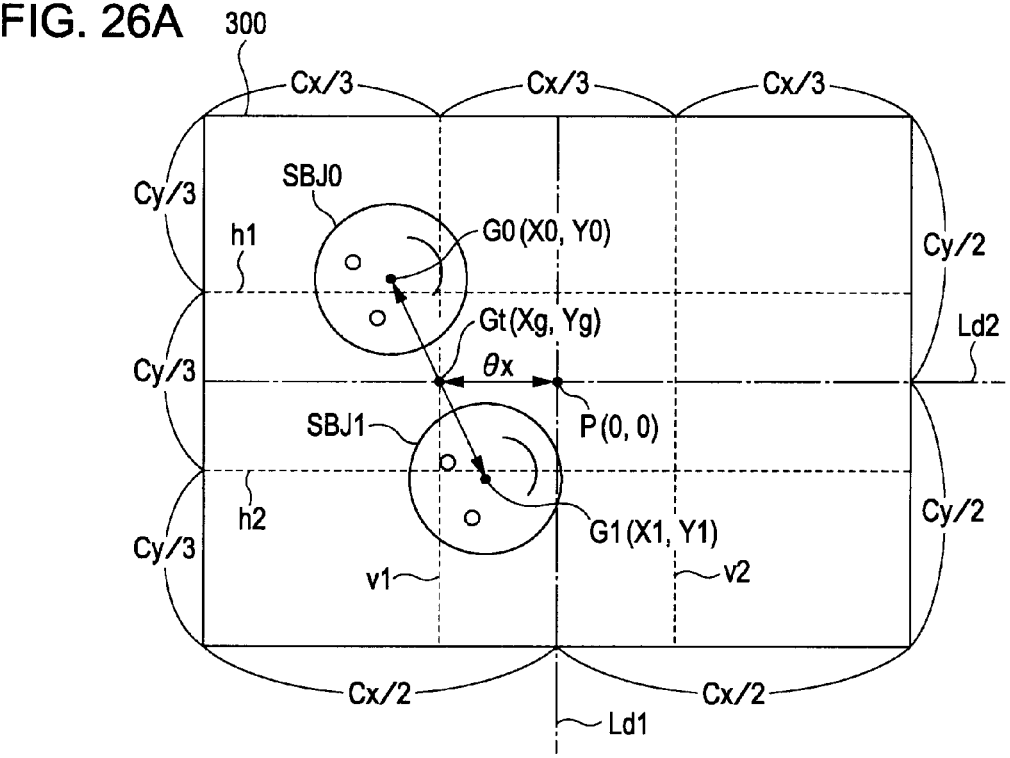
FIGS. 26A and 26B are diagrams illustrating an example of a control in a case where the number of individual subjects is two, in a composition control according to the fourth example.
Figure 26B:
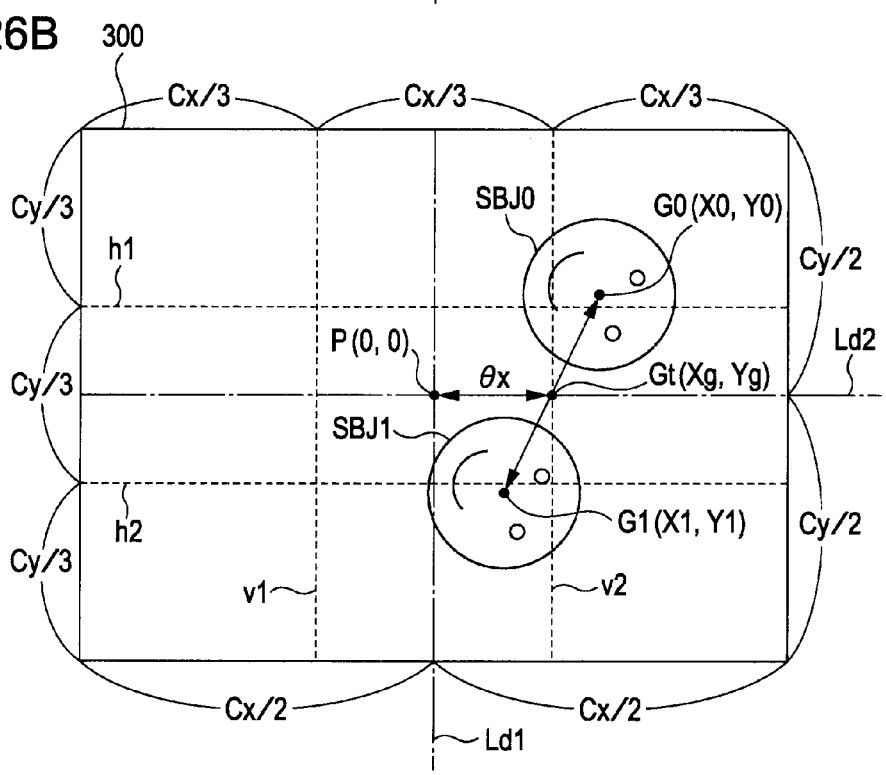

Further, FIGS. 26A and 26B illustrate a state where two individual subjects SBJ0 and SBJ1 which are individual subjects of the left recumbent posture and the right recumbent posture in the image frame 300 are present and both of the individual subjects SBJ0 and SBJ1 is recumbent in the same direction, respectively.

In this case, the above state is considered as a case where the individual subjects SBJ0 and SBJ1 have an equivalent degree of importance. Thus, the position of the total subject gravity center Gt of the individual subjects SBJ0 and SBJ1 in the vertical direction is located on the horizontal image area division line Ld2 by setting the vertical offset amount θy=0. Further, the total subject gravity center Gt in the horizontal direction is set to have any one of the horizontal offset amounts θx=−Cx/6 and θx=Cx/6, as the face rotation angles of the individual subjects SBJ0 and SBJ1 correspond to any one of −90° (an angle range considered as −90°) and +90° (an angle range considered as +90°).

Figure 27A:
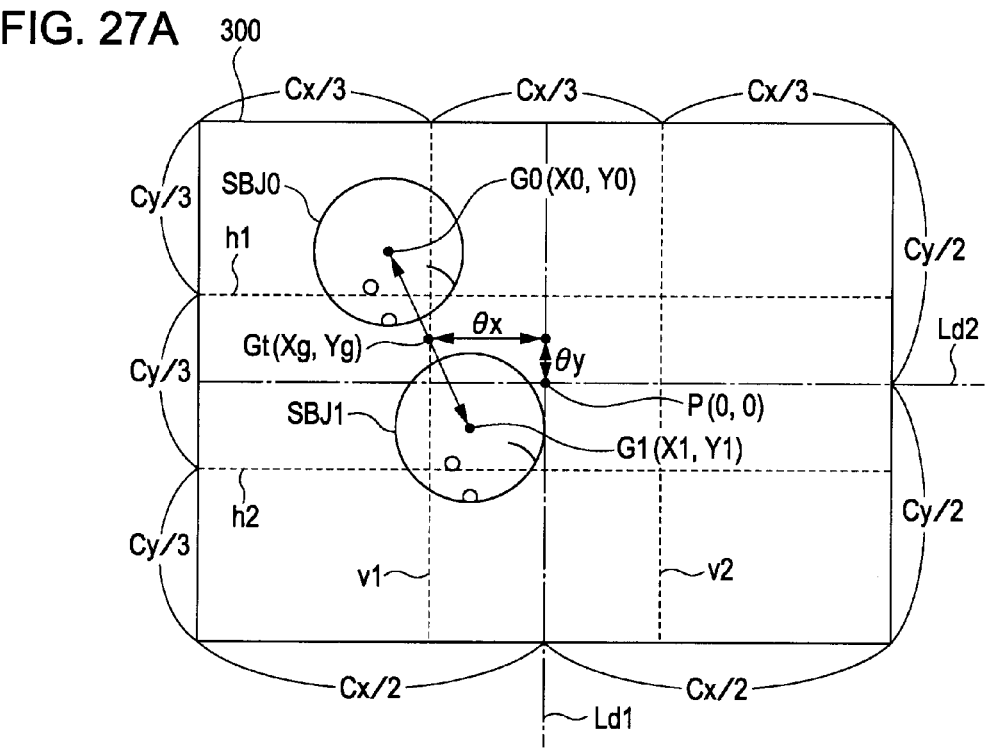
FIGS. 27A and 27B are diagrams illustrating an example of a control which is performed on the basis of a face rotation angle with reference to an immediately lateral direction in a case where the number of individual subjects is two and face directions are combined, in a composition control according to the fourth example.

Further, FIG. 27A illustrates a state where two individual subjects SBJ0 and SBJ1 are in the left recumbent posture (face rotation angle =−90°) in the image frame 300, and the face directions of both the individual subjects SBJ0 and SBJ1 are the down side.

In this case, in a similar way to the example in FIGS. 22A and 22B, the total subject gravity center Gt of the individual subjects SBJ0 and SBJ1 is moved to the upper area from the horizontal image area division line Ld2 in the vertical direction. Further, the movement amount is set as a vertical offset amount θy having a smaller value than that in the case where the number of the individual subjects is one, in a similar way to the example in FIGS. 12A and 12B or the like. In this case, the vertical offset amount may be set as θy=Cy/12. In addition, the horizontal offset amount is set as θx=−Cx/6.

Thus, a composition having impression in which the total subject image section of the individual subjects SBJ0 and SBJ1 is excessively leaning on the upper side is prevented, to thereby obtain a more appropriate composition.

Further, with respect to FIG. 27A, in a case where all the face directions of two individual subjects SBJ0 and SBJ1 are the down side, but the recumbent posture reversely becomes the right side (face rotation angle is +90°), for example, the movement amount of the total subject gravity center Gt is the same as the vertical offset amount θy=Cy/12, whereas the horizontal offset amount θx is inverted and becomes θx=Cx/6.

Further, with respect to FIG. 27A, the left recumbent postures of two individual subjects SBJ0 and SBJ1 are the same, but the movement amount of the total subject gravity center Gt, when the face directions are reversely the up side, is the same as the horizontal offset amount θx=−Cx/6, whereas the vertical offset amount θy is inverted and becomes θy=−Cy/12.

Figure 27B:
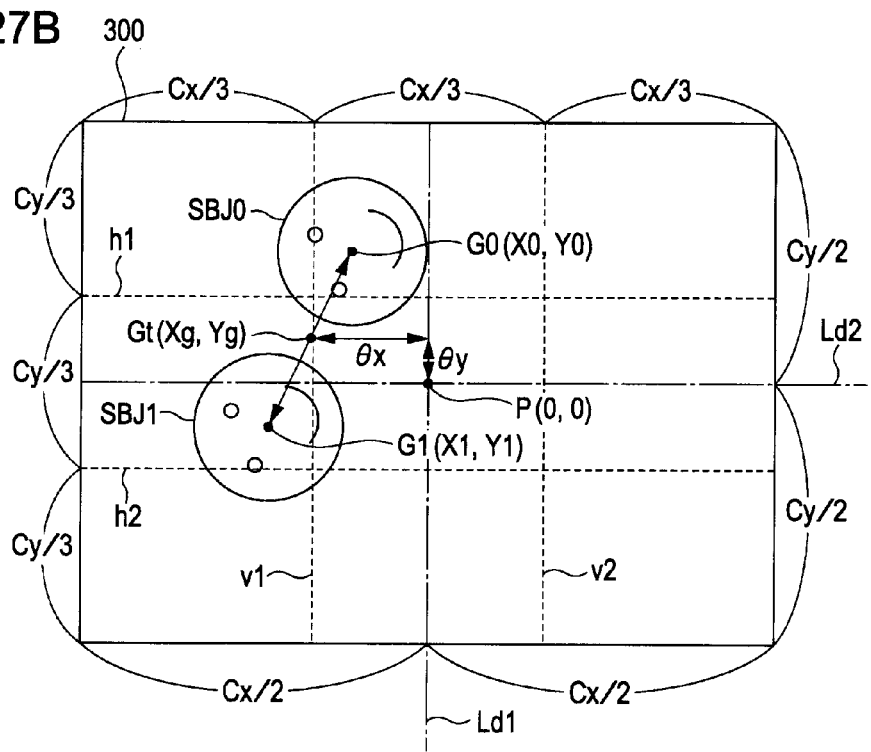

Further, FIG. 27B illustrates a state where two individual subjects SBJ0 and SBJ1 are in the left recumbent posture as in FIG. 24A, and the face rotation angle range rotates to be inclined in the clockwise direction from the angle range which is considered as −90°.

In this case, in a similar way to the case in FIG. 24A, the total subject gravity center Gt is moved to the upper area from the horizontal image area division line Ld2. Further, the movement amount is set which is smaller than that in the case where the number of the individual subjects is one. In the figure, the vertical offset amount is set as θy=Cy/12. The horizontal offset amount is set as θx=−Cx/6.

In addition, with respect to FIG. 27B, in a state where two individual subjects SBJ0 and SBJ1 are the same in the left recumbent posture, but the face rotation angle range rotates to be inclined in the counterclockwise direction from the angle range which is considered as −90°, the movement amount of the total subject gravity center Gt is set as follows. For example, the horizontal offset amount θx is the same θx=−Cx/6, but the vertical offset amount θy is inverted to become θy=−Cy/12.

Further, with respect to FIG. 27B, in a state where two individual subjects SBJ0 and SBJ1 are in the right recumbent posture, and the face rotation angle range rotates to be inclined in the counterclockwise direction from the angle range which is considered as +90°, the movement amount of the total subject gravity center Gt is set as follows. For example, the horizontal offset amount θx is set as θx=Cx/6 according to the right recumbent posture, and the vertical offset amount θy is set as θy=Cy/12, to thereby move the total subject gravity center Gt to the upper area from the horizontal image area division line Ld2.

Further, with respect to FIG. 27B, in a state where two individual subjects SBJ0 and SBJ1 are in the right recumbent posture, and the face rotation angle range rotates to be inclined in the clockwise direction from the angle range which is considered as +90°, the movement amount of the total subject gravity center Gt is set as follows. For example, the horizontal offset amount θx is set as θx=Cx/6, and the vertical offset amount θy is set as θy=−Cy/12, to thereby move the total subject gravity center Gt to the lower side from the horizontal image area division line Ld2.

In addition, in FIG. 27A, the face directions of the individual subjects SBJ0 and SBJ1 of the recumbent posture are different from each other. Further, in FIG. 27B, in a case where the face rotation angles of the individual subjects SBJ0 and SBJ1 of the recumbent posture are different from each other, for example, the vertical offset amount is set as θy=0, and thus, the movement amount in the vertical direction may be not given.

Figure 28A:
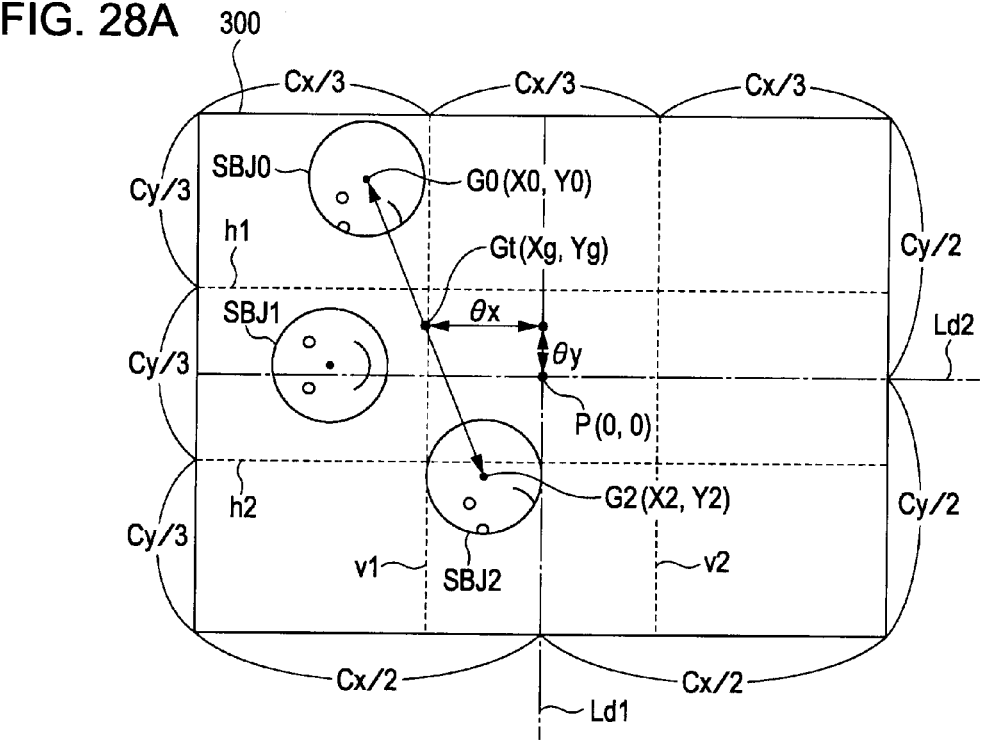
FIGS. 28A and 28B are diagrams illustrating an example of control which is performed on the basis of a face rotation angle with reference to an immediately lateral direction in a case where the number of individual subjects is three or more and face directions are combined, in a composition control according to the fourth example.

Further, FIG. 28A illustrates a case where three individual subjects SBJ0, SBJ1 and SBJ2 of the left recumbent posture are present in the image frame 300, the face direction of the individual subject SBJ0 is the down side, the face direction of the individual subject SBJ1 is the front side, and the face direction of the individual subject SBJ2 is the down side.

In this way, for example, in a state where three or more individual subjects of the recumbent postures are detected, in a case where the respective face directions are not the same, a reference face direction is determined in a similar way to the case in FIG. 15, and the vertical offset amount θy which is the movement amount in the vertical direction is set according to the determined reference face direction.

In the case of FIG. 28A, among the face directions of three individual subjects, the down direction which two individual subjects SBJ0 and SBJ2 face occupies the majority. Thus, in this case, the reference face direction is determined as the down side, and thus, the total subject gravity center Gt is moved to the upper side from the horizontal image area division line Ld2, to thereby set the vertical offset amount θy. In this respect, the vertical offset amount is set as θy=Cy/18. At this time, the vertical offset amount θy becomes a smaller value than that in the case where the number of the detected individual subjects is two. The horizontal offset amount θx is set as θx=−θx/6 according to the left recumbent posture.

Figure 28B:
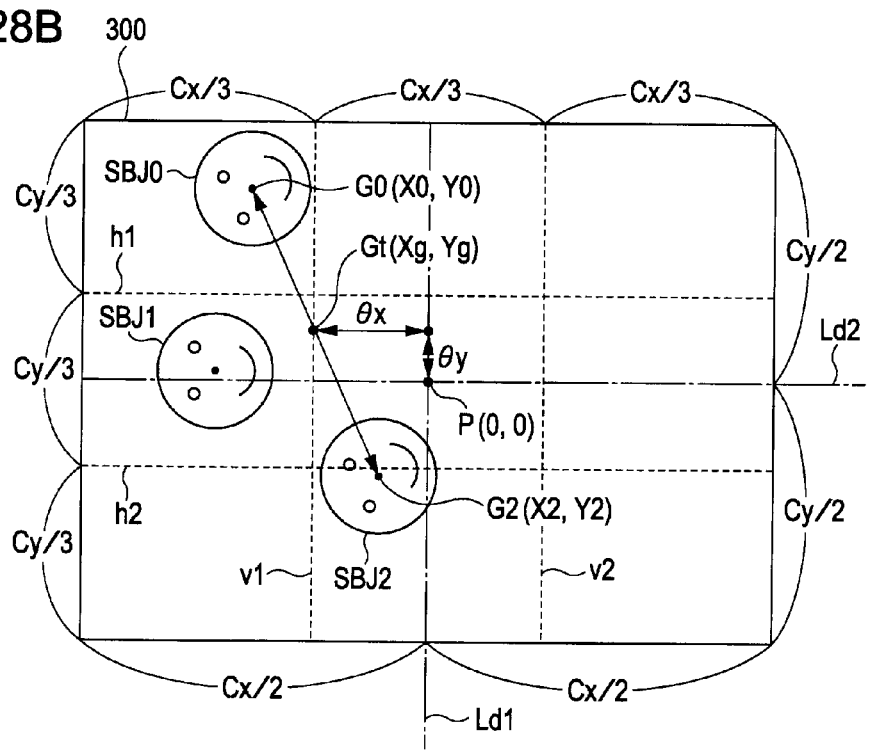

Further, FIG. 28B illustrates a state where three individual subjects SBJ0, SBJ1 and SBJ2 of the left recumbent postures are present in the image frame 300. Here, with respect to the face rotation angle, the individual subject SBJ1 is in an angle range which is considered as −90°, and the individual subject SBJ0 and SBJ2 are in an angle range which rotates to be inclined in the counterclockwise direction from the angle range which is considered as −90°.

In this way, for example, in the state where three or more individual subjects of the recumbent postures are detected, in a case where the respective face rotation angles (ranges) are not the same, the reference face rotation angle (in which the rotation angle includes the angle range) is determined in a similar way to the case in FIG. 15, and the vertical offset amount θy which is the movement amount in the vertical direction according to the determined reference face rotation angle is set.

In the case of FIG. 28B, the face rotation angles of two individual subjects SBJ0 and SBJ2 among three individual subjects are the same, and thus, the two individual subjects SBJ0 and SBJ2 occupy the majority. In this case, the face rotation angles (ranges) which are detected with respect to the individual subjects SBJ0 and SBJ2 are determined as the reference face rotation angle.

Further, according to the determined reference face rotation angle, the total subject gravity center Gt is moved to the upper side from the horizontal image area division line Ld2, for example, in a similar way to the case in FIG. 28A, the vertical offset amount is set as θy=Cy/18. The horizontal offset amount θx is set as θx=−Cx/6 according to the left recumbent posture.

7. Algorithm of Composition Control According to Face Rotation Angle 7-1. Setting of Face Rotation Angle Range Subsequently, an example of an algorithm of the composition control according to the face rotation angle will be described. According to the present embodiment, the face rotation angle is divided and set as follows, according to the composition controls as described above.

Figure 29:
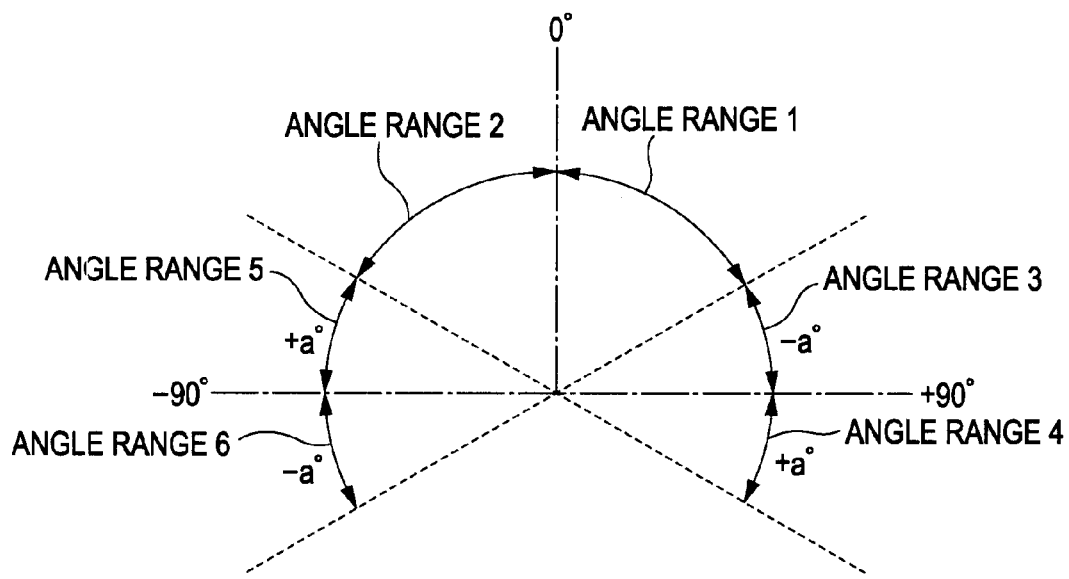
FIG. 29 is a diagram illustrating a division setting example of a face rotation angle corresponding to the composition controls of the third example and the fourth example.

FIG. 29 is a diagram schematically illustrating an example of a division setting with respect to a face rotation angle. In this respect, a method of calculating a value of the face rotation angle is the same as the method as described with reference to FIGS. 17A, 17B, and 17C. Hereinafter, the face rotation angle will be expressed as "fang".

First of all, the face rotation angle fang of 0° (a range considered as 0°) corresponds to the state where the face is upright without rotation, as shown in FIG. 18A. Next, the face rotation angle fang of −90° (a range considered as −90°) corresponds to the state where the face is directed to the left side in the immediately lateral direction, as shown in FIG. 20B; and the face rotation angle fang of +90° (a range considered as +90°) corresponds to the state where the face is directed to the right side in the immediately lateral direction, as shown in FIG. 21.

In this respect, the face rotation angles of 0°, +90° and −90° may actually have a certain degree of angle range. Although the values 0°, +90° and −90° of the face rotation angles strictly correspond to the states of the upright, immediately lateral right direction and immediately lateral left direction, respectively, it is difficult to accurately detect and determine the face directions corresponding to the face rotation angles is expected.

Thus, although not shown in FIG. 29, in the composition control, an angle range which is obtained by giving a margin of ±m° (for example, several degrees) to each of the strict values 0°, +90° and −90° may be preferably treated as the face rotation angles of 0°, +90° and −90°.

In addition, an angle range 1 which is 0°<fang<(+90°−a°) corresponds to a state where the face is not in the recumbent posture but is in a normal posture, that is, an inclined state where the face is rotated in the clockwise direction, as shown in FIG. 18B.

In FIG. 29, an angle range 2 which is 0°>fang>(−90°+a°) corresponds to a state where the face is not in the recumbent posture but is in a normal posture, that is, an inclined state where the face is rotated in the counterclockwise direction, in a way opposite to the posture as shown in FIG. 18B.

Further, an angle range 3 which is (+90°−a°)<fang<+90° corresponds to a state where the face is in the right recumbent posture, that is, an inclined state where the face is rotated in the clockwise direction, as shown in FIG. 25B.

Further, an angle range 4 which is +90°<fang<(+90°+a°) corresponds to a state where the face is in the right recumbent posture, that is, an inclined state where the face is rotated in the clockwise direction, as shown in FIG. 25A.

Further, an angle range 5 which is (−90°+a°)>fang>−90° corresponds to a state where the face is in the left recumbent posture, that is, an inclined state where the face is rotated in the counterclockwise direction, as shown in FIG. 24B.

Further, an angle range 6 which is −90°>fang>(−90°−a°) corresponds to a state where the face is in the left recumbent posture, that is, an inclined state where the face is rotated in the counterclockwise direction, as shown in FIG. 24A.

The face rotation angle detection according to the present embodiment is performed, for example, by calculating an angle value of the face rotation angle, and then, by determining that the calculated angle value corresponds to 0°, +90°, −90°, or any one of the angle ranges 1 to 6.

7-2. Algorithm Corresponding to Normal Posture

In the above description, the composition control according to the face rotation angle is performed by exemplifying the third example corresponding to the normal posture and the fourth example corresponding to the recumbent posture. The composition control algorithm according to the face rotation angle which will be described below is an algorithm in the case of a combination of the third example and the fourth example, with respect to the second example which is the composition control according to the face directions of the left and right sides. In this respect, an algorithm in the case of a combination of the first example and the third and fourth examples may be naturally employed, but here, the combination with respect to the second example in which the control corresponding to the plurality of individual subjects is performed in a high degree compared with the first example, is employed.

The algorithm corresponding to the composition control according to the second example is the same as the algorithm as described with reference to FIG. 16. In this embodiment, in a case where the composition control according to the second example is combined with the composition controls according to the third example and the fourth example, first of all, if it is detected that the positive determination result that the subject is detected is obtained in the determination process in step S203, the procedure as shown in FIG. 30 is performed.

In this respect, in the case where the composition control according to the second example is combined with the composition controls according to the third example and the fourth example, information about the face rotation angles of the detected individual subjects is obtained according to the subject detection performed in step S202.

Figure 30:
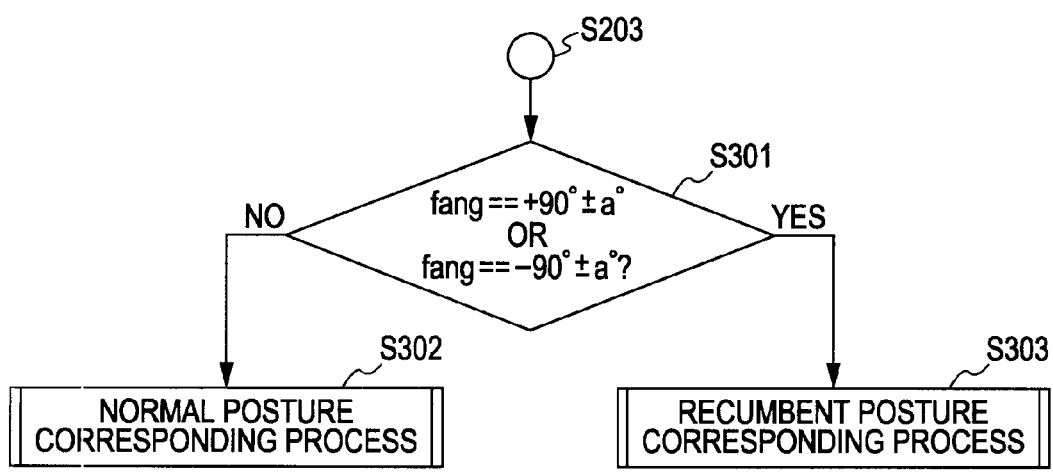
FIG. 30 is a flowchart illustrating a performing determination process between a normal posture corresponding process and a recumbent posture corresponding process.

Further, in step S301 in FIG. 30, it is determined whether the face rotation angle fang detected with respect to the individual subject is included in any one of angle ranges of fang==+90°±a° and fang==−90°±a°.

Referring to FIG. 29, the range of the face rotation angle fang==+90°±a° corresponds to any one of the following three states a, b and c.

a. a state of the range which is considered as the face rotation angle fang==+90°, that is, a state of the right recumbent posture in the immediately lateral direction b. a state of being included in the range of the face rotation angle fang==+90°+a°, corresponding to the angle range 4, that is, a state of being rotated in the clockwise direction from +90° in the right recumbent posture c. a state of being included in the range of the face rotation angle fang==+90°−a°, corresponding to the angle range 3, that is, a state of being rotated in the counterclockwise direction from +90° in the right recumbent posture That is, the face rotation angle fang==+90°±a° represents the right recumbent posture, that is, the state where the face detected as the individual subject is directed to the right side in the transverse direction.

Further, the range of the face rotation angle fang==−90°±a° corresponds to any one of the following three states d, e and f.

d. a state of the range which is considered as the face rotation angle fang==−90°, that is, a state of the right recumbent posture in the immediately lateral direction e. a state of being included in the range of the face rotation angle fang==−90°+a°, corresponding to the angle range 5, that is, a state of being rotated in the clockwise direction from −90° in the left recumbent posture f. a state of being included in the range of the face rotation angle fang==−90°−a°, corresponding to the angle range 6, that is, a state of being rotated in the counterclockwise direction from −90° in the left recumbent posture That is, the face rotation angle fang==−90°±a° represents the right recumbent posture, that is, the state where the face detected as the individual subject is directed to the left side in the immediately lateral direction.

Accordingly, in step S301, it is determined whether the detected individual subject is in the recumbent posture, that is, the detected face is transversely directed, without respect to the left side or the right side.

In this respect, in a case where the number of the detected individual subjects is two or more, in step S301, several algorithms may be employed.

As the simplest algorithm, when the face rotation angles of all the detected individual subjects correspond to fang==+90°±a°, or when the face rotation angles of all the detected individual subjects correspond to fang==−90°±a°, a positive determination result is obtained.

Further, for example, an algorithm may be employed, in which a positive determination result is obtained when the individual subjects corresponding to the fang==+90°±a° are equal to or larger than predetermined ratio among the entire individual subjects, or when the individual subjects corresponding to the fang==−90°±a° are equal to or larger than a predetermined ratio among the entire individual subjects.

Firstly, in a case where a negative determination result is obtained in step S301, the detected individual subject is in the normal posture other than the recumbent posture. That is, the face which is detected as the individual subject faces a longitudinal direction. With respect to FIG. 29, the detected face rotation angle fang is the angle range which is considered as 0°, or corresponds to any one of the angle ranges 1 and 2.

Then, in this case, as shown in step S302, a normal posture corresponding process is performed. Actually, this means that the processes of step S207 and after in FIG. 16 is performed.

Figure 31:
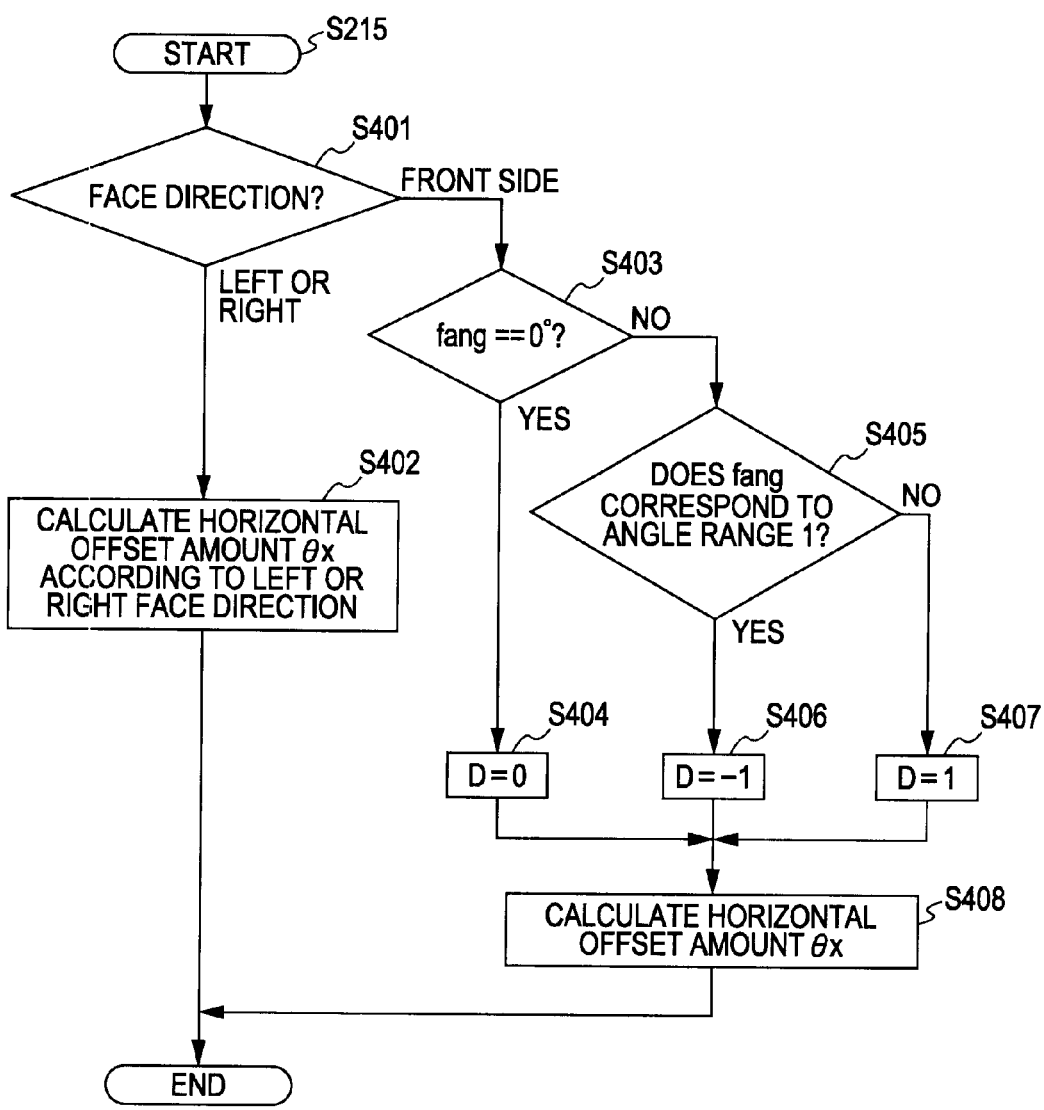
FIG. 31 is a flowchart illustrating a process procedure example for setting a horizontal offset amount corresponding to a case where the number of individual subjects is one, in a composition control in which the second example is combined with the third example and the fourth example.
Figure 32:
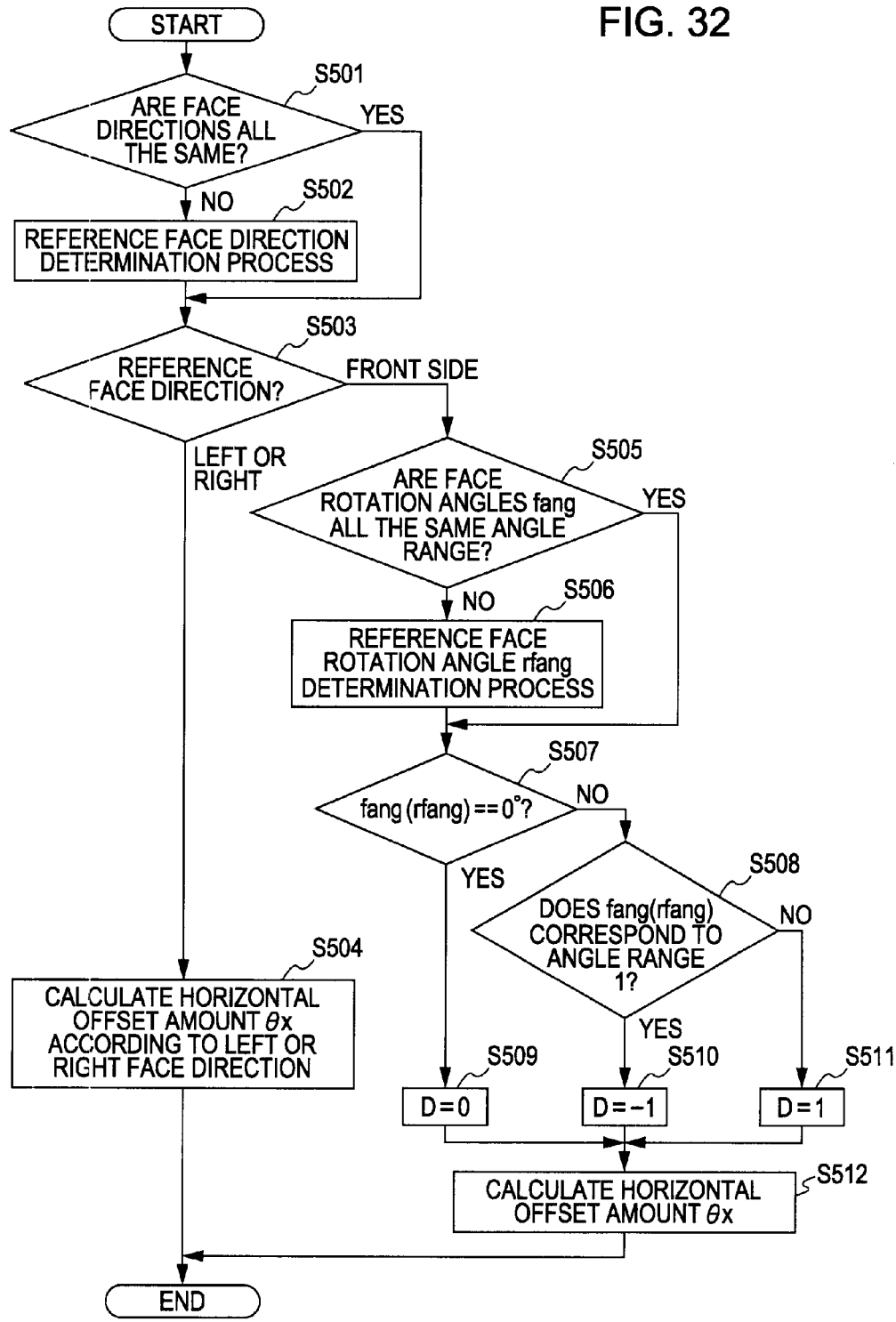
FIG. 32 is a flowchart illustrating an example of a process procedure for setting a horizontal offset amount corresponding to a case where the number of individual subjects is plural, in a composition control in which the second example is combined with the third example and the fourth example.

In this case, in the processes of step S207 and after in FIG. 16, a composition control according to the face rotation angle, in the normal posture according to the third example, is performed. Thus, in step S215 in FIG. 16, a process as shown in FIG. 31 is performed. Further, instead of the processes of steps S222 to S224 which are indicated by dashed lines in FIG. 16, a process as shown in FIG. 32 is performed.

As described above, as step S215 in FIG. 16, FIG. 31 illustrates a process to be performed corresponding to the combination of the composition control according to the third example, that is, a process for setting the horizontal offset amount θx corresponding to the case where the number of the detected individual subjects is one.

Step S401 in FIG. 31, it is determined whether the face direction which is detected with respect to the individual subjects is any one of the front side and the others (that is, the left and right sides).

In the second example, the face directions are detected in two stages of the left and right sides, but as can be understood from the above determination process, in a case where the composition controls of the third example and the fourth example are combined with the composition control of the second example, the face direction detection according to three stages of the left, right and front sides is performed. In this embodiment, this corresponds to a case where a face rotation angle range which is considered as being different from 0°, +90° and −90° is obtained, when the face direction is the front side. In reality, when the face direction is the left side or the right side, a face rotation angle other than 0° may be obtained, or when the face direction is the upper side or the down side, a face rotation angle other then ±90° may be obtained. However, with respect to the composition control corresponding to the face rotation angle in this embodiment, for simplicity and clarity of description, the face rotation angle is obtained only in the case where the face direction is the front side.

In step S401, in a case where a determination result that the detected face direction is different from the front side (the left or right side) is obtained, the procedure goes to step S402.

In step S402, according to the detection result of the left or right face direction, for example, using the same process as described in step S115 in FIG. 14 (step S215 in FIG. 1E), the horizontal offset amount θx is set according to the Equation 1.

In this respect, in a case where the determination result that the face direction is the front side is obtained in step S401, the procedure goes to step S403.

The procedure of step S403 and after becomes the process for setting the horizontal offset amount θx according to the face rotation angle.

In step S403, it is determined whether the face rotation angle which is detected with respect to the individual subject corresponds to a range which is considered as fang==0°. In a case where a positive determination result is obtained, the face of the individual subject SBJ is neither rotated nor inclined and may be considered as being in nearly an upright state. In this case, with respect to the coefficient D in the Equation 1, D=0, and the horizontal offset amount θx is calculated according to the operation using the Equation 1 in step S408. In this case, since D is 0, the horizontal offset amount θx becomes 0. That is, the movement of the gravity center G in the horizontal direction is not performed, and is positioned on the vertical image area division line Ld1.

In this respect, in step S403, in a case where a negative determination result is obtained, the procedure goes to step S405.

In step S405, the face rotation angle fang which is detected with respect to the individual subject corresponds to any one of the angle ranges 1 and 2 in FIG. 29. Thus, in step S405, it is determined whether the detected face rotation angle fang corresponds to the angle range 1.

In a case where a positive determination result is obtained in step S405, the face of the individual subject rotates to be inclined toward the right side. In this case, the coefficient D is set as −1 in step S406, and the horizontal offset amount θx is calculated according to the operation using the Equation 1 in Step S408. In this case, the horizontal offset amount is set as θx=−Cx/6, and thus, as shown in FIG. 18B, the composition is obtained in which the subject is shifted to the left area from the vertical image area division line Ld1 in the image frame 300.

In this respect, in a case where a negative determination result is obtained in step S406, the face rotation angle fang corresponds to the angle range 2 in FIG. 29. That is, the face of the individual subject rotates to be inclined to the left side.

In this case, the coefficient D is set as 1 in step S407, and the horizontal offset amount θx is calculated according to the operation using the Equation 1 in Step S408. In this case, the horizontal offset amount is set as θx=Cx/6, and thus, as shown in FIG. 18B, the right and left sides are inverted, the composition is obtained in which the subject is shifted to the right area from the vertical image area division line Ld1 in the image frame 300.

FIG. 32 illustrates processes to be performed, which correspond to the combination with respect to the composition control of the third example, instead of steps S222 to S224 (processes which are indicated by dashed lines) in FIG. 16. The processes in FIG. 32 is performed so that the horizontal offset amount θx is set corresponding to the case where the number of the detected individual subjects is two or more (plural).

In step S501, in a similar way to step S222 in FIG. 16, it is detected whether all the face directions which are detected for the plurality of individual subjects are the same. Further, in this respect, the detected face directions correspond to the three stages of the left side, the right side and the front side, according to the combination with respect to the composition control according to the third example.

In a case where a positive determination result is obtained in step S501, the procedure skips step S502 and then goes to step S503. In this respect, in a case where a negative determination result is obtained, a reference face direction determination process is performed in step S502 and the procedure goes to step S503. The reference face direction determination process may perform the same process as in step S222-1 in FIG. 16. Further, even though the reference face direction determination process is performed, one reference face direction may not be determined, but in this case, for example, a determination result that the reference face direction is the front side may be obtained.

In step S503, it is determined whether the face direction which is determined as all the same in step S501, or the reference face direction which is determined in step S502 is any one of the front side and the other side (the right side or the left side).

In this respect, in a case where it is determined that the face direction or the reference face direction is the other side (the right side or the left side), the procedure goes to step S504, and the horizontal offset amount θx is calculated according to the operation using the Equation 1 in a similar way to step S223, according to the face direction which is detected as the left side or the right side.

In this respect, in step S503, in a case where a determination result that the face direction is the front side is obtained, the procedure goes to step S505 and after.

In step S505, it is determined whether the face rotation angles fang which are detected for the plurality of individual subjects correspond to all the same angle range. In a case where a positive determination result is obtained in step S505, the procedure skips step S506 and then goes to step S507. To the contrary, in a case where a negative determination result is obtained in step S505, a process for determining a reference face rotation angle rfang is performed in step S506, and then the procedure goes to step S507.

The process for determining the reference face rotation angle rfang is determined may be performed in a similar way to the reference face direction determination process in step S502. Further, in this respect, for example, a precise angle value may be calculated as the reference face rotation angle determination process. For example, with respect to FIG. 29, it may be determined whether the precise angle value corresponds to any one of 0° (an angle range considered as 0°), the angle range 1 and the angle range 2.

The processes of steps S507 to S512 are the same as in steps S403 to S408 in FIG. 31, except that information about the face rotation angles which become determination targets in steps S507 and S508 correspond to the plurality of individual subjects, and that the horizontal offset amount θx which is calculated in step S512 is used with respect to the total subject gravity center Gt of the plurality of individual subjects.

In this way, by applying the processes as shown in FIGS. 31 and 32 to the processes as shown in FIG. 16, the composition control which the third example is combined with the second example can be realized. That is, the composition control based on the face direction and the face rotation angle can be realized with respect to the individual subject of the normal posture.

7-3. Algorithm Corresponding to Recumbent Posture

Further, as the positive determination result is obtained in step S301 in FIG. 30, the recumbent posture corresponding process of step S303 is performed. The recumbent posture corresponding process corresponds to the processes of step S607 and after in FIG. 33, and is performed to obtain the composition as described with reference to FIGS. 20A, and 20B to FIGS. 28A, and 28B.

In the figure, steps S201 to S206 illustrates the same processes of steps S201 to S206 in the procedure as shown in FIG. 16, to which the processes of FIGS. 31 and 32 are applied. According to the determination result in step S203 as shown in FIG. 30, when it is determined that the normal posture corresponding process is to be performed, the processes in step S207 and after in FIG. 16 are performed. In this respect, when it is determined that the recumbent posture corresponding process is to be performed, the processes in step S607 and after in FIG. 33 are performed.

Figures 33, 33A:
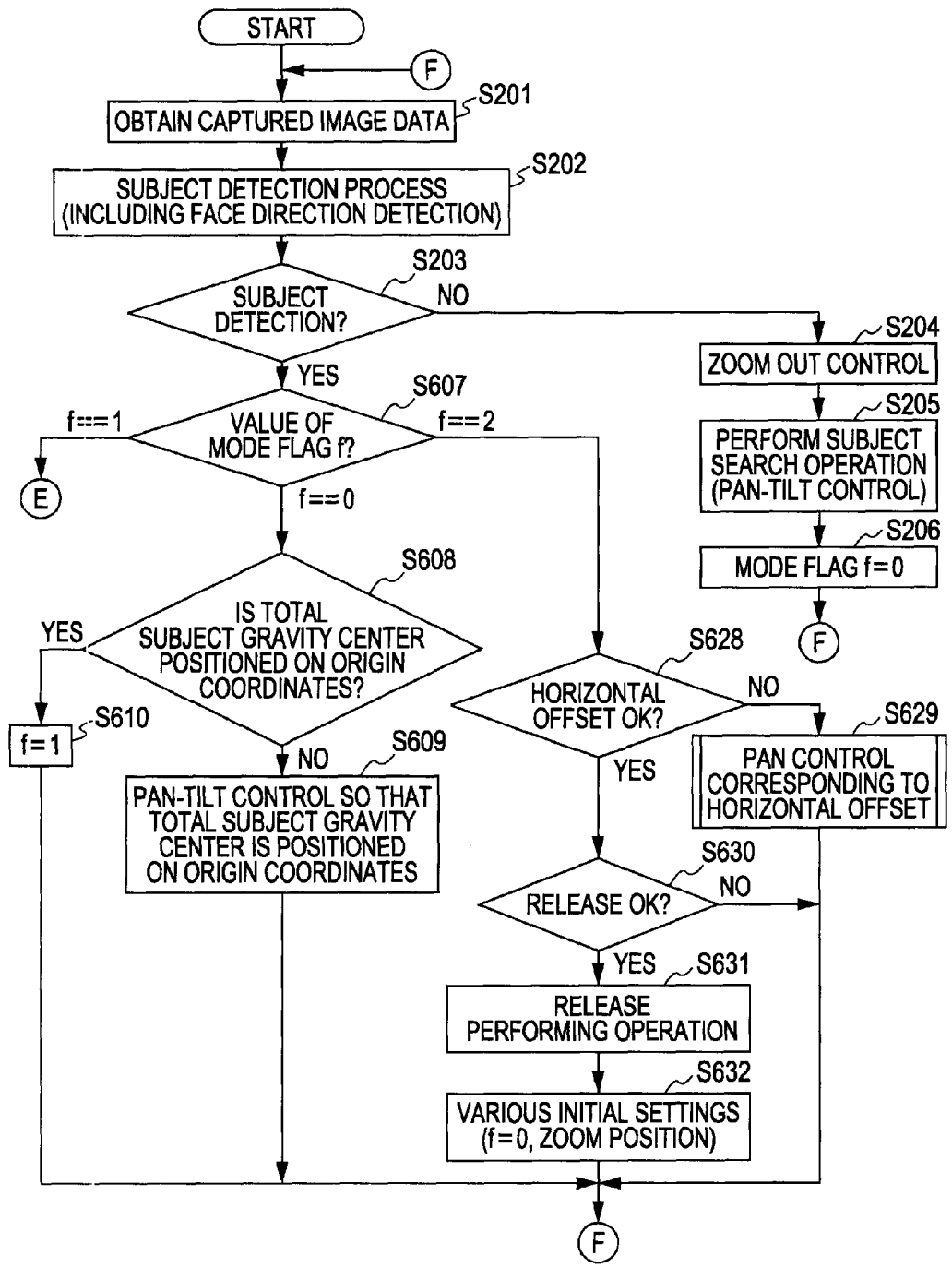
FIG. 33 is a flowchart illustrating a recumbent posture corresponding process.
Figure 33B:
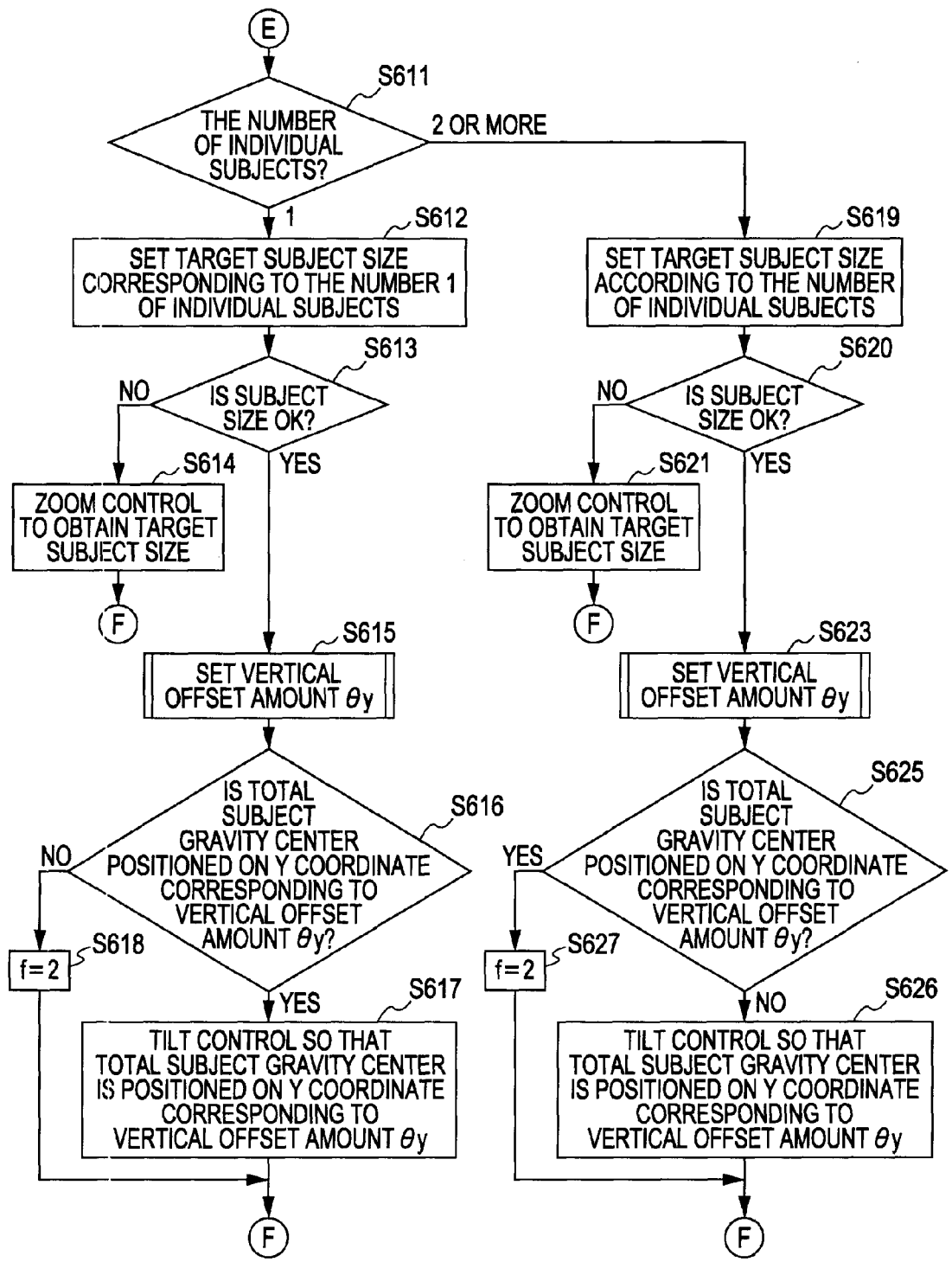

Further, in FIG. 33, respective processes in steps S608 to S610, S611 to S614, S619 to S621 and S630 to S632, and steps S610, S618 and S627 for setting the mode flag f are the sane as in steps S208 to S210, S211 to S214, S219 to S221, S230 to S232, S210, S218 and S227 in FIG. 16.

In a case where the detected individual subject is one, as the individual subject is in the recumbent posture, in step S615, the vertical offset amount θy is set, instead of the horizontal offset amount θx. In the first and second composition controls, the vertical image area division line Ld1 is set as the reference for setting the gravity center position of the image section of the individual subject according to the face direction. In this respect, in the composition controls according to the third example and the fourth example, the horizontal image area division line Ld2 is set as the reference for setting the gravity center position of the image section of the individual subject according to the face direction.

In steps S616 and S617, the total subject gravity center Gt (subject gravity center G) is positioned on the y coordinate corresponding to the vertical offset amount θy which is set in step S615, and thus, the tilt control is performed.

Figure 34:
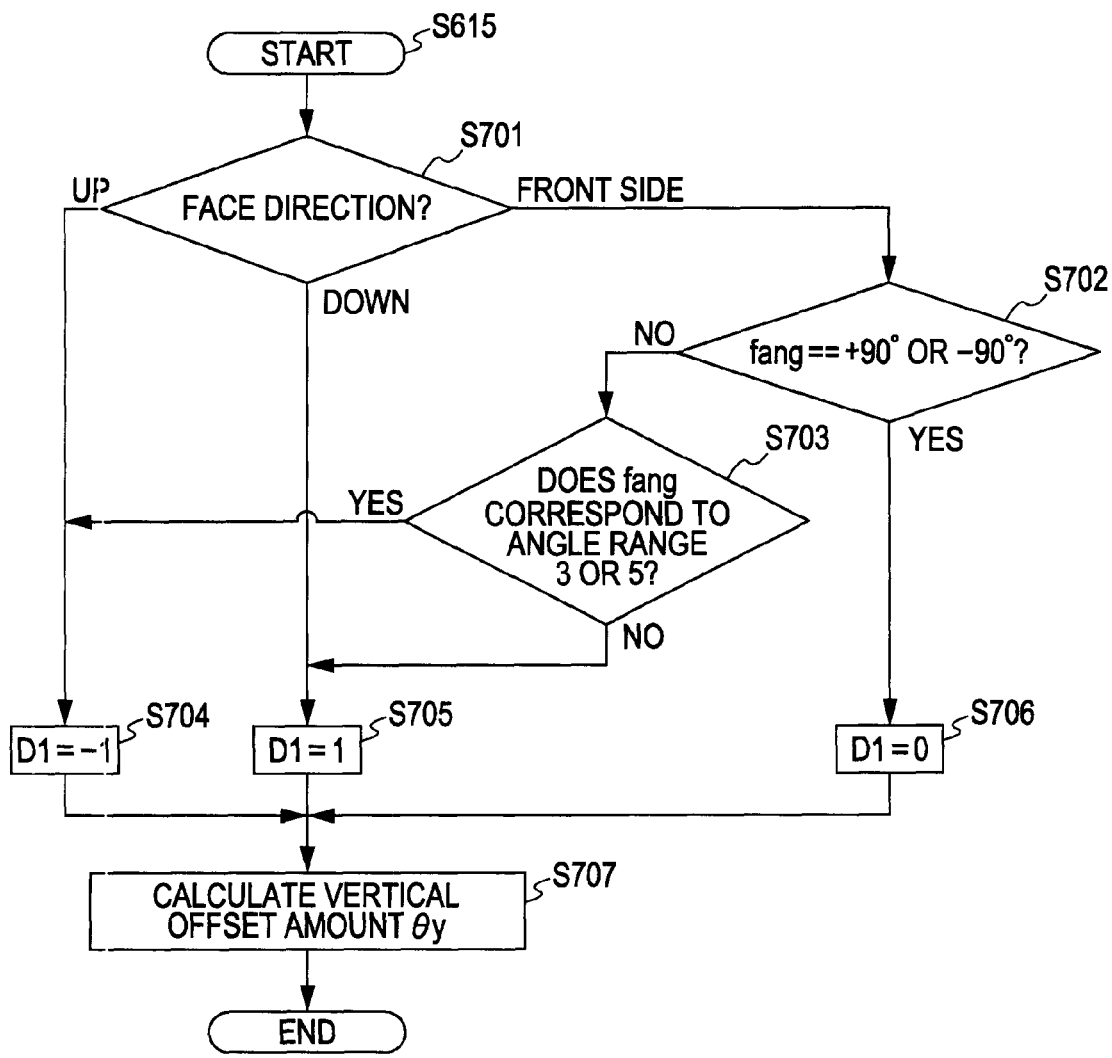
FIG. 34 is a flowchart illustrating an example of a process procedure for setting a horizontal offset amount corresponding to a case where the number of individual subjects is one in a recumbent posture corresponding process.

FIG. 34 is a flowchart illustrating an example of an algorithm for setting the vertical offset amount θy in a case where the detected individual subject of the recumbent posture is one, in step S615.

In this case, since it is detected that the individual subject has been already in the recumbent posture, the detected face direction becomes any one of the three stages of the up side, the down side, and the front side.

In step S701 in FIG. 34, it is determined whether the face direction which is detected with respect to the individual subject is any one of the up side, the down side and the front side.

Firstly, in the case where it is determined that the face direction is the up side, in a state where the individual subject is in the left or right recumbent posture, the face direction is the down side. In this case, the coefficient D1 is set as D1=−1 in step S704. That is, the coefficient D1 is given −1. In this respect, the coefficient D1 becomes a coefficient which is used in Equation 2 for calculating the vertical offset amount θy which will be described later.

In step S707, the vertical offset amount θy is calculated. To this end, the following Equation 2 is used.

$$\theta y = D1 \times (Cy/6)/n \quad \text{(Equation 2)}$$

In the Equation 2, as can be understood from the description below, the coefficient D1 is obtained on the basis of the face direction or the face rotation angle of one individual subject, and a combination (relationship) of the face directions of the plurality of individual subjects or a combination (relationship) of the face direction angles, and is set as any one of +1, 0 and −1. Further, the variable n in the Equation 2 represents the number of the detected individual subjects. In the processes in FIG. 34, since the number of the detected individual subjects is one, the variable n becomes 1.

In this respect, as described above, in a case where it is determined that the face direction is the down side in step S701, and the coefficient is set as D1=−1 in step S704, the vertical offset amount θy=−Cy/6 is calculated according to the operation of θy=−1×(Cy/6)/1, in step S707. Further, as the tilt control in steps S616 and S617 is performed on the basis of the vertical offset amount θy=−Cy/6, and thus, the position of the individual subject gravity center G in the vertical direction as shown in FIG. 22B or FIG. 23B is obtained. In this case, the setting of the horizontal offset amount θx according to the state where the recumbent posture is any one of the left side and the right side is performed, and the pan control according to the above setting is performed, in step S629. Step S629 will be described later.

Further, in the case where it is determined that the face direction is the down side in step S701, the coefficient D1 is set as 1 in step S705, and the vertical offset amount is calculated as θy=Cy/6 in step S707. As a result of the processes of steps S616 and S617 based on the vertical offset amount θy, for example, the position of the subject gravity center G in the vertical direction as shown in FIG. 22A or FIG. 23A is obtained.

Further, in the case where it is determined that the face direction is the front side in step S701, the procedure goes to step S702.

In step S702, it is determined whether the face rotation angle fang which is detected with respect to the individual subject is in the angle range considered as +90° or the angle range considered as −90°. Here, in a case where a positive determination result is obtained, the individual subject is in a state where the face is neither rotated nor inclined, that is, in a state where the individual subject is in the right recumbent posture or the left recumbent posture in nearly an immediately lateral direction.

In this case, the coefficient D1 is set as 0 in step S706, and the vertical offset amount θy is calculated as 0 in step S707. That is, in this case, the subject gravity center Gt is positioned on the horizontal image area division line Ld2, and thus, for example, the position of the subject gravity center G in the vertical direction as shown in FIG. 20B or FIG. 21 is obtained.

In this respect, in a case where a negative determination result is obtained in step S702, the face rotation angle of the individual subject corresponds to any one of the angle range 3, the angle range 4, the angle range 5, and the angle range 6 in FIG. 29. In this case, the procedure goes to step S703, and it is determined whether the face rotation angle fang corresponds to any one of the angle range 3 and the angle range 5. The angle range 3 and the angle range 5 are all in a state where the face of the transverse direction rotates to be inclined upward.

In a case where a positive determination result is obtained in step S703, the coefficient D1 is set as −1 in step S704, and the vertical offset amount is calculated as θy=−Cy/6 in step S707. Thus, the position of the subject gravity center G in the vertical direction as shown in FIG. 24B or FIG. 25B is obtained.

In a case where a negative determination result is obtained in step S703, the face rotation angle of the individual subject corresponds to any one of the angle range 4 and the angle range 6. The angle range 3 and the angle range 5 are all in a state where the face of the transverse direction rotates to be inclined downward.

Further, in this case, the coefficient D1 is set as 1 in step S705 and the vertical offset amount is calculated as θy=Cy/6 in step S707. Thus, the position of the subject gravity center G in the vertical direction as shown in FIG. 24A or FIG. 25A is obtained.

Figure 35:
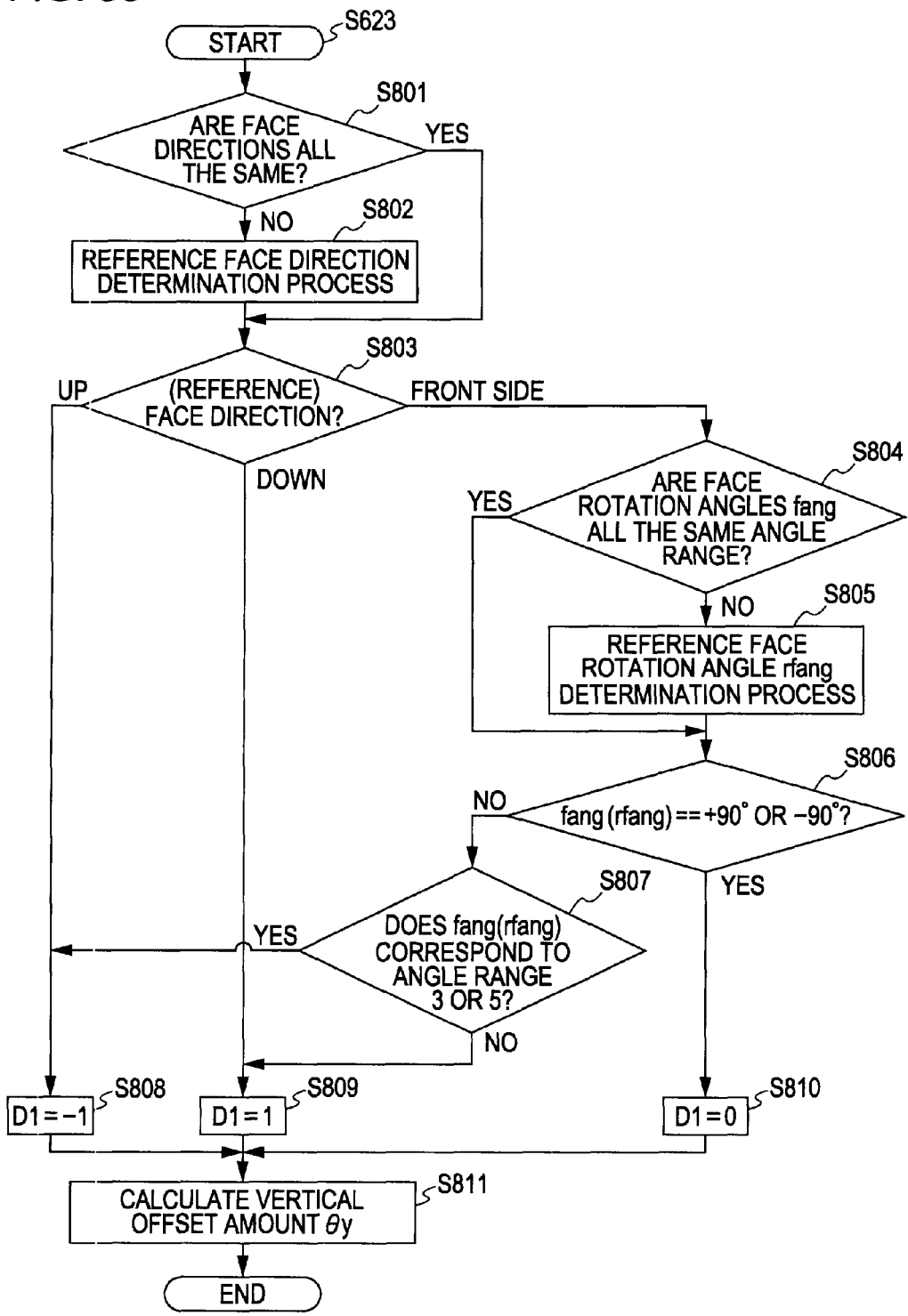
FIG. 35 is a flowchart illustrating an example of a process procedure for setting a horizontal offset amount corresponding to a case where the number of individual subjects is plural in a recumbent posture corresponding process.

Next, FIG. 35 is a flowchart illustrating an algorithm in step S623 which is a process for setting the vertical offset amount θy in a case where the plurality of individual subjects is detected in FIG. 33.

In FIG. 35, steps S801 to S803 are the same as steps S501 to S503 in FIG. 32. In this respect, in step S803, it is determined whether the same face direction or the reference face direction which is determined in step S502 is any one of the up side, the down side and the front side.

Further, in a case where it is determined the face direction (reference face direction) is the up side, the procedure goes to step S808 and the coefficient D1 is set as −1, and the vertical offset amount θy is calculated according to the operation using the Equation 2 in step S811. In this case, the vertical offset amount θy has a negative value and is changed according to the number n of the detected individual subject. That is, a value of the vertical offset amount is calculated as θy=−(Cy/6)/2.

Further, in step S803, in a case where it is determined that the face direction (reference face direction) is the down side, the coefficient D1 is set as 1 in step S809, and thus, a value of the vertical offset amount is calculated as θy=(Cy/6)/2 according to the number n of the individual subject. For example, through the processes from step S803 to step S809, the position of the total subject gravity center Gt in the vertical direction as shown in FIG. 27A or FIG. 28A is obtained.

Next, in a case where it is determined that the face direction (reference face direction) is the front side in step S803, the procedure goes to step S804.

In step S804, it is determined whether the angle ranges corresponding to the face rotation angles fang for the individual subjects are all the same. In this case, it has been already determined that the individual subject is in the recumbent posture. Accordingly, in this case, with respect to FIG. 29, the angle range corresponds to any one of the six angle ranges of the angle range considered as +90°, the angle range considered as −90°, the angle range 3, the angle range 4, the angle range 5 and the angle range 6. For example, if the face rotation angles of all the individual subjects correspond to the angle range 3, a positive determination result is obtained in step S804.

In the case where the positive determination result is obtained in step S804, the procedure skips step S805 and then goes to step S806. In this respect, if a negative determination result is obtained in step S804, a process for determining the reference face rotation angle rfang is performed in step S805, and then, the procedure goes to step s806. The reference face rotation angle determination process in step S805 may be performed in a similar way to step S222-1 in FIG. 16, like step S507 in FIG. 32.

In this respect, in step S703, the reference face rotation angle rfang is determined as any one of the angle range considered as +90°, the angle range 3, the angle range 4, the angle range considered as −90°, the angle range 5 and the angle range 6. In step S705, the reference face rotation angle rfang is determined as one of the angle range considered as 0°, the angle range 1 and the angle range 2.

In step S806, it is determined whether the face rotation angle fang which is determined as the same in step S804 or the reference face rotation angle rfang which is determined in step S805 corresponds to any one of +90° and −90°.

In a case where a positive determination result is obtained in step S806, the faces of the plurality individual subjects are in a state where the faces are directed to a nearly immediately lateral direction, and are neither rotated nor inclined upward or downward.

Further, in this case, the coefficient D1 is set as 0 in step S810, and the vertical offset amount is calculated as θy=0 in step S811. Thus, for example, the position of the total subject gravity center Gt in the vertical direction as shown in FIGS. 26A and 26B is obtained.

In a case where a negative determination result is obtained in step S806, the face of the individual subject becomes in a state where the faces are rotated to be inclined upward or downward. That is, the face rotation angle fang or the reference face rotation angle rfang is in a state corresponding to one of the angle ranges 3 to 6 in FIG. 29.

Further, in this case, in step S807, in a similar way to step S703 in FIG. 34, it is determined whether the face rotation angle fang (reference face rotation angle rfang) corresponds to any one of the angle range 3 and the angle range 5. In this respect, if a positive determination result is obtained, the coefficient D1 is set as −1 in step S808.

Further, in a case where a negative determination result is obtained in step S807, the face rotation angle (or reference face rotation angle) of the individual subject corresponds to any one of the angle range 4 and the angle range 6. Thus, in this case, the coefficient D1 is set as 1 in step S809.

Thus, for example, the position of the total subject gravity center Gt in the vertical direction as shown in FIGS. 27B and 28B is obtained.

Figure 36:
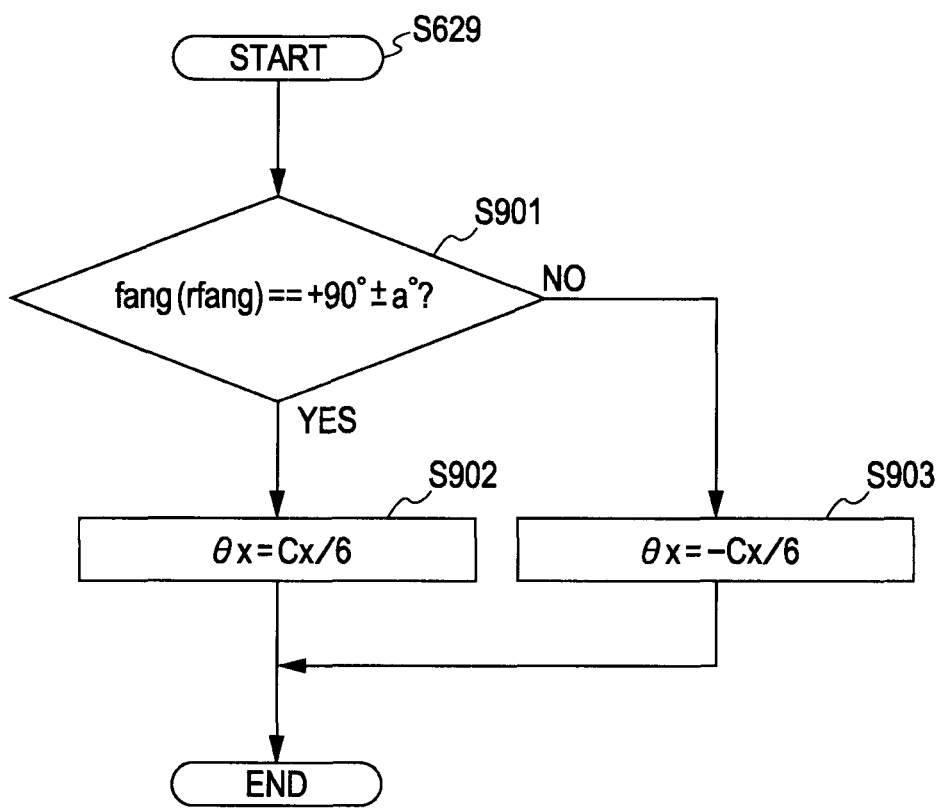
FIG. 36 is a flowchart illustrating an example of a process procedure for setting a vertical offset amount in a recumbent posture corresponding process.

FIG. 36 is a flowchart illustrating an example of a setting process of the horizontal offset amount θx in the horizontal offset corresponding pan control in step S629 in FIG. 33.

In this respect, firstly, in S901, it is determined whether the face rotation angle fang corresponds to the ranges of +90°±a°. That is, it is determined whether the face rotation angle fang corresponds to any one of the angle range considered as +90°, the angle range 3 and the angle range 4. That is, it is determined whether the individual subject is the right recumbent posture.

Further, in a case where the individual subjects is plural, the determination in step S901 is performed on the basis of the face rotation angle fang which is determined as the same with respect to the plurality of individual subjects or the reference face rotation angle rfang which is determined in step S805 in FIG. 35.

In a case where a positive determination result is obtained in step S901, for example, the horizontal offset amount is set as θx=Cx/6 in step S902, as the simplest process corresponding to the above description.

In this respect, in the case where a negative determination result is obtained in step S901, the face rotation angle fang (or reference face rotation angle rfang) corresponds to any one of the range considered as −90°, the angle range 5 and the angle range 6 in FIG. 29, and thus, the individual subject is in the left recumbent posture.

Thus, in this case, the horizontal offset amount is set as θx=−Cx/6 in step S903.

Further, in step S629, the pan control is performed so that the total subject gravity center Gt is positioned in the X coordinate corresponding to the horizontal offset amount θx which is set as described above. Thus, for example, as shown in FIGS. 26A, 26B or the like, as the recumbent posture of the individual subject is any one of the left side and the right side, the position of the total subject gravity center Gt in the horizontal direction is appropriately moved.

In the above description thus far, firstly, in the normal posture, the control is performed so that the composition is changed according to the three stages of the angle range considered as 0° (reference), the angle range 1 and the angle range 2, with respect to the face rotation angle. However, for example, an algorithm may be considered in which the angle range including 0° (the angle range considered as 0°), the angle range 1 and the angle range 2 is divided into multiple stages and the detection of the face rotation angle (range) is performed, and the vertical offset amount θy is changed in more detail according to the stages of the face rotation angles (ranges) which are detected in this way.

Further, similarly, in the case of the recumbent posture, with respect to the left recumbent posture, the range of −90°±a° is detected in the multi stages more than the three stages of −90°, the rotation angle range 5 and the rotation angle range 6. Further, with respect to the right recumbent posture, the range of +90°±a° is detected in the multi stages more than the three stages of +90° (angle range considered as)+90°, the rotation angle range 3 and the rotation angle range 4. Further, the vertical offset amount θy may be changed in more detail on the basis of the detection result.

Further, in the composition controls according to the third example and the fourth example, the target portion of the individual subject in which the rotation angle is detected is the face of a human being, but the rotation angle of a specific target portion which is different from the face of the human being may be detected, to thereby perform, for example, the composition control similar to the third example and the fourth example.

8. Self Timer Automatic Activating Function

Next, an example will be described in which the configuration of the composition control based on the face rotation angle which has been described thus far is applied to a self timer automatic activating function. Further, in the application of the self timer automatic activating function, it is not necessary to combine the digital still camera with the camera platform, in a similar way to the imaging system according to the present embodiment. For example, only the digital still camera 1 may be used.

The self timer automatic activating function is as follows.

For example, a user may perform a manipulation with respect to the digital still camera 1 so that the self timer automatic activating function is set to a turned on state.

Figure 37A:
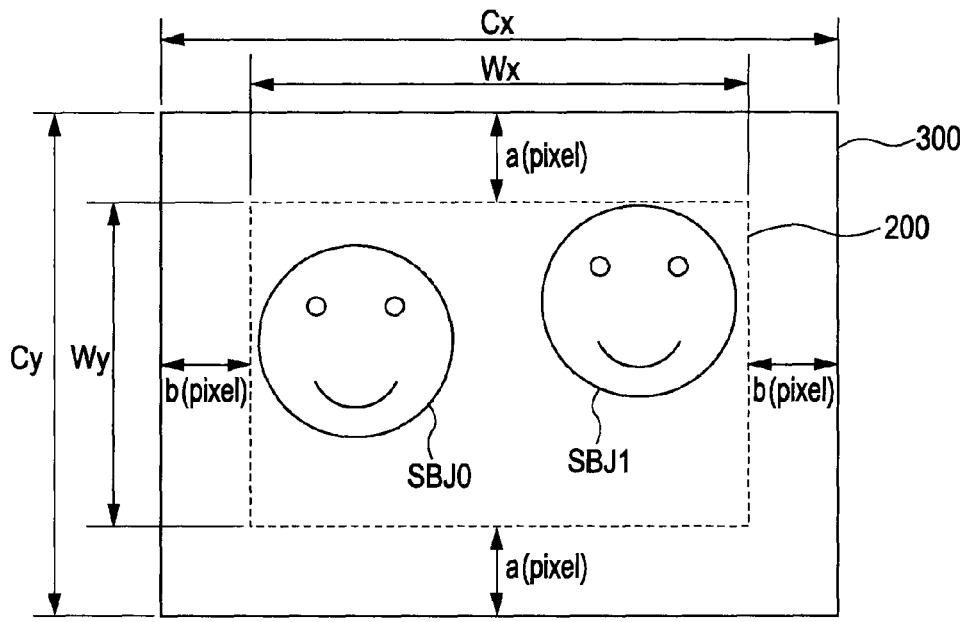
FIGS. 37A and 37B are diagrams illustrating an operation as a self timer automatic activating function according to an embodiment of the invention.

If the self timer automatic activating function is set to the turned on state, the digital still camera 1 sets a self timer activating range 200 in the image frame 300 of images obtained, for example, by imaging, as shown in FIG. 37A.

The self timer activating range 200 is set as a frame having a predetermined size, which is smaller than the image frame 300.

In this case, the self timer activating range 200 has a margin (dead region) which corresponds to the number b of pixels with respect to the image frame 300, in the left or right sides with reference to a horizontal width Wx corresponding to the horizontal direction in FIG. 37A. That is, if the number of the horizontal pixels of the image frame 300 is expressed as Cx, Wx=Cx-2b, and a midpoint of the Wx coincides with a midpoint of Cx.

Further, the self timer activating range 200 has a margin (dead region) which corresponds to the number a of pixels with respect to the image frame 300, in the up or down sides with reference to a vertical width Wy corresponding to the vertical direction in FIG. 37A. In this case, if the number of the vertical pixels of the image frame 300 is expressed as Cy, Wy=Cy-2b, and a midpoint of the Wy coincides with a midpoint of Cy.

Further, in the self timer automatic activating function, under the condition that a self timer is automatically activated, the number of the individual subjects which are detected in the self timer automatic activating range 200 can be set by the user manipulation. Here, the number of the individual subjects is set as 2.

In this way, by performing the manipulation of setting the self timer automatic activating function to the turned on state, for example, a user disposes the digital still camera 1 on the appropriate position. Then, a target person who is to be photographed as the subject with the self timer moves to be collected in an imaging view range of the digital still camera 1, for example.

At this time, for example, even though two individual subjects SBJ0 and SBJ1 are collected in the image frame 300, if at least one subject thereof is not collected in the self timer activating range 200, the photographing operation of the self timer is not activated and is in a standby state.

Further, for example, as shown in FIG. 37A, two individual subjects may be detected in the self timer activating range 200. The digital still camera activates the self timer using the detection as a trigger. Further, at the timing when a preset standby time of the self timer elapses, a captured image which is photographed at that time is recorded.

In this way, in the self timer automatic activating function, it is possible to record the captured image data of image contents in which a demanded number of subjects are necessarily collected in the image frame.

In this respect, the state as shown in FIG. 37A corresponds to a state where the digital still camera 1 is positioned to correspond to a state where a short side of the image frame 300 is longitudinal (vertical) with respect to the captured image. That is, the digital still camera 1 is mounted in a so-called transversely mounted state.

On the other hand, for example, when a user turns on the self timer automatic activating function and mounts the digital still camera, the user may mount the digital still camera 1 in a longitudinally mounted state, not in the transversely mounted state. That is, as shown in FIG. 37B, in a state where the short side of the image frame 300 is transverse (horizontal) with respect to the captured image, the digital still camera 1 is transversely mounted.

In this way, in the state where the digital still camera 1 is longitudinally mounted, it is natural that the vertical width Wy corresponding to the short side of the self timer activating range 200 follows the horizontal direction.

Figure 37B:
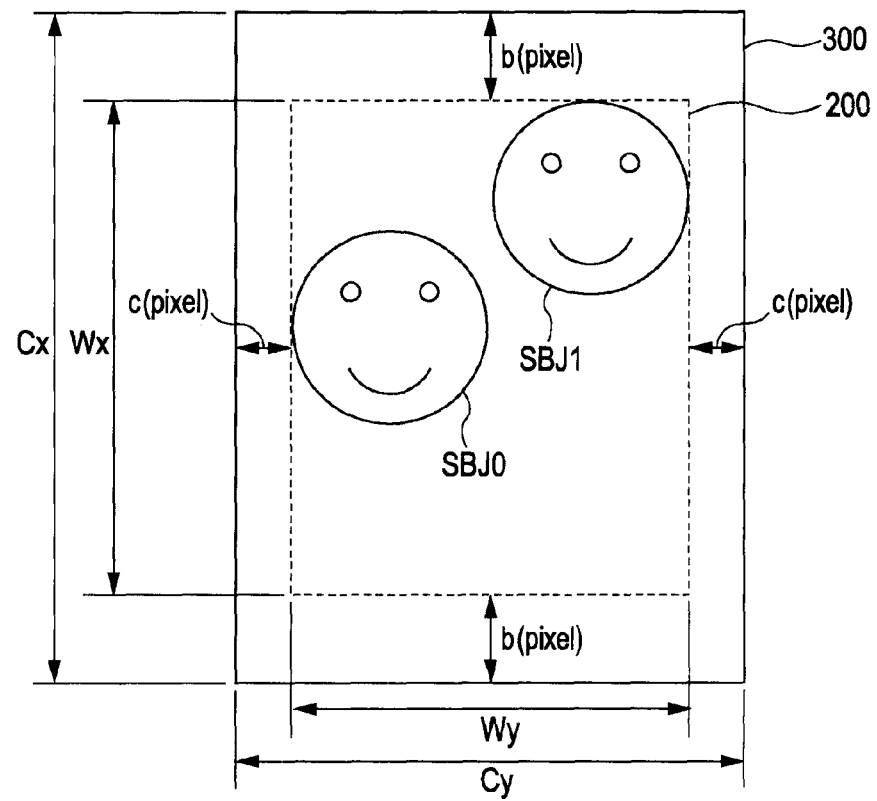

Then, in the state of FIG. 37B, the width of the self timer activating range 200 in the horizontal direction becomes narrow, and thus, it is difficult for the subject to be collected in the self timer activating range 200.

In this embodiment, when the self timer automatic activating function is turned on in the state where the digital still camera 1 is longitudinally mounted, in a similar way to FIG. 373, the dead region of a direction corresponding to the vertical width Wy is changed into and set as a width corresponding to the number c of the pixels which is smaller than the number a of the pixels. Thus, the person who is the subject can be easily collected in the self timer activating range 200 in the horizontal direction.

Figure 38:
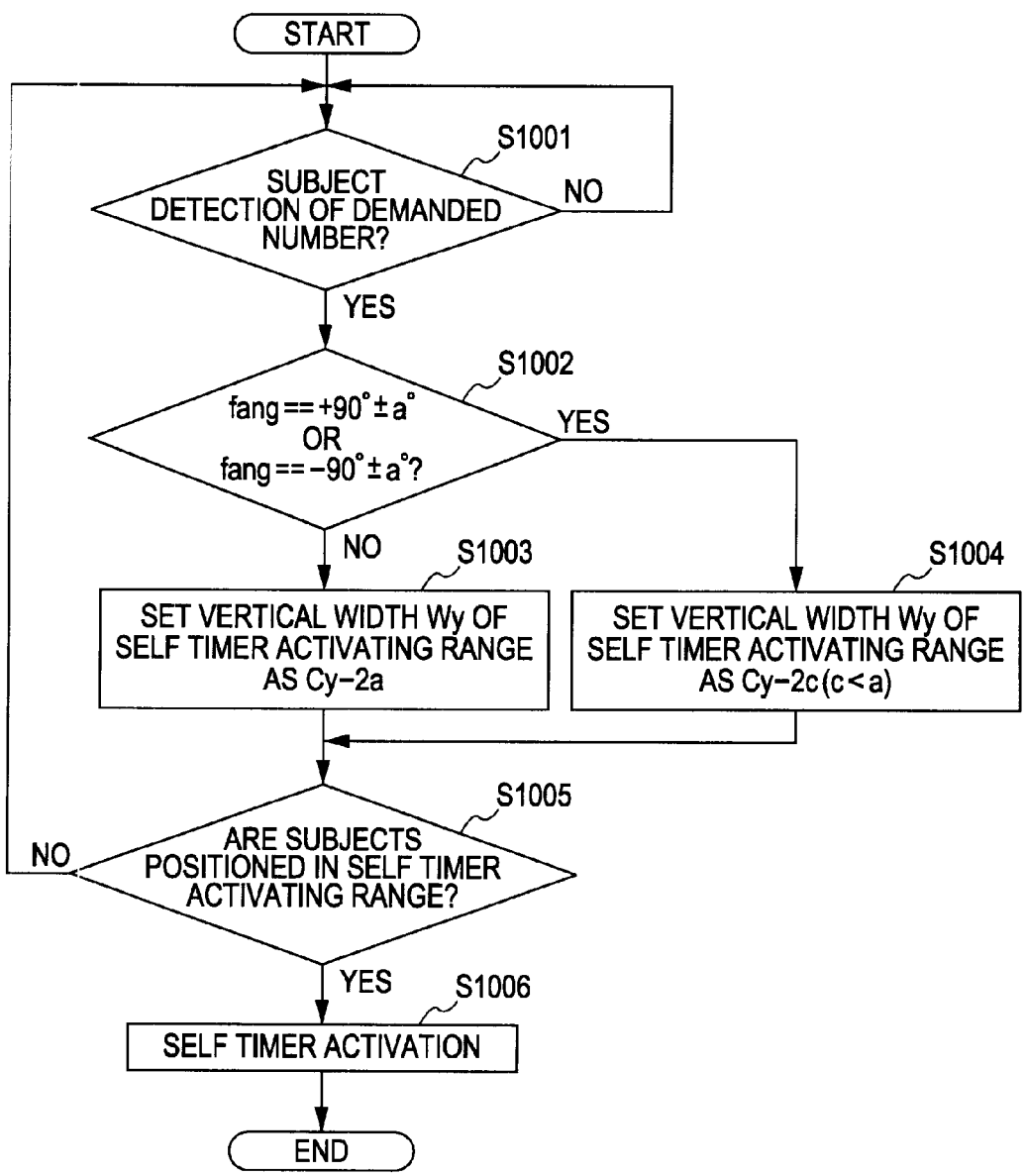
FIG. 38 is a flowchart illustrating an example of a process procedure as a self timer automatic activating function according to an embodiment of the invention.

FIG. 38 illustrates an example of an algorithm for changing and setting the vertical width Wy of the self timer activating range 200, according to the mounted direction of the digital still camera 1, as shown in FIGS. 37A, and 37B.

Firstly, in step S1001, the digital still camera 1 stands by the detection of the individual subjects of the number which satisfy a preset self timer activating condition in the image frame 300.

If a demanded number of individual subjects are detected in step S1001, in a similar way to step S301 in FIG. 30, it is determined whether the face rotation angle fang which is detected with respect to the individual subjects corresponds to any one range of fang=+90°±a° and fang=-90°±a°, in step S1002. This corresponds to the determination on whether the detected individual subject is in the recumbent posture, in step S301 in FIG. 30.

With respect to the self timer automatic activating function, the digital still camera 1 recognizes the state where the short side of the image frame 300 in the captured image is longitudinal (vertical) as shown in FIG. 37A, as a normal state. Accordingly, in step S301, if it is assumed that the person who is the subject is in a normal posture, it is determined whether the digital still camera 1 is in the longitudinally mounted state corresponding to FIG. 37B.

In a case where a negative determination result is obtained in step S1002, the digital still camera 1 is in the normal transversely mounted state. In this case, the procedure goes to step S1003, and the vertical width Wy of the self timer activating range 200 is set as Wy=Cy−2a, as described with reference to FIG. 37A.

Contrarily, in a case where a positive determination result is obtained in step S1003, the digital still camera 1 is in the longitudinally mounted state. In this case, the procedure goes to step S1004, and the vertical width Wy of the self timer activating range 200 is set as Wy=Cy−2c to be enlarged, as described with reference to FIG. 37B.

After setting the vertical width Wy in step S1003 or step S1004, it is detected whether all the individual subjects of the demanded number which are detected in step S1001 are positioned in the self timer activating range 200, in step S1005.

In a negative determination result is obtained in step S1005, the procedure returns to step S1001.

Further, at a specific point of time, if all the individual subjects of the demanded number are positioned in the self timer activating range 200, a positive determination result is obtained in step S1005, and then, the procedure goes to step S1006.

In step S1006, a photographing operation of the self timer is activated. That is, time measurement due to the timer starts and recording of the captured image is performed at the timing when a timer time elapses.

In the self timer automatic activating function in the present embodiment, in a similar way to the composition controls according to the first to fourth examples, an active composition control for moving the position of the individual subject in the image frame is not performed.

However, for example, as the change setting of enlarging the vertical width Wy is performed as shown in FIG. 37B, the position of the individual subjects in the captured image data which is recorded by the self timer photographing may be different from a case where the vertical width Wy is not enlarged. For example, when the individual subjects are plural, if the vertical width Wy is not enlarged, with respect to the position of the individual subjects in the horizontal direction, a composition is obtained in which the distance between the subjects in the horizontal direction becomes short, and all the individual subjects seem to be collected nearly in the center of the image frame.

On the other hand, if the vertical width Wy is enlarged, a range in which all the individual subjects in the horizontal direction are collected is also enlarged, and thus, a desirable composition is obtained in which the distance between the individual subjects in the horizontal direction becomes long.

That is, in the self timer automatic activating function according to the present embodiment, it is possible to obtain a composition which is different from the case where the vertical width Wy is not enlarged, by means of the process of enlarging the vertical width Wy according to the face rotation angles which are detected with respect to the individual subjects. In this respect, in the self timer automatic activating function, the composition is determined according to the face rotation angles of the individual subjects, in a similar way to the composition controls according to the third example and the fourth example.

9. Modified Example of Imaging System According to the Embodiment

Figure 39:
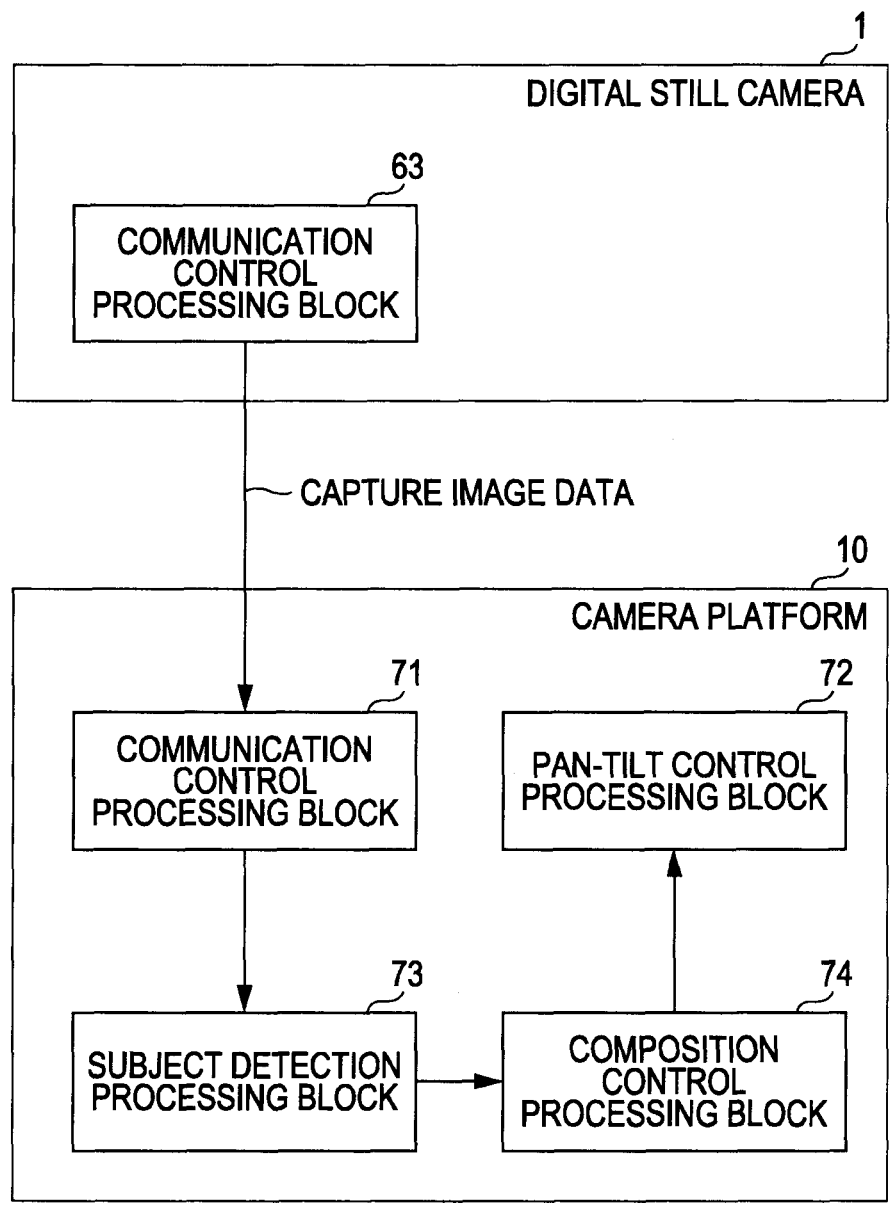
FIG. 39 is a diagram illustrating a configuration of a modified example of an imaging system according to an embodiment of the invention.

FIG. 39 is an example of a configuration of a modified example with respect to the imaging system according to the present embodiment as shown in FIGS. 7 and 8. This is the modified example with respect to the configuration for realizing the composition controls according to the first to fourth example as described before.

In the figure, firstly, the captured image data which is generated in the signal processing section 24 on the basis of the imaging is transmitted to the camera platform 10, through the communication control processing block 63 from the digital still camera 1.

In the figure, the camera platform 10 includes a configuration of a communication control processing block 71, a pan-tilt control processing block 72, a subject detection processing block 73 and a composition control processing block 74.

The communication control processing block 71 is a functional section corresponding to the communication section 52 in FIG. 7, and is a section which is configured so that the communication process with respect to the communication control process block 63 (camera corresponding communication section 34) of the digital still camera 1 is performed according to a predetermined protocol.

The captured image data which is received through the communication control processing block 71 is transmitted to the subject detection processing block 73. The subject detection processing block 73 is provided with a signal processing section which is capable of performing at least a subject detection process equivalent to the subject detection processing block 61 as shown in FIG. 8. The subject detection processing block 73 performs the subject detection process using the imported captured image data as a target, and outputs the detection information to the composition control processing block 74.

The composition control processing block 74 can perform a composition control equivalent to the composition control processing block 62 in FIG. 8, and when the pan control and tilt control are performed according to the result of the composition control process, a control signal is output to the pan-tilt control processing block 72.

The pan-tilt control processing block 72 corresponds, for example, to the function of performing the process relating to the pan-tilt control among the control process which is performed by the controller 51 in FIG. 7, and outputs a signal for controlling the movement of the pan mechanism section 53 and the tilt mechanism section 56 according to the input control signal to the pan driving section 55 and the tilt driving section 58. Thus, the composition which is determined by the composition control processing block 62 is obtained to thereby perform the panning and tilting.

In this way, the imaging system as shown in FIG. 39 is configured so that the captured image data is transmitted to the camera platform 10 from the digital still camera 1, and then the subject detection process and the composition control are performed on the basis of the imported captured image data in the camera platform 10.

Figure 40:
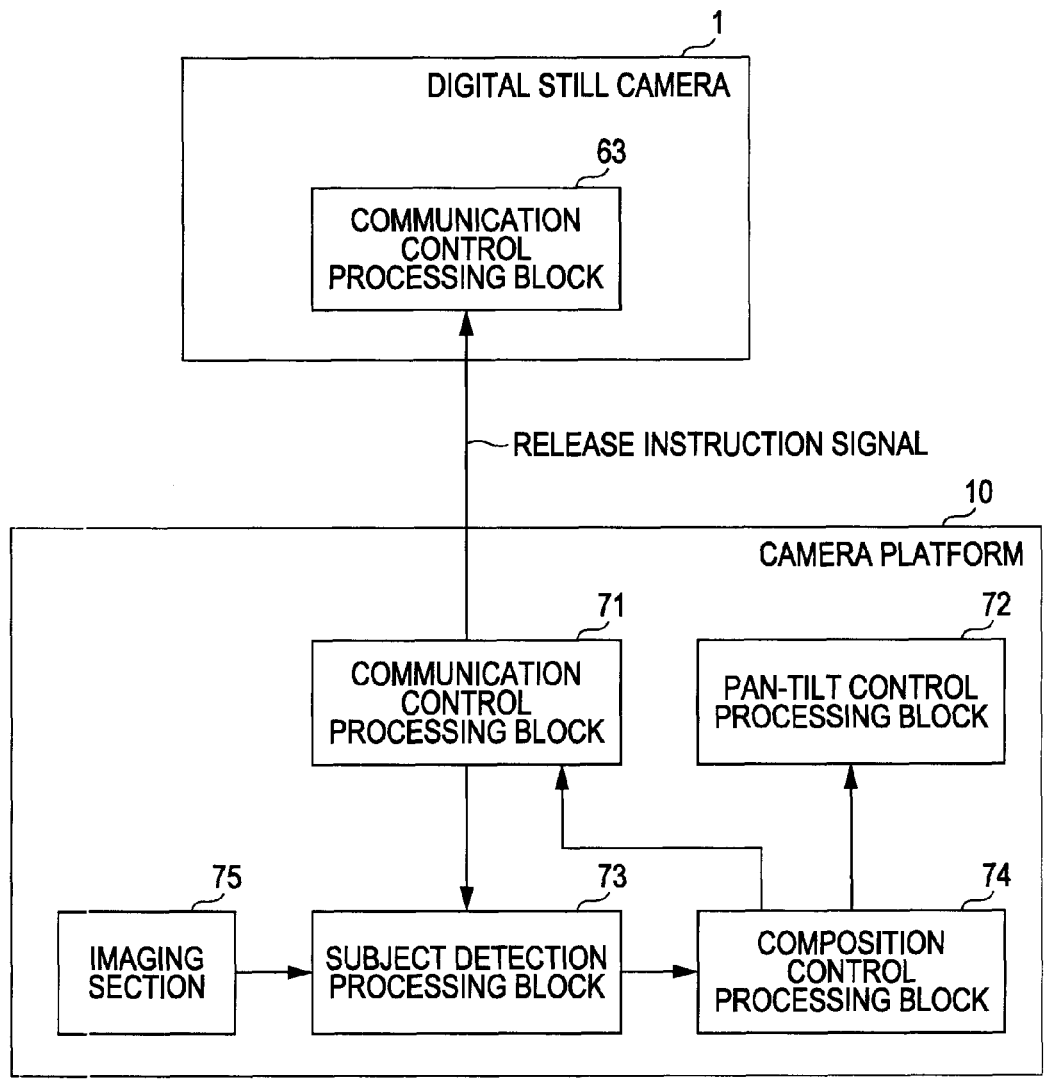
FIG. 40 is a diagram illustrating a configuration of another modified example of an imaging system according to an embodiment of the invention.

FIG. 40 illustrates an example of a configuration of another modified example with respect to the imaging system in the present invention. In the figure, the same elements as in FIG. 39 are given the same reference numerals, and thus, description thereof will be omitted.

In this system, an imaging section 75 is provided in the camera platform 10. The imaging section 75 includes, for example, an optical system and an imaging element (imager) for imaging, and a signal processing section configured to obtain a signal (imaging signal) based on the imaging light and to generate a captured image signal data from the imaging signal. This configuration corresponds to a section which is formed with a signal processing stage until the captured image data is obtained in the optical system 21, the image sensor 22, the A/D converter 23 and the signal processing section 24 as shown in FIG. 6. The captured image data which is generated by the imaging section 75 is output to the subject detection processing block 73. Further, the direction (imaging direction) in which the imaging light is imported by the imaging section 75 is set, if at all possible, to coincide with the imaging direction of the optical system 21 (lens section 3) of the digital still camera 1 which is mounted on the camera platform 10.

In this case, the subject detection processing block 73 and the composition control processing block 74 performs the subject detection process and the composition control process in a similar to the case in FIG. 39. However, in this case, the composition control processing block 74 transmits a release instruction signal to the digital still camera 1 from the communication control processing block 71, with respect to the timing for performing a release operation, in addition to the pan-tilt control. In the digital still camera 1, the release operation is performed according to the received release instruction signal.

In this way, in the another modified example, with respect to the subject detection process and the composition control, all controls and processes other than the release operation itself can be completely performed in the camera platform 10.

Further, the pan control and the tilt control which are performed in the composition controls according to the first to fourth examples as described above can be performed by controlling the movement of the pan-tilt mechanism of the camera platform 10, but instead of the camera platform 10, for example, a composition may be employed in which the imaging light which is reflected by a reflective mirror is incident to the lens section 3 of the digital still camera 1, and the reflected light is moved so that the panning and tilting result with respect to an image obtained on the basis of the imaging light can be obtained.

Further, even though the control is performed so that the pixel area for importing a valid imaging signal as an image from the image sensor 22 of the digital still camera 1 is shifted in the horizontal direction and the vertical direction, a result equivalent to the case where the panning and tilting is performed can be obtained. In this case, it is not necessary to provide the camera platform 10 or a pan-tilt device other than the digital still camera 1 which is similar to the camera platform 10, and the composition control according to the present embodiment can be completely performed by a single device of the digital still camera 1.

Alternatively, by providing a mechanism capable of changing the optical axis of the lens in the optical system 21 in the horizontal and vertical directions and controlling the movement of the mechanism, the panning and the tilting can be performed.

10. Application Example of Composition Control According to the Embodiment

The configuration for the composition determination according to the invention may be applied to devices other than the imaging system which has been described above with respect to the embodiments. Hereinafter, application examples of the composition determination according to the embodiments of the invention will be described.

Figure 41:
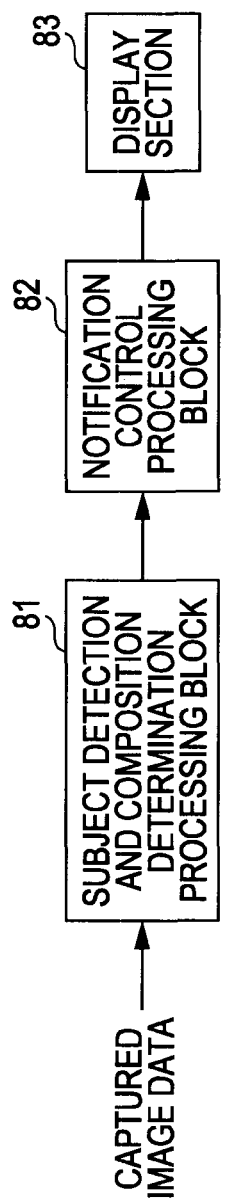
FIG. 41 is a diagram illustrating an application example of a composition determination according to an embodiment of the invention.

Firstly, FIG. 41 illustrates an example in which the composition determination according to the embodiments is applied to a single imaging device such as a digital still camera. Here, for example, when an image captured by the imaging device in an imaging mode is in a appropriate composition, the image is displayed to be notified to a user.

To this end, the imaging device includes a configuration of a subject detection and composition determination processing block 81, a notification control processing block 82 and a display section 83.

The subject detection and composition determination processing block 81 imports captured image data, and performs a subject detection process, for example, which is equivalent to the process of the subject detection processing block 61 in FIG. 8 and a process for a composition determination, for example, which is equivalent to the process of the composition control processing block in FIG. 8 using detection information which is the result of the subject detection process.

For example, if the user sets the imaging device to the imaging mode, and performs a manipulation (shutter button manipulation) anytime while holding the imaging device with her or his hand, the imaging device is in a state where recording of the captured image can be performed.

In this state, the subject detection and composition determination process block 81 imports the captured image data which is captured and obtained at that time, and performs the subject detection. Then, firstly, an optimal composition is specified according to the number of the detected individual subjects, etc. through the composition control process, but in this case, the composition determination process is performed so that the accordance or similarity between a composition of an image content of the captured image data obtained at that time and the optimal composition is obtained. Then, for example, if the similarity is equal to or larger than a predetermined value, it is determined that the image content of the captured image data which is actually photographed and obtained corresponds to the optimal composition. In this respect, for example, if the similarity is obtained which is equal to or larger than the predetermined value to such a degree that the composition of the image content of the captured image data is considered as being in accordance with the optimal composition, an algorithm may be actually configured so that the composition of the image content of the captured image data is determined as the optimal composition. In this respect, a variety of algorithms may be considered for calculating the accordance or similarity, but specific examples thereof will not be particularly mentioned herein.

Then, information about the determination result that the image content of the captured image data corresponds to the optimal composition is output to the notification control processing block 82. According to the input of the information, the notification control processing block 82 performs a display control so that a display for notifying a user that an image being currently captured is in the optimal composition is performed in the display section 83 in a predetermined manner. In this respect, the notification control processing block 82 is realized by a display control function by means of a microcomputer (CPU) or the like which is provided in the imaging device, a display image processing function for realizing the image display in the display section 83, and so on. In this respect, the notification to the user with respect to the optimal composition may be performed by means of sound such as electronic sound or synthetic sound.

Further, for example, the display section 83 corresponds to the display section 33 of the digital still camera 1 in the present embodiment. For example, the display section 83 is installed so that the display panel is displayed with respect to a predetermined position in the imaging device, and generally displays an image captured at that time, which is referred to as a so-called moving image, in the imaging mode. Thus, in the actual imaging device, an image having contents for notifying that the moving image in the optimal composition in an overlapped manner is displayed on the display section 83. When the notification with respect to the optimal composition is displayed, the user performs the release manipulation. Accordingly, any user who is not accustomed to knowledge or skills for photography can simply perform photography having a good composition.

Figure 42:
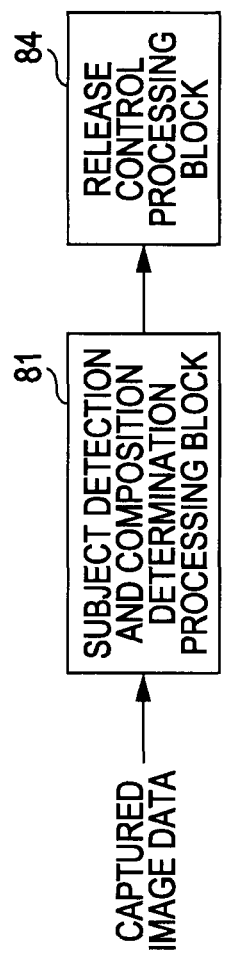
FIG. 42 is a diagram illustrating an application example of a composition determination according to an embodiment of the invention.

Further, in a similar way to FIG. 41, FIG. 42 illustrates an example in which the composition determination according to the embodiments is applied to a single imaging device such as a digital still camera.

Firstly, in a similar way to the example in FIG. 41, in the configuration as shown in the figure, captured image data which is obtained by imaging at that time is imported to perform the subject detection process, and it is determined whether an image content of the captured image data is in the optimal composition on the basis of subject detection information, by the subject detection and composition determination processing block 81. Here, if it is determined that the image content of the captured image data is in the optimal composition, this determination result is notified to the release control processing block 84.

The release control processing block 84 is a section which performs a control for recording the captured image data, and is realized, for example, by a control or the like which is performed by a microcomputer provided in the imaging device. The release control processing block 84 which has received the notification performs an image signal process and a recording control process so that the captured image data obtained at that time is stored, for example, in storage medium.

According to such a configuration, it is possible provide an imaging device in which, for example, when an image of an optimal composition is captured, recording of the captured image is automatically performed.

The configurations as shown in FIGS. 41 and 42 may be applied, for example, to the digital still camera, for example, within a category of a still camera, and may be applied to a so-called silver salt camera in which a captured image is recorded in a silver salt film or the like, for example, by installing in the silver salt camera an image sensor which splits and imports an imaging light obtained by an optimal system, an image signal processing section which receives a signal from the image sensor and processes the signal, and the like.

Figure 43:
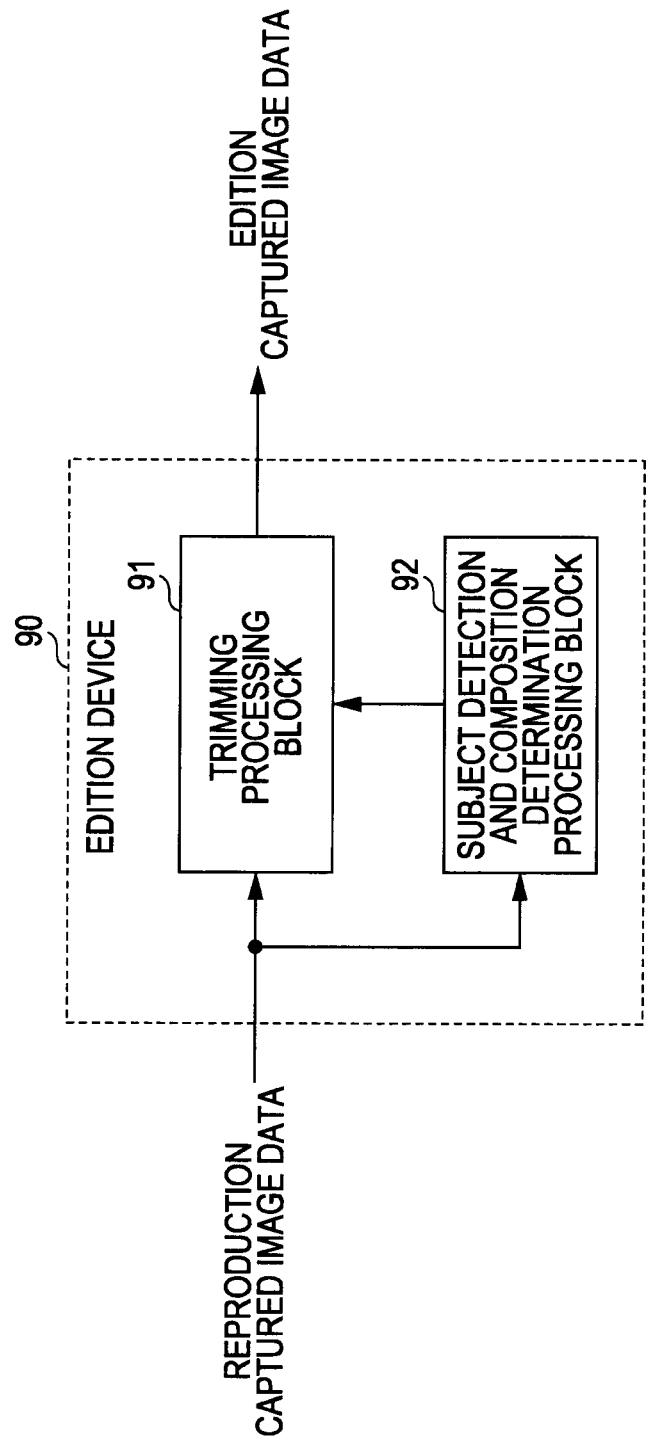
FIG. 43 is a diagram illustrating an application example of a composition determination according to an embodiment of the invention.

FIG. 43 illustrates an example in which the embodiments according to the invention are applied to an edition device which performs an image edition with respect to currently existing image data.

In FIG. 43, an edition device 90 is illustrated. The edition device 90 is configured to obtain, as the currently existing image data, for example, image data (reproduction image data) which is obtained by reproducing image data which is stored in a storage medium. In this respect, other than the image data reproduced from the storage medium, for example, image data which is downloaded through networks may be imported to the edition device 90. That is, a path for obtaining the captured image data which is to be imported to the edition device 90 is not particularly limited.

The reproduction captured image data which is imported to the edition device 90 is input to each of a trimming processing block 91 and a subject detection and composition determination processing block 92.

Firstly, for example, the subject detection and composition determination processing block 92 performs a subject detection process in a similar way to the cases in FIGS. 41 and 42 to output detection information. Further, as a composition determination process using the detection information, in this case, the subject detection and composition determination processing block 92 specifies where an image section (image section of an optimal composition) according to a predetermined aspect ratio, in which the optimal composition is obtained, exists in a full screen which corresponds to the input reproduction captured image data. In addition, if the image section of the optimal composition is specified, the subject detection and composition determination processing block 92 outputs, for example, information (trimming indication information) indicating the position of the image section to the trimming processing block 91.

In response to the input of the trimming indication information as described above, the trimming processing block 91 performs an image process for extracting the image section which is displayed according to the trimming indication information from the input reproduction captured image data, and outputs the extracted image section as one independent piece of image data. This becomes edition captured image data.

According to such a configuration, for example, as the edition process of the image data, a trimming process is automatically performed in which image data of a content which is obtained by extracting a section having an optimal composition from the image content of the originally existing image data is newly obtained. Such an edition function may be employed, for example, by means of an application program for edition of image data which is installed in a personal computer or the like, or an image edition function in an application program for management of image data.

Figure 44:
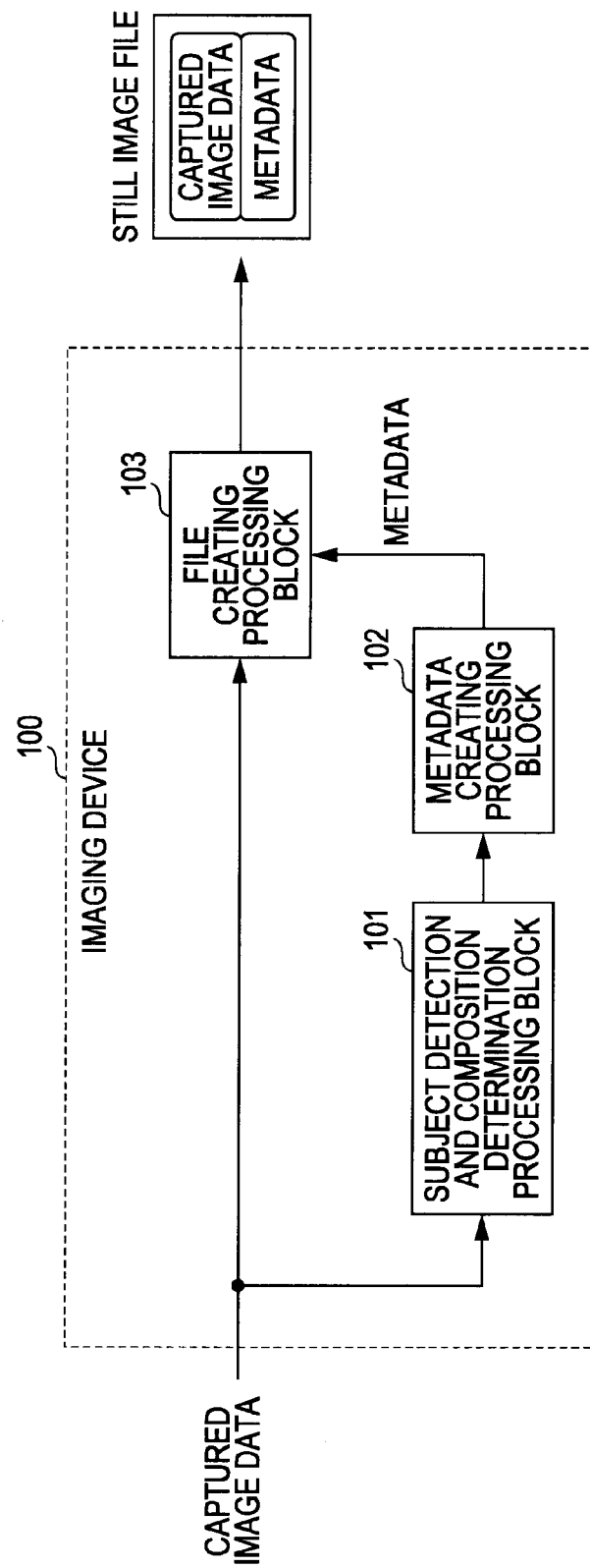
FIG. 44 is a diagram illustrating an application example of a composition determination according to an embodiment of the invention.

FIG. 44 is an example of a configuration in which the composition determination according to the embodiments of the invention is applied to an imaging device such as a digital still camera.

In this respect, captured image data which is captured and obtained by an imaging section (not shown) is input to a subject detection and composition determination processing block 101 and a file creating processing block 103 which are provided in an imaging device 100. In this case, the captured image data input to the imaging device 100 is captured image data which is to be stored in a storage medium, for example, according to a release manipulation, and is generated on the basis of an imaging signal which is obtained by imaging in the imaging section which is not shown here.

Firstly, the subject detection and composition determination processing block 101 performs the subject detection with the input captured image data being as a target, and determines which composition is an optimal composition on the basis of the detection information. Specifically, for example, in a similar way to the case in FIG. 43, information indicating that the image section corresponding to the optimal composition is specified in a full screen of the input captured image data may be obtained. Further, information indicating the determination result with respect to the optimal composition obtained in this way is output to a metadata creating processing block 102.

The metadata creating block 102 creates metadata (composition edition metadata) including information which is demanded for obtaining the optimal composition from the corresponding captured image data on the basis of the input information, and outputs the created metadata to the file creating processing block 103. Contents of the composition edition metadata include position information capable of indicating a position where an image area section to be trimmed exists in the screen which is the corresponding captured image data.

In the imaging device 100 as shown in the figure, the captured image data is handled as a still image file of a predetermined format to be recorded in the storage medium. In this respect, the file creating processing block 103 converts (creates) the captured image data into the still image file format.

The file creating processing block 103 performs an image compression coding process corresponding to the image file format with respect to the input captured image data, and creates a file main body including the captured image data. Further, the file creating processing block 103 performs storing the composition edition metadata input from the metadata creating processing block 102 in a predetermined storage position, to thereby create a data section such as a header and an additional information block. Further, the file creating processing block 103 creates the still image file from the file main body section, the header, the additional information block or the like, and outputs the created still image file. Thus, as shown in the figure, the still image file to be recorded in the storage medium has a configuration in which the captured image data and the metadata (composition edition metadata) are included.

Figure 45:
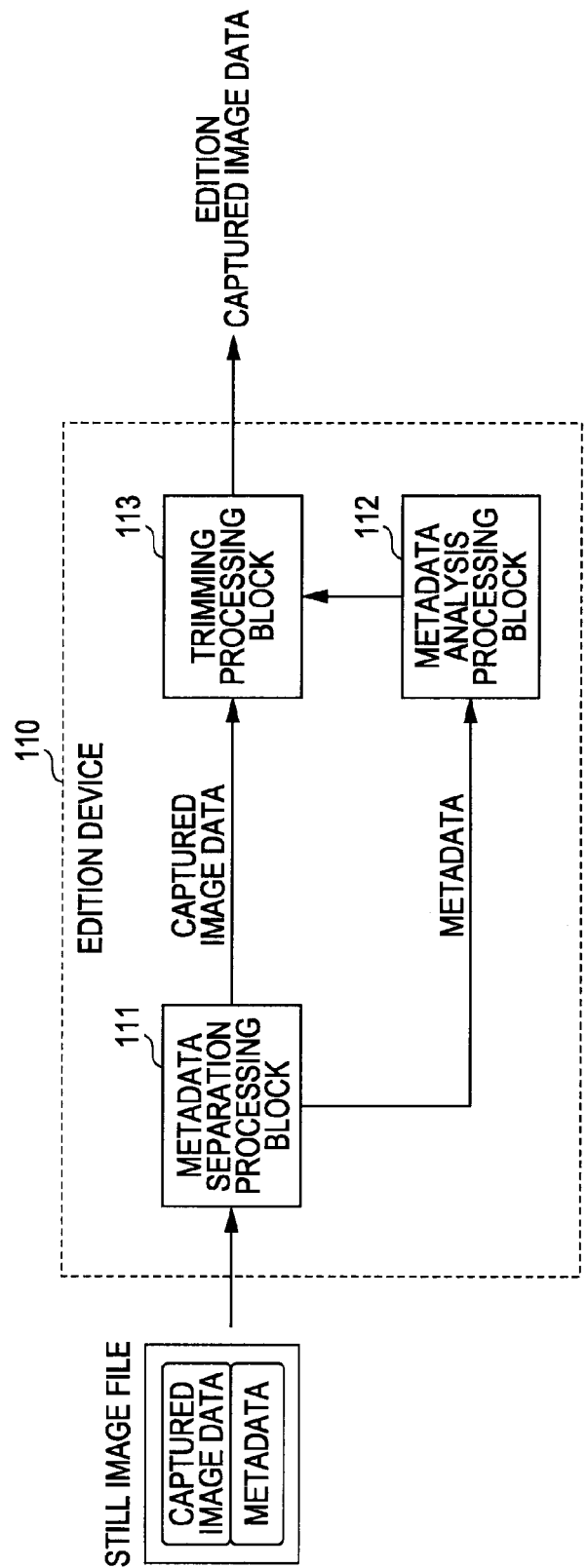
FIG. 45 is a diagram illustrating an application example of a composition determination according to an embodiment of the invention.

FIG. 45 is an example of a configuration of an edition device which performs edition with respect to the still image file which is created by the device in FIG. 44.

An edition device 110 as shown in the figure imports data on the still image file and enables the imported data to be input to a metadata separation processing block 111. The metadata separation processing block 111 separates the captured image data corresponding to the file main body and the metadata from the still image file data. The separated metadata is output to a metadata analysis processing block 112 and the captured image data is output to a trimming processing block 113.

The metadata analysis processing block 112 is a section for performing the process of analyzing the imported metadata. Further, in the analysis process, an image area is specified in which the trimming is performed, with at least the corresponding captured image data being as a target, from information for obtaining the optimal composition which is contents of the composition edition metadata. In addition, trimming instruction information for instructing the trimming of the specified image area is output to the trimming processing block 113.

In the trimming processing block 113, in the same way to the trimming processing block 91 in FIG. 43, the image process is performed so that the image section indicated by the trimming instruction information which is input from the metadata separation processing block 112 is extracted from the captured image data input from the metadata analysis processing block 111, and the extracted image section is output as the edition captured image data which is one independent piece of image data.

According to the system including the imaging device and the edition device as shown in FIGS. 44 and 45, for example, the original still image data (captured image data) which is obtained by photography or the like is not processed as it is for storage, and thus, the edition can be performed for extracting the image which is the optimal composition from the original still image data using the metadata. Further, the determination of the extracted image section corresponding to such an optimal composition is automatically performed.

Figure 46:
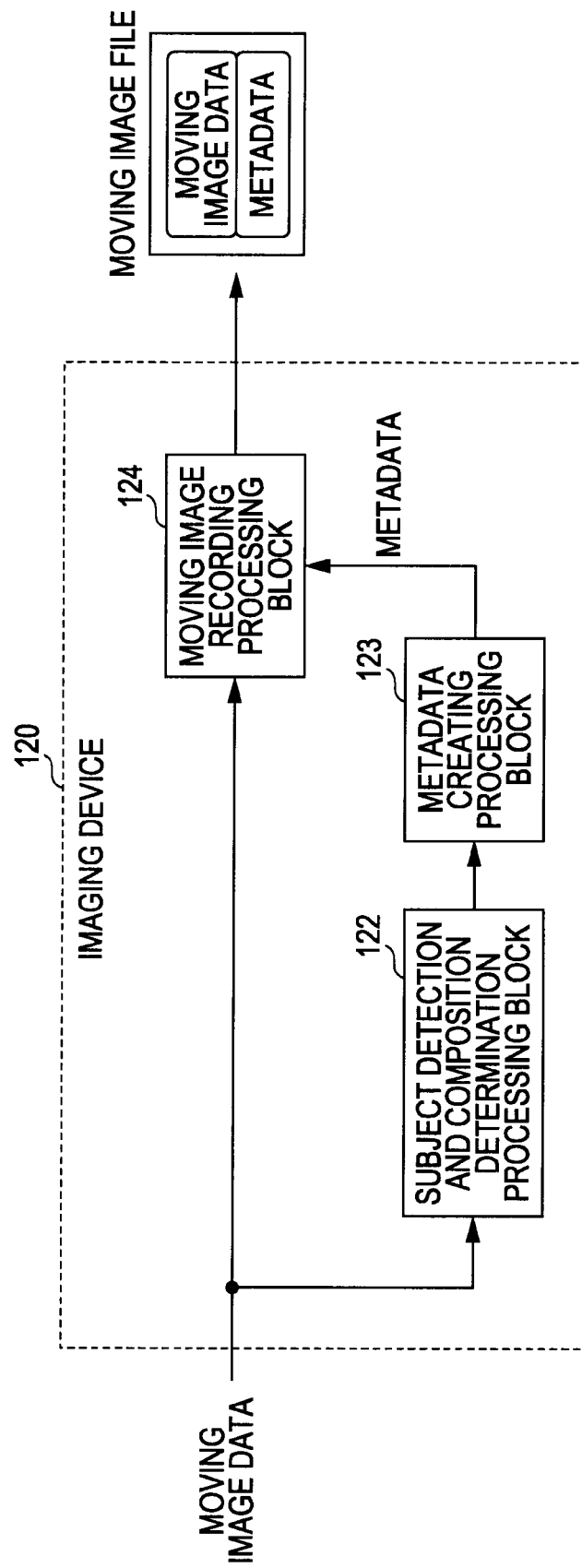
FIG. 46 is a diagram illustrating an application example of a composition determination according to an embodiment of the invention.

FIG. 46 illustrates an example in which the present invention is applied to the imaging device capable of photography and recording of moving images, which serves as a video camera or the like.

Moving image data is input to an imaging device 120 as shown in the figure. The moving image data is generated on the basis of an imaging signal obtained by performing imaging by an imaging section which is provided in the imaging device 120. The moving image data is input to a subject detection and composition determination processing block 122 and a moving image recording processing block 124 which are provided in the imaging device 120.

In this case, the subject detection and composition determination processing block 122 performs determination on whether the composition is good or not with respect to the input moving image data. For example, the subject detection and composition determination processing block 122 maintains parameters (good composition corresponding parameters) with respect to which composition corresponds to a preset good composition. The parameter may correspond to a target subject size, the horizontal offset amount θx or the like, which is set as appropriate according to information about the number of the detected individual subjects and the face direction which is detected and obtained for each of the individual subjects. Further, the subject detection and composition determination processing block 122 performs composition determination with respect to which composition the input moving image data continually corresponds to (for example, calculates composition parameters such as an actual occupancy of the individual subject, an inter-subject distance K and the like in the moving image data), and compares the composition parameters of the moving image data obtained as the determination result with good composition parameters. Further, if the composition parameters of the moving image data have the similarity of a specific level or above with respect to the good composition corresponding parameters, the subject detection and composition determination processing block 122 determines that the composition is the good composition; and if the similarity is the specific level or below, the subject detection and composition determination processing block 122 determines that the composition is not the good composition.

When it is determined that the good composition is obtained with respect to the moving image data as described above, the subject detection and composition determination processing block 122 outputs information (good composition image section indicating information) indicating an image section (good composition image section) in which the good composition is determined to be currently obtained in the moving image data with respect to the metadata creating processing block 123. For example, the good composition image section indicating information includes information indicating a starting position and an ending position as the good composition image section in the moving image data.

In this case, the metadata creating processing block 123 generates a variety of metadata with respect to the moving image data which is recorded as a file in the storage medium by the moving image recording processing block 124 to be described later. In addition, in a case where the good composition image section indicating information is input from the subject detection and composition determination processing block 122 as described above, the metadata indicating that the image section indicated by the input good composition image section indicating information is the good composition is generated, and is output to the moving image recording processing block 124.

The moving image recording processing block 124 performs a control so that the input moving image data is handled as a moving image file according to a predetermined format to be recorded in the storage medium. Further, in a case where the metadata is output from the metadata creating processing block 123, a control is performed so that the metadata is included in metadata which is included in the moving image file to be recorded.

Thus, as shown in the figure, the moving image file which is recorded in the storage medium has a content, which includes the metadata indicating the image section having the good composition, in the moving image data obtained by the imaging.

Further, the image section in which the good composition is obtained, indicated by the metadata as described above may be an image section due to the moving image having a certain time width, or may be an image section due to the still image which is extracted from the moving image data. Further, instead of the metadata, the moving image data of the image section in which the good composition is obtained or the still image data may be generated, and may be recorded as additional image data still image data (or a file which is independent of the moving image file) included in the moving image file.

Further, as shown in FIG. 46, in a configuration in which the imaging device 120 is provided with the subject detection and composition determination processing block 122, only the moving image section which is determined as the good composition image section by means of the subject detection and composition determination processing block 122 may be recorded as the moving image file. Furthermore, the image data corresponding to the image section which is determined as the good composition by means of the subject detection and composition determination processing block 122 may be output to an external device through a data interface or the like.

Figure 47:
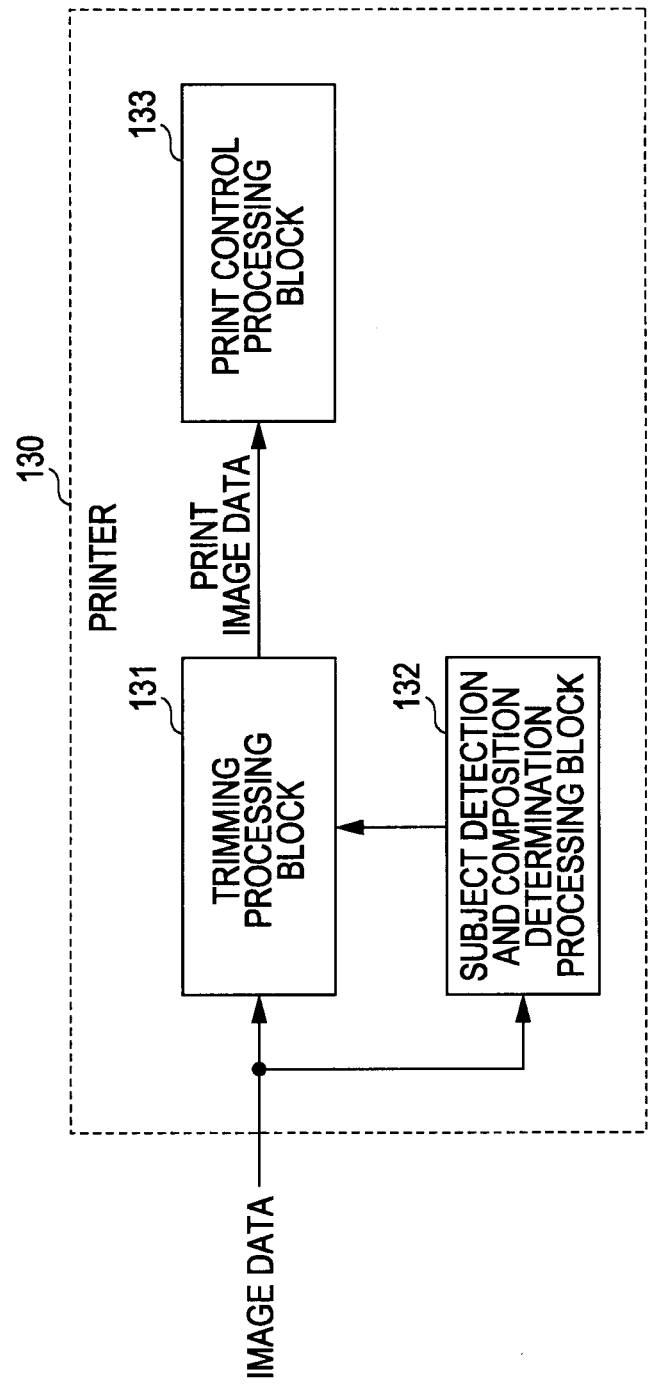
FIG. 47 is a diagram illustrating an application example of a composition determination according to an embodiment of the invention.

FIG. 47 is an example in which the present invention is applied to a printer for performing printing.

In this case, a printer 130 imports the image data (still image) having image contents to be printed, and the imported data is input to a trimming processing block 131 and a subject detection and composition determination processing block 132.

Firstly, the subject detection and composition determination processing block 132 performs the same subject detection process and the composition determination process as the subject detection and composition determination processing block 92 in FIG. 43, performs a process for specifying the image section of the optimal composition in a full screen of the input image data, generates trimming instruction information on a content according to the processing result, and outputs the generated trimming instruction information to the trimming processing block 131.

The trimming processing block 131 performs an image process for extracting the image section indicated by the trimming instruction information from the input image data, in a similar way to the trimming processing block 91 in FIG. 43. The data on the extracted image section is output to a printing control processing block 133 as printing image data.

The printing control processing block 133 performs control so that a printing mechanism which is not shown is operated using the input printing image data.

Through such an operation, an image section in which the optimal composition is obtained is automatically extracted from the image content of the input image data by means of the printer 130, and then, is printed as one image.

Figure 48:
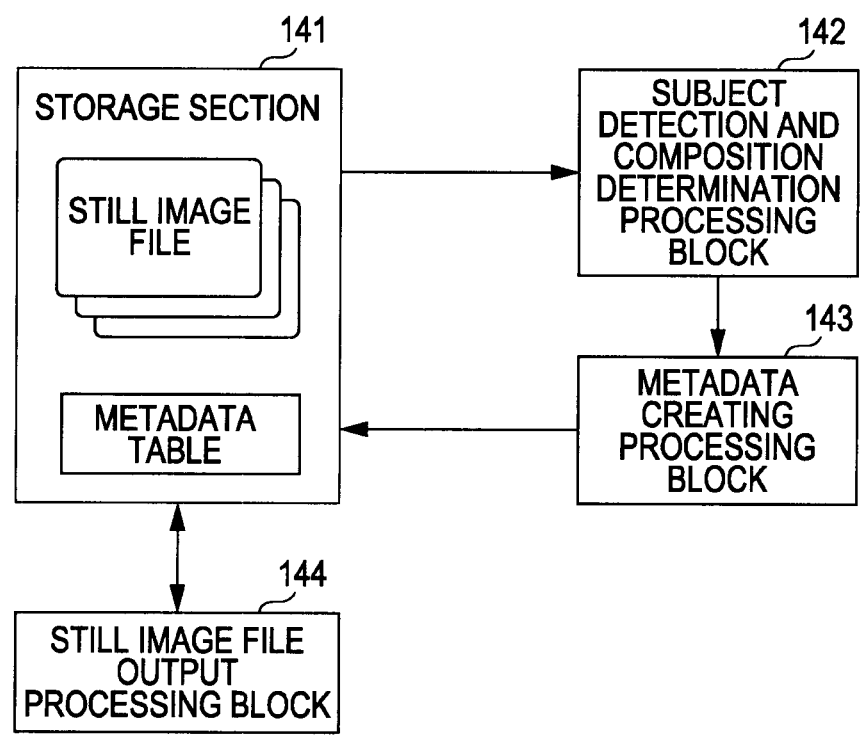
FIG. 48 is a diagram illustrating an application example of a composition determination according to an embodiment of the invention.

An example as shown in FIG. 48 is, for example, suitable for a device and a system for storing a plurality of still image files, and providing services using the still image files.

The plurality of still image files is stored in a storage section 141.

A subject detection and composition determination processing block 142 imports the still image file which is stored in the storage section 141 at a predetermined timing, and extracts the still image data stored in a main body of the file. Further, the subject detection and composition determination processing block 142 performs, using the still image data as a target, the same process as the subject detection and composition determination processing block 101 in FIG. 44, obtaining information indicating the determination result with respect to the optimal composition, and outputs the obtained information to the metadata creating processing block 143.

The metadata creating processing block 143 creates metadata (composition edition metadata) in a similar way to the metadata creating processing block 102 in FIG. 44, on the basis of the input information. In addition, in this case, the metadata creating processing block 143 registers the created metadata in a metadata table stored in the storage section 141. The metadata table is an information unit which is formed by storing the metadata so that a relationship between the metadata and the still image data stored in the same storage section 141 is represented. That is, the metadata table represents the relationship between the metadata (composition edition metadata) and the still image file which becomes the target of the subject detection process and the composition determination process by means of the subject detection and composition determination processing block 142 so as to create the metadata.

Further, for example, when the still image file stored in the storage section 141 is output according to a demand of the still image file from the outside, (for example, in the case of a server, when the still image file is downloaded according to a download demand from a client), a still image file output processing block 144 retrieves the still image file which is a demand target from the storage section 141 for importing, and retrieves the metadata (composition edition metadata) corresponding to the retrieved still image file from the metadata table for importing.

Further, the still image file output processing block 144 is, for example, provided with at least a functional block corresponding to the metadata analysis processing block 112 and the trimming processing block 113 as shown in FIG. 45.

The still image file output processing block 144 analyzes the imported metadata by means of the internal metadata analysis processing block, to thereby obtain trimming instruction information. Then, an internal trimming processing block performs the trimming process, using the still image data stored in the imported still image file as a target, according to the trimming instruction information. Further, the internal trimming processing block generates the image section obtained by the trimming process once again as one piece of still image data and outputs the generated image section.

The system configuration as shown in FIG. 48 can be applied to a variety of services.

As an example, the system configuration can be applied a photograph print service through a network. That is, a user uploads image data (still image file) which is a print target to a print service server through a network. The server stores the still image file uploaded in this way in the storage section 141, and creates metadata corresponding to the still image file to register the metadata in the metadata table. When a print output is actually performed, the still image data in which the optimal composition is extracted is output as print image data by the still image file output processing block 144. That is, according to this service, a printed matter which is corrected to the optimal composition and is printed is output, in response to a request of a photograph output.

As another example, the above described system configuration can be also applied to a server such as a blog. The storage section 141 stores uploaded image data together with text data of the blog. Accordingly, for example, it is possible to paste an image obtained by extracting an optimal composition from the image data uploaded by a user in a page of the blog.

In this respect, the examples as described with reference to FIGS. 39 to 48 represent only part of the invention, and thus, the composition determination according to the invention can be also applied to various devices, systems, application software, and so on.

Further, in the above described embodiments, it is assumed that the subject (individual subject) is a person, but the present invention can be applied to a case where the subject is, for example, an animal other than the person.

In addition, the image data which is a subject detection target is not limited to image data (captured image data) which is obtained by the imaging, but for example, image data having image contents such as a painting or design drawing can be used as the subject target.

Furthermore, the composition (optimal composition) determined according to the invention is not necessarily limited to a composition which is determined by a technique in which a factor of the number of the detected individual subjects is added, with respect to the composition setting technique such as a three-part division. For example, in the case of a composition which is generally considered as bad, after the composition is set, a user may feel interesting or rather good from the composition. Accordingly, the composition (optimal composition) determined according to the invention may be preferably set in an arbitrary manner in consideration of utility, entertainment influence or the like, and actually, is not limited to a specific composition.

The present application contains subject matter related to that disclosed in Japanese Priority Patent Application JP 2009-172327 filed in the Japan Patent Office on Jul. 23, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A composition determination device comprising:
circuitry configured to:
  detect a face of a specific subject in a rectangular image based on image data;
  detect a rotation angle of the face in an image section in the rectangular image, corresponding to a detected subject which is the subject detected by the circuitry;
  determine if the face is facing either front, right or left as viewed in the rectangular image based on the rotation angle; and
  determine a composition in the rectangular image comprising horizontal sides and vertical sides on the basis of the rotation angle and on the basis of an image area division line, the image area division line being set in a vertical direction with respect to the rectangular image in response to a determination that the detected rotation angle of the face is within a predetermined angle range,
wherein, (1) when the circuitry determines the face is facing either right or left as viewed in the rectangular image, the circuitry is configured to:
  set the image area division line with respect to the rectangular image, and
  calculate a movement amount on the basis of the rotation angle and on the basis of the image area division line being set in the vertical direction by dividing a size of the rectangular image in a horizontal direction by a predetermined integer,
wherein, (2) when the circuitry determines the face is facing front as viewed in the rectangular image, the circuitry is configured to:
  detect a face rotation angle of the face;
  calculate the movement amount to be zero, when the face rotation angle is determined to be within a range of an upright state; and
  calculate the movement amount on the basis of the face rotation angle and on the basis of the image area division line being set in the vertical direction by dividing a size of the rectangular image in a horizontal direction by a predetermined integer, when the face rotation angle is determined to be not within the range of the upright state, and
wherein the circuitry is configured to obtain as a determination result the composition in which a center of gravity, which is set in the image section which includes at least one detected subject, is located in a position which is shifted from the image area division line by the movement amount.

2. The composition determination device according to claim 1, wherein the circuitry is configured to set the image area division line in a horizontal direction with respect to the image, in a case where the face is within an angle range which is considered as a transverse direction with respect to the rotation angle.

3. The composition determination device according to claim 2, wherein the circuitry is configured to determine, in a case where the rotation angles of the plurality of detected subjects are all the same, the composition on the basis of all the same rotation angles.

4. The composition determination device according to claim 3, wherein the circuitry is configured to set, in a case where the rotation angles of the plurality of detected subjects are not all the same, a reference rotation angle which becomes a reference with respect to all the plurality of detected subjects, and determines the composition on the basis of the set reference rotation angle.

5. The composition determination device according to claim 4, wherein the circuitry is configured to set the movement amount from the image area division line to the center of gravity on the basis of the number of the detected subjects, in the composition obtained as the determination result.

6. The composition determination device according to claim 5, wherein the circuitry is configured to enlarge and set the width of a detection frame which is set in an image frame of the image, in a direction which is recognized as a vertical direction by the circuitry, in a case where the face is within an angle range which is considered as a transverse direction with respect to the rotation angle, compared with a case where the face is within an angle range which is considered as a longitudinal direction,
  the circuitry is configured to record, according to the detection of a state where the detected subjects are collected with respect to the detection frame, the image data at this time in a recording medium.

7. The composition determination device according to claim 5, wherein the circuitry is configured to enlarge and set the width of a range detection frame which is set in an image frame of the image, in a direction which is recognized as a vertical direction by the circuitry, in a case where the face is within an angle range which is considered as a transverse direction with respect to the rotation angle, compared with a case where the face is within an angle range which is considered as a longitudinal direction,
  the circuitry is configured to record, according to the detection of a state where the detected subjects are collected with respect to the range detection frame, the image data at this time in a recording medium.

8. The composition determination device according to claim 1, wherein the circuitry is configured to determine, in a case where rotation angles of a plurality of detected faces are all the same, the composition on the basis of all the same rotation angles.

9. The composition determination device according to claim 1, wherein the circuitry is configured to set, in a case where rotation angles of a plurality of detected faces are not all the same, a reference rotation angle which becomes a reference with respect to all the plurality of detected subjects, and determines the composition on the basis of the set reference rotation angle.

10. The composition determination device according to claim 1, wherein the circuitry is configured to set the movement amount from the image area division line to the center of gravity on the basis of a number of detected faces, in the composition obtained as the determination result.

11. The composition determination device according to claim 1, wherein the predetermined integer is determined on the basis of a three-part division.

12. An imaging system comprising:
an imaging device section;
a movable device section which includes a mechanism which is movable by changing an imaging view range of the imaging device section;
means for obtaining image data on a captured image which is obtained by imaging of the imaging device section;
means for detecting a specific subject in a rectangular image based on the image data;
means for detecting a rotation angle of the face in an image section in the rectangular image, corresponding to a detected subject which is the subject detected by the means for detecting the specific subject;
first means for determining if the face is facing either front, right or left as viewed in the rectangular image based on the rotation angle; and
second means for determining a composition in the rectangular image comprising horizontal sides and vertical sides on the basis of the rotation angle and on the basis of an image area division line, the image area division line being set in a vertical direction with respect to the rectangular image in response to a determination that the detected rotation angle of the face is within a predetermined angle range; and
means for performing a control for at least the movable device section so that the imaging view range is adjusted to obtain the composition which is determined by the means for determining,
wherein, (1) when the first means for determining determines the face is facing either right or left as viewed in the rectangular image, the second means for determining:
sets the image area division line with respect to the image, and
calculates a movement amount on the basis of the rotation angle and on the basis of the rectangular image area division line being set in the vertical direction by dividing a size of the rectangular image in a horizontal direction by a predetermined integer,
wherein, (2) when the first means for determining determines the face is facing front as viewed in the rectangular image, the second means for determining:
detects a face rotation angle of the face;
calculates the movement amount to be zero, when the face rotation angle is determined to be within a range of an upright state; and
calculates the movement amount on the basis of the face rotation angle and on the basis of the image area division line being set in the vertical direction by dividing a size of the rectangular image in a horizontal direction by a predetermined integer, when the face rotation angle is determined to be not within the range of the upright state, and
wherein the second means for determining obtains as a determination result the composition in which a center of gravity, which is set in the image section which includes at least one detected subject, is located in a position which is shifted from the image area division line by the movement amount.

13. A composition determination method comprising:
detecting a face of a specific subject in a rectangular image based on image data;
detecting a rotation angle of the face in an image section in the rectangular image, corresponding to detected subject which is the subject detected by the detecting;
first determining if the face is facing either front, right or left as viewed in the rectangular image based on the rotation angle; and
second determining, by circuitry, a composition in the rectangular image comprising horizontal sides and vertical sides by circuitry on the basis of the rotation angle and on the basis of an image area division line, the image area division line being set in a vertical direction with respect to the rectangular image in response to a determination that the detected rotation angle of the face is within a predetermined angle range,
wherein, (1) when it is determined the face is facing either right or left as viewed in the rectangular image by the first determining, the second determining comprises:
setting the image area division line with respect to the rectangular image, and
calculating a movement amount on the basis of the rotation angle and on the basis of the image area division line being set in the vertical direction by dividing a size of the rectangular image in a horizontal direction by a predetermined integer,
wherein, (2) when it is determined the face is facing front as viewed in the rectangular image by the first determining, the second determining comprises:
detecting a face rotation angle of the face;
calculating the movement amount to be zero, when the face rotation angle is determined to be within a range of an upright state; and
calculating the movement amount on the basis of the face rotation angle and on the basis of the image area division line being set in the vertical direction by dividing a size of the rectangular image in a horizontal direction by a predetermined integer, when the face rotation angle is determined to be not within the range of the upright state, and
wherein the second determining comprises obtaining as a determination result the composition in which a center of gravity, which is set in the image section which includes at least one detected subject, is located in a position which is shifted from the image area division line by the movement amount.

14. A non-transitory computer-readable storage medium storing computer-readable instructions thereon, which, when executed by a computer, cause the computer to perform a composition determination method comprising:
detecting a face of a specific subject in a rectangular image based on image data;

detecting a rotation angle of the face in an image section in the rectangular image, corresponding to a detected subject which is the subject detected by the detecting;

first determining if the face is facing either front, right or left as viewed in the rectangular image based on the rotation angle; and second determining a composition in the rectangular image comprising horizontal sides and vertical sides on the basis of the rotation angle and on the basis of an image area division line, the image area division line being set in a vertical direction with respect to the rectangular image in response to a determination that the detected rotation angle of the face is within a predetermined angle range, wherein, (1) when it is determined the face is facing either right or left as viewed in the rectangular image by the first determining, the second determining comprises:
    setting the image area division line with respect to the rectangular image, and
    calculating a movement amount on the basis of the rotation angle and on the basis of the image area division line being set in the vertical direction by dividing a size of the rectangular image in a horizontal direction by a predetermined integer, wherein, (2) when it is determined the face is facing front as viewed in the rectangular image by the first determining, the second determining comprises:
    detecting a face rotation angle of the face;
    calculating the movement amount to be zero, when the face rotation angle is determined to be within a range of an upright state; and
    calculating the movement amount on the basis of the face rotation angle and on the basis of the image area division line being set in the vertical direction by dividing a size of the rectangular image in a horizontal direction by a predetermined integer, when the face rotation angle is determined to be not within the range of the upright state, and wherein the second determining comprises obtaining as a determination result the composition in which a center of gravity, which is set in the image section which includes at least one detected subject, is located in a position which is shifted from the image area division line by the movement amount.

15. A composition determination device comprising:

means for detecting a face of a specific subject in a rectangular image based on image data;

means for detecting a rotation angle of the face in an image section in the rectangular image, corresponding to a detected subject which is the subject detected by the means for detecting the face;

first means for determining if the face is facing either front, right or left as viewed in the rectangular image based on the rotation angle; and second means for determining a composition in the rectangular image comprising horizontal sides and vertical sides on the basis of the rotation angle and on the basis of an image area division line, the image area division line being set in a vertical direction with respect to the rectangular image in response to a determination that the detected rotation angle of the face is within a predetermined angle range, wherein, (1) when the first means for determining determines the face is facing either right or left as viewed in the rectangular image, the unit second means for determining:
    sets the image area division line with respect to the rectangular image, and
    calculates a movement amount on the basis of the rotation angle and on the basis of the image area division line being set in the vertical direction by dividing a size of the rectangular image in a horizontal direction by a predetermined integer, wherein, (2) when the first means for determining determines the face is facing front as viewed in the rectangular image, the second means for determining:
    detects a face rotation angle of the face;
    calculates the movement amount to be zero, when the face rotation angle is determined to be within a range of an upright state; and
    calculates the movement amount on the basis of the face rotation angle and on the basis of the image area division line being set in the vertical direction by dividing a size of the rectangular image in a horizontal direction by a predetermined integer, when the face rotation angle is determined to be not within the range of the upright state, and wherein the second means for determining obtains as a determination result the composition in which a center of gravity, which is set in the image section which includes at least one detected subject, is located in a position which is shifted from the image area division line by the movement amount.

16. An imaging system comprising:

an imaging device section;

a movable device section which includes a mechanism which is movable by changing an imaging view range of the imaging device section;

an image data obtaining unit configured to obtain image data of a rectangular image which is obtained by imaging of the imaging device section;

circuitry configured to:

detect a face of a specific subject in the rectangular image based on the image data;

detect a rotation angle of the face in an image section in the rectangular image, corresponding to a detected subject which is the subject detected by the circuitry;

determine if the face is facing either front, right or left as viewed in the rectangular image based on the rotation angle; and determine a composition in the rectangular image comprising horizontal sides and vertical sides on the basis of the rotation angle and on the basis of an image area division line, the image area division line being set in a vertical direction with respect to the rectangular image in response to a determination that the detected rotation angle of the face is within a predetermined angle range; and perform a control for at least the movable device section so that the imaging view range is adjusted to obtain the composition which is determined by the circuitry, wherein, (1) when the circuitry determines the face is facing either right or left as viewed in the rectangular image, the circuitry is configured to:
    set the image area division line with respect to the rectangular image, and
    calculate a movement amount on the basis of the rotation angle and on the basis of the image area division line being set in the vertical direction by dividing a size of the rectangular image in a horizontal direction by a predetermined integer, wherein, (2) when the circuitry determines the face is facing front as viewed in the rectangular image, the circuitry is configured to:
  detect a face rotation angle of the face;
  calculate the movement amount to be zero, when the face rotation angle is determined to be within a range of an upright state; and
  calculate the movement amount on the basis of the face rotation angle and on the basis of the image area division line being set in the vertical direction by dividing a size of the rectangular image in a horizontal direction by a predetermined integer, when the face rotation angle is determined to be not within the range of the upright state, and
wherein the circuitry is configured to obtain as a determination result the composition in which a center of gravity, which is set in the image section which includes at least one detected subject, is located in a position which is shifted from the image area division line by the movement amount.

* * * * *